United States Patent
Nielsen

(10) Patent No.: US 10,095,968 B2
(45) Date of Patent: Oct. 9, 2018

(54) METHOD AND AN ASSEMBLY FOR GENERATING A MAGNETIC FIELD AND A METHOD OF MANUFACTURING AN ASSEMBLY

(71) Applicant: CARDLAB APS, Herlev (DK)

(72) Inventor: Finn Nielsen, Copenhagen S (DK)

(73) Assignee: Cardlabs APS, Herlev (DK)

( * ) Notice: Subject to any disclaimer, the term of this patent is extended or adjusted under 35 U.S.C. 154(b) by 0 days.

(21) Appl. No.: 15/536,189

(22) PCT Filed: Dec. 18, 2015

(86) PCT No.: PCT/EP2015/080663
§ 371 (c)(1),
(2) Date: Jun. 15, 2017

(87) PCT Pub. No.: WO2016/097372
PCT Pub. Date: Jun. 23, 2016

(65) Prior Publication Data
US 2017/0364784 A1    Dec. 21, 2017

(30) Foreign Application Priority Data

Dec. 19, 2014 (EP) .................................. 14199442
Apr. 17, 2015 (EP) .................................. 15164120

(51) Int. Cl.
*G06K 19/06* (2006.01)
*G07F 7/10* (2006.01)
(Continued)

(52) U.S. Cl.
CPC ..... *G06K 19/06206* (2013.01); *G06Q 20/341* (2013.01); *G06Q 20/342* (2013.01);
(Continued)

(58) Field of Classification Search
CPC ......... G06K 19/06206; G06K 19/0702; G06K 19/077; G06K 19/07707; G06K 19/07718; G06K 19/07722
(Continued)

(56) References Cited

U.S. PATENT DOCUMENTS 3,958,235 A    5/1976 Duffy
4,051,499 A    9/1977 Kondo
(Continued)

FOREIGN PATENT DOCUMENTS

CA    2317642 A1    3/2001
DE    4244144 C1    5/1994
(Continued)

OTHER PUBLICATIONS

International Search Report and Written Opinion dated Mar. 31, 2016 issued in corresponding International Application No. PCT/EP/2015/080663.
(Continued)

*Primary Examiner* — Seung Lee
(74) *Attorney, Agent, or Firm* — Harness, Dickey & Pierce, P.L.C.

(57) ABSTRACT

A credit card shaped element with a dynamic stripe which may be activated or deactivated, where the stripe is formed by a plurality of coils provided along the curve thereof, where the plurality of coils are activated in a sequential manner, where a plurality of proximity sensing coils are provided in series along the curve thereof, where the plurality of coils are formed by one coil contacted at multiple positions along its length by contact pads and where the signals fed to the coils cause an output of a reader coil to output a signals with a minimum slope or where one signal fed to one track has no peaks when the other signal is close to zero.

20 Claims, 8 Drawing Sheets

(51) Int. Cl.
*G07F 7/02* (2006.01)
*G07F 7/08* (2006.01)
*G06Q 20/34* (2012.01)
*G06Q 20/36* (2012.01)
*G06Q 20/40* (2012.01)

(52) U.S. Cl.
CPC ......... *G06Q 20/363* (2013.01); *G06Q 20/367* (2013.01); *G06Q 20/40975* (2013.01); *G07F 7/025* (2013.01); *G07F 7/0866* (2013.01); *G07F 7/1008* (2013.01)

(58) Field of Classification Search
USPC ....................................................... 235/492
See application file for complete search history.

(56) References Cited

U.S. PATENT DOCUMENTS

| | | |
|---|---|---|
| 4,158,433 A | 6/1979 | Peterson et al. |
| 4,304,992 A | 12/1981 | Kobayashi et al. |
| 4,311,999 A | 1/1982 | Upton et al. |
| 4,354,100 A | 10/1982 | Rohen |
| 4,701,601 A | 10/1987 | Francini et al. |
| 4,791,283 A | 12/1988 | Burkhardt |
| 4,825,056 A | 4/1989 | Ohta et al. |
| 4,829,166 A | 5/1989 | Froelich |
| 4,873,397 A | 10/1989 | Masujima et al. |
| 4,910,775 A | 3/1990 | Yves et al. |
| 5,060,261 A | 10/1991 | Avenier et al. |
| 5,130,522 A | 7/1992 | Yamanouchi et al. |
| 5,136,644 A | 8/1992 | Audebert et al. |
| 5,157,389 A | 10/1992 | Kurozu et al. |
| 5,247,164 A | 9/1993 | Takahashi |
| 5,397,881 A | 3/1995 | Mannik |
| 5,478,994 A | 12/1995 | Rahman et al. |
| 5,563,948 A | 10/1996 | Diehl et al. |
| 5,566,982 A | 10/1996 | Lehureau et al. |
| 5,627,355 A | 5/1997 | Rahman et al. |
| 5,635,701 A | 6/1997 | Gloton |
| 5,791,968 A | 8/1998 | Matsumura et al. |
| 5,834,756 A | 11/1998 | Gutman et al. |
| 5,896,325 A | 4/1999 | Fujioka |
| 5,955,961 A | 9/1999 | Wallerstein |
| 5,963,144 A | 10/1999 | Kruest |
| 6,012,636 A | 1/2000 | Smith |
| 6,206,293 B1 | 3/2001 | Gutman et al. |
| 6,265,984 B1 | 7/2001 | Molinaroli |
| 6,325,285 B1 | 12/2001 | Baratelli |
| 6,327,376 B1 | 12/2001 | Harkin |
| 6,404,409 B1 | 6/2002 | Solomon |
| 6,424,033 B1 | 7/2002 | Akram |
| 6,452,575 B1 | 9/2002 | Lin |
| 6,592,044 B1 | 7/2003 | Wong et al. |
| 6,603,879 B2 | 8/2003 | Haikin et al. |
| 6,607,362 B2 | 8/2003 | Lum |
| 6,609,654 B1 | 8/2003 | Anderson et al. |
| 6,657,538 B1 | 12/2003 | Ritter |
| 6,715,679 B1 | 4/2004 | Infosino |
| 6,747,547 B2 | 6/2004 | Benson |
| 6,755,341 B1 | 6/2004 | Wong et al. |
| 6,774,474 B1 | 8/2004 | Caletka et al. |
| 6,794,749 B2 | 9/2004 | Akram |
| 6,805,288 B2 | 10/2004 | Routhenstein et al. |
| 6,832,721 B2 | 12/2004 | Fujii |
| 6,848,617 B1 | 2/2005 | Fries et al. |
| 6,883,717 B1 | 4/2005 | Kelley et al. |
| 6,906,425 B2 | 6/2005 | Stewart et al. |
| 6,910,634 B1 | 6/2005 | Inose et al. |
| 6,913,948 B2 | 7/2005 | Caletka et al. |
| 6,919,220 B2 | 7/2005 | Akram |
| 6,991,155 B2 | 1/2006 | Burchette, Jr. |
| 7,028,897 B2 | 4/2006 | Fernandes et al. |
| 7,044,394 B2 | 5/2006 | Brown |
| 7,051,932 B2 | 5/2006 | Fernandes et al. |
| 7,083,105 B2 | 8/2006 | Maruyama et al. |
| 7,090,139 B2 | 8/2006 | Kasuga et al. |
| 7,127,236 B2 | 10/2006 | Khan et al. |
| 7,246,752 B2 | 7/2007 | Brown |
| 7,252,232 B2 | 8/2007 | Fernandes et al. |
| 7,278,025 B2 | 10/2007 | Saito et al. |
| 7,347,381 B2 | 3/2008 | Rathbun et al. |
| 7,365,636 B2 | 4/2008 | Doi et al. |
| 7,409,876 B2 | 8/2008 | Ganapathi et al. |
| 7,525,374 B2 | 4/2009 | Robert et al. |
| 7,597,267 B2 | 10/2009 | Miyazaki |
| 7,609,146 B2 | 10/2009 | Tang et al. |
| 7,823,794 B2 | 11/2010 | Li et al. |
| 7,940,184 B2 | 5/2011 | Spivey, Jr. |
| 7,954,724 B2 | 6/2011 | Poidomani et al. |
| 8,231,063 B2 | 7/2012 | Poidomani et al. |
| 8,286,889 B2 | 10/2012 | Poidomani et al. |
| 8,302,871 B2 | 11/2012 | Poidomani et al. |
| 8,360,332 B2 | 1/2013 | Poidomani et al. |
| 8,376,239 B1 | 2/2013 | Humphrey |
| 8,480,002 B2 | 7/2013 | Poidomani et al. |
| 8,500,019 B2 | 8/2013 | Poidomani et al. |
| 2002/0003169 A1 | 1/2002 | Cooper |
| 2002/0032657 A1 | 3/2002 | Singh |
| 2002/0043566 A1 | 4/2002 | Goodman et al. |
| 2002/0104891 A1 | 8/2002 | Otto |
| 2002/0139844 A1 | 10/2002 | Rochman et al. |
| 2002/0152211 A1 | 10/2002 | Jam |
| 2002/0153424 A1 | 10/2002 | Li |
| 2003/0019942 A1 | 1/2003 | Blossom |
| 2003/0071717 A1 | 4/2003 | Hagl et al. |
| 2003/0106935 A1 | 6/2003 | Burchette |
| 2003/0139984 A1 | 7/2003 | Seigel |
| 2003/0169574 A1 | 9/2003 | Maruyama et al. |
| 2003/0204526 A1 | 10/2003 | Salehi-Had |
| 2003/0226041 A1 | 12/2003 | Palmer et al. |
| 2004/0034782 A1 | 2/2004 | Park |
| 2004/0035942 A1 | 2/2004 | Silverman |
| 2004/0049460 A1 | 3/2004 | Doron et al. |
| 2004/0098481 A1 | 5/2004 | Gunji et al. |
| 2004/0111378 A1 | 6/2004 | Howell |
| 2004/0129787 A1 | 7/2004 | Saito et al. |
| 2004/0133787 A1 | 7/2004 | Doughty et al. |
| 2004/0155845 A1 | 8/2004 | Smedley et al. |
| 2004/0159700 A1 | 8/2004 | Khan et al. |
| 2004/0177045 A1 | 9/2004 | Brown |
| 2005/0001711 A1 | 1/2005 | Doughty et al. |
| 2005/0116048 A1 | 6/2005 | Sauter et al. |
| 2005/0235156 A1 | 10/2005 | Chen |
| 2005/0240778 A1 | 10/2005 | Saito |
| 2005/0277360 A1 | 12/2005 | Benedek et al. |
| 2006/0000900 A1 | 1/2006 | Fernandes et al. |
| 2006/0072355 A1 | 4/2006 | Ebihara et al. |
| 2006/0091989 A1 | 5/2006 | Vinciarelli et al. |
| 2006/0097368 A1 | 5/2006 | Seko |
| 2006/0118621 A1 | 6/2006 | Burchette |
| 2006/0124756 A1 | 6/2006 | Brown |
| 2006/0161789 A1 | 7/2006 | Doughty et al. |
| 2006/0175405 A1 | 8/2006 | Fernandes et al. |
| 2006/0187046 A1 | 8/2006 | Kramer |
| 2006/0214009 A1 | 9/2006 | Shikata et al. |
| 2006/0249754 A1 | 11/2006 | Forman et al. |
| 2006/0266831 A1 | 11/2006 | Kozlay |
| 2006/0283958 A1 | 12/2006 | Osterweil |
| 2006/0287964 A1 | 12/2006 | Brown |
| 2006/0289657 A1 | 12/2006 | Rosenberg |
| 2007/0075145 A1 | 4/2007 | Arendonk |
| 2007/0100754 A1 | 5/2007 | Brown |
| 2007/0136211 A1 | 6/2007 | Brown et al. |
| 2007/0176622 A1 | 8/2007 | Yamazaki |
| 2007/0208671 A1 | 9/2007 | Brown et al. |
| 2007/0241183 A1 | 10/2007 | Brown et al. |
| 2007/0241201 A1 | 10/2007 | Brown et al. |
| 2007/0255657 A1 | 11/2007 | Brown |
| 2007/0296551 A1 | 12/2007 | Beenau et al. |
| 2008/0004935 A1 | 1/2008 | Marshall |
| 2008/0029598 A1 | 2/2008 | Fernandes et al. |
| 2008/0061148 A1 | 3/2008 | Tanner |
| 2008/0116285 A1 | 5/2008 | Shoemaker |
| 2008/0126262 A1 | 5/2008 | Brady et al. |

(56) References Cited

U.S. PATENT DOCUMENTS

| | | |
|---|---|---|
| 2008/0128514 A1 | 6/2008 | Sabbah et al. |
| 2009/0152364 A1 | 6/2009 | Spivey, Jr. |
| 2009/0224035 A1 | 9/2009 | Deborgies |
| 2010/0079289 A1 | 4/2010 | Brandt et al. |
| 2011/0108626 A1 | 5/2011 | Hepner et al. |
| 2012/0068827 A1 | 3/2012 | Yi et al. |
| 2012/0187199 A1 | 7/2012 | Poidomani et al. |

FOREIGN PATENT DOCUMENTS

| | | |
|---|---|---|
| DE | 19618144 C1 | 4/1997 |
| DE | 19648767 A1 | 6/1997 |
| DE | 19947180 A1 | 4/2001 |
| DE | 10140662 C1 | 3/2003 |
| DE | 10222847 A1 | 12/2003 |
| DE | 10342054 B4 | 4/2005 |
| EP | 0373411 A2 | 6/1990 |
| EP | 0789334 A2 | 8/1997 |
| EP | 0994439 A2 | 4/2000 |
| EP | 1014776 A1 | 6/2000 |
| EP | 1083527 A2 | 3/2001 |
| EP | 1230619 A1 | 8/2002 |
| EP | 1231562 A1 | 8/2002 |
| EP | 1326196 A1 | 7/2003 |
| EP | 1446759 A2 | 8/2004 |
| EP | 1459241 A2 | 9/2004 |
| EP | 1519415 A2 | 3/2005 |
| EP | 1535421 A1 | 6/2005 |
| EP | 1678582 A2 | 7/2006 |
| EP | 1714237 A2 | 10/2006 |
| EP | 1877967 A1 | 1/2008 |
| EP | 2172863 A2 | 4/2010 |
| FR | 2728710 A1 | 6/1996 |
| FR | 2790084 A1 | 8/2000 |
| GB | 2243235 A | 10/1991 |
| GB | 2389218 A | 12/2003 |
| GB | 2398152 A | 8/2004 |
| JP | S57188852 A | 11/1982 |
| JP | S62-043792 A | 2/1987 |
| JP | H01196518 A | 8/1989 |
| JP | H01287535 A | 11/1989 |
| JP | H2307792 A | 12/1990 |
| JP | H4173194 A | 6/1992 |
| JP | H0667616 A | 3/1994 |
| JP | 2964414 B2 | 10/1999 |
| JP | 2001-14435 A | 1/2001 |
| JP | 3081811 U | 11/2001 |
| JP | 2004-78731 A | 3/2004 |
| JP | 2004-88646 A | 3/2004 |
| JP | 2004-151968 A | 5/2004 |
| JP | 2004-264440 A | 9/2004 |
| JP | 2005-517970 A | 6/2005 |
| JP | 2005-293485 A | 10/2005 |
| JP | 2006-300749 A | 11/2006 |
| JP | 2007-219807 A | 8/2007 |
| KR | 20010086928 A | 9/2001 |
| KR | 20020007576 A | 1/2002 |
| WO | WO-95/24733 A1 | 9/1995 |
| WO | WO-96/34333 A1 | 10/1996 |
| WO | WO-96/41377 A1 | 12/1996 |
| WO | WO-96/41507 A1 | 12/1996 |
| WO | WO-98/54912 A1 | 12/1998 |
| WO | WO-99/41696 A1 | 8/1999 |
| WO | WO-00/49561 A1 | 8/2000 |
| WO | WO-01/31577 A1 | 5/2001 |
| WO | WO-01/35496 A1 | 5/2001 |
| WO | WO-01/37205 A1 | 5/2001 |
| WO | WO-01/52204 A1 | 7/2001 |
| WO | WO-01/88659 A2 | 11/2001 |
| WO | WO-01/93238 A1 | 12/2001 |
| WO | WO-02/080638 A1 | 10/2002 |
| WO | WO-02/084602 A1 | 10/2002 |
| WO | WO-03/009223 A1 | 1/2003 |
| WO | WO-03/017211 A2 | 2/2003 |
| WO | WO-03/027949 A1 | 4/2003 |
| WO | WO-03/044721 A1 | 5/2003 |
| WO | WO-03/058391 A2 | 7/2003 |
| WO | WO-03/058947 A2 | 7/2003 |
| WO | WO-03/077618 A2 | 9/2003 |
| WO | WO-03/084124 A1 | 10/2003 |
| WO | WO-2004/025545 A2 | 3/2004 |
| WO | WO-2004/093341 A1 | 10/2004 |
| WO | WO-2004/099921 A2 | 11/2004 |
| WO | WO-2005/027030 A1 | 3/2005 |
| WO | WO-2005/036357 A2 | 4/2005 |
| WO | WO-2005/052846 A2 | 6/2005 |
| WO | WO-2005/059691 A2 | 6/2005 |
| WO | WO-2005/086102 A1 | 9/2005 |
| WO | WO-2005/088893 A1 | 9/2005 |
| WO | WO-2005/124659 A2 | 12/2005 |
| WO | WO-2006/095186 A1 | 9/2006 |
| WO | WO-2006/105092 A2 | 10/2006 |
| WO | WO-2006/116772 A2 | 11/2006 |
| WO | WO-2006/136229 A1 | 12/2006 |
| WO | WO-2007/022423 A2 | 2/2007 |
| WO | WO-2007/064429 A1 | 6/2007 |
| WO | WO-2007/073966 A1 | 7/2007 |
| WO | WO-2007/113722 A1 | 10/2007 |
| WO | WO-20081019246 A2 | 2/2008 |
| WO | WO-2008/121864 A1 | 10/2008 |

OTHER PUBLICATIONS

"Identification cards—Recording technique—Part 2: Magnetic stripe—Low coercivity." International Standard ISO/IEC 7811-2:2001, Third edition, Feb. 1, 2001 (pp. 1-21).

METHOD AND AN ASSEMBLY FOR GENERATING A MAGNETIC FIELD AND A METHOD OF MANUFACTURING AN ASSEMBLY

CROSS-REFERENCE TO RELATED APPLICATIONS

This application is a national phase under 35 U.S.C. § 371 of PCT International Application No. PCT/EP2015/080663 which has an International filing date of Dec. 18, 2015, which claims priority to European Application No. 14199442.6, filed Dec. 19, 2014 and European Application No. 15164120.6, filed Apr. 17, 2015, the entire contents of each of which are hereby incorporated by reference.

BACKGROUND

The present invention relates to a method and an assembly for outputting a magnetic field. Aspects of the invention also relate to the manufacture or production of assemblies of this type.

Systems of this type may be seen in e.g.: US2011/0108626, US2002/0043566, U.S. Pat. No. 4,051,499, US2002/0003169, US2004/0049460, US2088/0116285, U.S. Pat. No. 5,955,961, US53977881, US2008/0126262, U.S. Pat. No. 6,012,636, WO2005/027030, International standard, ISO/IEC 7811-2 (XP001248361), part 2: magnetic stripe—low coercivity, DE19648767, DE-C-19618144, WO01/31577, WO01/52204, WO00/49561, EP0994439, US2004/0133787, EP1678582, EP1535421, US2005/0001711, US2006/0161789, US200/0226041, EP1231562, U.S. Pat. No. 6,910,634, U.S. Pat. No. 6,603,879, EP123U619, U.S. Pat. No. 5,627,355, U.S. Pat. No. 5,478, 994, US2003/0106935, US2006/0118621, U.S. Pat. No. 6,991,155, U.S. Pat. No. 6,857,563, EP1446759, U.S. Pat. No. 4,158,433, CA2317642, U.S. Pat. No. 6,715,679, EP1 083 527, GB2243235, U.S. Pat. No. 6,206,293, U.S. Pat. No. 6,206,293, U.S. Pat. No. 5,834,756, U.S. Pat. No. 4,791,283, US2002/0153424, U.S. Pat. No. 4,910,775, U.S. Pat. No. 5,136,644, GB2398152, US2002/139844, U.S. Pat. No. 6,883,717, DE19947180, DE10342054, WO03/027949, U.S. Pat. No. 6,774,474, U.S. Pat. No. 6,913,948, WO03/077618, U.S. Pat. No. 6,906,425, U.S. Pat. No. 4,873,397, U.S. Pat. No. 6,424,033, U.S. Pat. No. 6,794,749, U.S. Pat. No. 6,919,220, WO02/080638, WO95/24733, WO96/41377, WO96/41507, KR20020007576, EP1014776, WO2006/116772, WO2006/105092, WO01/88659, U.S. Pat. No. 6,592,044, U.S. Pat. No. 6,609,654, U.S. Pat. No. 6,755,341, U.S. Pat. No. 6,805,288, WO2004/099921, WO03/058391, WO03/058947, EP1459241, U.S. Pat. No. 7,028,897, U.S. Pat. No. 7,051,932, U.S. Pat. No. 7,127,236, U.S. Pat. No. 7,252,232, US2006/0175405, US2004/159700, US2006/000900, US2008/029598, WO2005/059691, U.S. Pat. No. 7,044,394, U.S. Pat. No. 7,246,752, US2004/0177045, US2006/124756, US2006/249754, US2006/287964, US2007/100754, US2007/0136211, US2007/208671, US2007/241183, US2007/241201, US2007/255657, US2008/004935, EP1714237, U.S. Pat. No. 6,325,285, EP1326196, GB2398152, WO2005/088893, WO2004/025545, US2005/0240778, WO2007/022423, WO2007/064429, U.S. Pat. No. 7,278,025, U.S. Pat. No. 4,829,166, U.S. Pat. No. 4,825,056, US2002/032657, U.S. Pat. No. 5,563,948, U.S. Pat. No. 6,657,538, U.S. Pat. No. 4,304,992, US2004/0035942, US2007/0176622, U.S. Pat. No. 6,607,362, US2004/0129787, US2006/0283958, US2006/0091989, WO02/084602, US2005/0277360, U.S. Pat. No. 5,791,966, U.S. Pat. No. 6,265,984, US2004/155845, U.S. Pat. No. 6,452,575, WO2001/93238, GB2389218, JP3081811 U, JP06-067616 A, JP2004-264440 A, JP2005-517970 A, U.S. Pat. No. 6,404,409, U.S. Pat. No. 4,311,999, U.S. Pat. No. 3,958,235, U.S. Pat. No. 4,701,601, US2004/111378, U.S. Pat. No. 5,157,389, US2003/0071717, U.S. Pat. No. 6,832,721, U.S. Pat. No. 7,609,146, US2003/169574, JP02307792, DE10140662, FR2728710, WO2007/113722, US-2006/0214009, US-2002/0104891, U.S. Pat. No. 5,247,164, U.S. Pat. No. 7,347,381, JP2005-293485A, JP1-287535A, JP1-196518A, JP2006-300749, KR10-2001-0086928, WO2005/086102, WO2006/095186, WO2004/093341, U.S. Pat. No. 7,525,374, EP1519415, US2006/097368, JP57188852, WO99/41696, WO2005/124659, U.S. Pat. No. 6,848,617, US2004/129787, WO03/009223, WO03/017211, US2006/072355, EP0789334, U.S. Pat. No. 6,327,376, U.S. Pat. No. 7,278,025, U.S. Pat. No. 7,409,876, U.S. Pat. No. 7,090,139, U.S. Pat. No. 7,597,267, US2007/0075145, WO2008/019246, US2008/0128514, US2008/061148, WO2005/052846, US2006/187046, US2009/0224035, US2005/0240778, U.S. Pat. No. 7,365,636, US-2009/01523640, US-2008/0061148, U.S. Pat. No. 5,963,144, JP2004 151968, U.S. Pat. No. 5,896,325, JP2007-219807, WO98/54912, WO08/121864, U.S. Pat. No. 7,940,184, US2012/0068827, US-2010/0079289, EP0373411, US2012/187199, U.S. Pat. No. 8,500,019, U.S. Pat. No. 8,480,002, U.S. Pat. No. 8,360,332, U.S. Pat. No. 8,302,871, U.S. Pat. No. 8,286,889, U.S. Pat. No. 7,954,724, U.S. Pat. No. 8,231,063, U.S. Pat. No. 8,231,063, U.S. Pat. No. 8,376,239, US2004/098481, US2007/296551, US2002/152211, EP2172863, WO96/34333, US2003/139984, US2003/204526, US2005/235156, U.S. Pat. No. 6,747,547, US2006/0289657, DE4244144, U.S. Pat. No. 7,083,105, US2006/266831, EP1877967, U.S. Pat. No. 5,635,701, U.S. Pat. No. 5,635,701, U.S. Pat. No. 5,566,982, U.S. Pat. No. 5,566,982, US2003/0019942, US2005/0116048, JP2001-14435, JP2004-78731, JP2004-86646, DE10222847, FR290084, WO2007/073966, U.S. Pat. No. 5,060,261, U.S. Pat. No. 5,060,261, JP2-307792, U.S. Pat. No. 5,130,522, JP2964414, JP62-043792, JP4-173194, and U.S. Pat. No. 7,823,794.

SUMMARY

A first aspect of the invention relates to an assembly comprising:
- an outer surface bounded by at least a first and a second edge portion,
- 3-100 sets of coils arranged at least substantially along a predetermined curve at the surface, the curve having a first length and extending between a first and a second points on the surface, the first point being positioned within a first distance of 20% of the first length or less from the first edge portion and the second point being positioned within a second distance of 20% of the first length or less from the second edge portion,
- a controller connected to the coils, wherein the coils have symmetry axes at least substantially parallel to a plane of the first surface.

In this context, the assembly may have e.g. the shape of a credit card or ID card which hitherto often have had static magnetic strips of magnetizable material on to which magnetizing signal has been applied so that the strip represents a number of separate magnets together forming a signal when read by a reader head.

Usually, the elements of the assembly are fixed to each other so as to form a unit, such as a card. This attachment may comprise lamination, gluing, welding/soldering or the like.

The outer surface may be a surface of a flat or plane element, directed toward surroundings of the assembly. If the assembly is card-shaped, the outer surface may be one of the two major surfaces of the card.

The outer surface is bounded by at least a first and a second edge portion. The edge portions may be part of edges defining between them the outer surface. The edges may be the oblong surface parts of a card defining the total outer surface of the card together with the two main sides. An edge may also be the interface between two surface parts at an angle to each other. Edges may be sharp, such as between two plane surfaces perpendicular to each other, or may be soft, such as rounded.

The first and second edge portions may be opposite to each other. Preferably, the outer surface has a longest dimension, where the first and second edge portions are provided at either end of the surface along this dimension.

The first and second edge portions may be positioned with a distance there between of 1-30 cm, such as 2-20 cm, such as 5-10 cm, if desired.

The outer surface may be plane or bent, height stepped, embossed, for example. Preferably, at least a plane surface is provided so that a plane movement of the assembly in relation to e.g. a reader head will facilitate detection of the magnetic signal.

A set of coils comprises one or more coils, such as 2, 3, 4, 5, 6, 7, 8, 9, 10, 12, 14, 15, 16, 18, 20 or more coils. The sets may comprise different numbers of coils but preferably have the same number of coils. In a preferred embodiment, each set has only a single coil.

The coils of the sets of coils are arranged at least substantially along the curve. The curve is predetermined and preferably is straight but may have any shape, such as a bent shape, a sine-shape or the like. In a preferred embodiment, such as where the assembly is credit-card shaped, the curve and thus the coils are provided so as to provide a magnetic field along a track of a magnetic card. This track and the position thereof may be seen in ISO 7811-4. As is described below, the coil(s) may be offset up to 1, 2 or 3 mm, but preferably less, from this track position, when projected on to the outer surface, as this may provide a better angle for the magnetic field to enter a reader head travelling directly over the track.

The curve may extend from the first to the second edge portion but may be desired to not extend all the way to the actual edge portions. Thus, the coils may not need to extend all the way to the edge portions.

The length of the curve, the first length, may be 80% or more of a distance between the first and second edge portions. Thus, in the credit card embodiment, the first length may be the majority of the width of the card. In legacy cards, this first length may be 7-15 mm, such as 8-10 mm. In cards according to ISO 7810 ID1 and ISO 7811-4, the width is 85.6 mm.

The first point and the second point define end portions of the curve and may be defined on the outer surface. Naturally, the first and/or second points may be positioned closer to the edge portions, such as 15% or less, such as 10% or less, perhaps 9% or less, such as 8% or less, such as 7% or less, such as 5% or less of the first length. In one embodiment, a reason for not having the points or the coils too close to the edges is that sensors may be desired between the outer-most coils and the edge portions.

The coils may be provided on the surface of the assembly but are preferably provided inside the assembly, such as within 400 μm, such as within 300 μm, such as within 200 μm, such as within 100 μm from the surface. In the embodiment where the assembly is credit-card shaped, for example, the overall thickness of the assembly, or at least a plan part thereof (excluding e.g. any embossed portions) may be less than 1 mm, such as less than 900 μm, such as between 850 μm and 700 μm, as is seen in ISO7810, whereby the coils may be provided quite close to the surface.

Thus, in one embodiment, the card has an outer, at least substantially straight side and wherein the curve or magnetically conductive material is a straight line being at least substantially parallel to the side and positioned between 6.9 mm and 7.2 mm from the side.

In another embodiment, the card has an outer, at least substantially straight side and wherein the curve or magnetically conductive material is a straight line being at least substantially parallel to the side and positioned between 10.2 mm and 10.5 mm from the side.

It is seen that the curve is a desired axis (straight or bent) along which the coils are positioned or below which (if defined on the surface) the coils are positioned so that when a reader head travels along the surface and the curve, it is close to the coils.

In general, the coils are non-overlapping in the sense that when outer contours of the coils are projected on to the first surface, these are non-overlapping.

Preferably, the coils of each set are operated identically. Thus, if each set comprises multiple coils, such coils may be operated identically, such as when the same signal is fed at the same time to all coils of a set.

Finally, a controller is provided which is connected to the coils. This connection may be a direct connection from the controller to each coil or an indirect connection where a signal output by the controller is fed to the pertaining coil via one or more other elements, such as via one or more other coils.

The controller may be a software controlled processor, an ASIC, a DSP, an FPGA or the like or a mixture of such elements. The controller may be a single chip or may be formed by a number of chips, such as when different operations thereof are controlled by different chips. Memory on-chip and/or off-chip may be used if desired. The controller may have many other tasks, such as determining which signal, if more signals may be output, to output, the generation of the signals for the coils so that the desired magnetic signal is output, the determination of whether to output the signal or not, such as to prevent fraudulent reading of the magnetic signal.

A sensor or identifying element may be provided, such as a fingerprint reader, an iris reader, a keyboard for the entering of a PIN code, or the like may be provided as may an activating switch, such as a pressure switch, a dome switch or the like or a deformation sensor, such as a strain gauge, a piezo element, or the like may be provided, all of which provide input to the controller which may determine whether to output the magnetic signal or not—and which magnetic signal to output (differ between output of an identity signal, an account number signal, a room number signal or the like). The output of a sensor may be a simple pulse (voltage and/or current change) as would be seen by an excited coil, or may be more complex, such as representing a value, as could be seen using more complex sensor types.

As mentioned, the coils of a set of coils may be operated simultaneously. In one embodiment, the coils of a set are connected in series and to the controller, so that each set of coils require only two electrical connections to the controller.

The number of sets of coils may vary from embodiment to embodiment. A preferred manner of operating the assembly is described further below, where 2, 3 or even more sets of coils are operated simultaneously but may be operated/shut off independently of each other, so that preferably at least 3 sets of coils are provided. Presently 4, 5, 6, 7, 8, or 9 sets of coils are practical. In the future, more sets of coils may be desired.

In one embodiment, the coils of the sets are ordered, along the curve, so that between two coils of a set, one coil from all other sets is provided. Preferably, the coils are divided into groups of coils, each group comprising a coil from each set, where the coils of each group are positioned along the curve and with no coil of another group positioned between, along the curve, coils of one group.

In this context, a coil is an electrical element configured to receive an electrical signal and output a corresponding magnetic field. "Corresponding" in this situation may be the outputting of a magnetic field varying in the same manner as the electrical signal, such as a current/voltage thereof. Often a coil is a coiled electrical conductor. A coil may be a flat coil or a helical coil, for example. Also, combinations of such coil structures may be used.

A coil may comprise therein a core material configured to guide the magnetic field generated by the coil.

The coils have symmetry axes at least substantially parallel to a plane of the first surface. The coils thus may be helical coils with axes parallel to the first surface. The coils may have parallel axes. In one embodiment, the coils are provided with at least substantially identical axes. In that situation, a common core element may extend within the coils.

Alternatively, no core elements may be provided, or each coil may have a separate core, irrespective of the type of coil and the direction of the axis of the coil. The axis of a plane coil is an axis perpendicular to the plane of the coil.

In one embodiment, the coils are at least substantially equidistantly positioned along the curve, such as between the first and second points. The coils may be provided in a single row of coils. In this context, a position of a coil may be a centre thereof. This centre may, if desired, be projected on to the outer surface.

In one embodiment, a first coil is positioned within 25% of the first length from the first point or the first edge and a second coil is positioned within 25% of the first length from the second point or the second edge. Thus, coils are preferably positioned so close to the first and second points that a magnetic field may be sensed also at the first/second points.

It has been found that the emulation of the signal from a swipe of a legacy magnetic strip card is possible using only half of the length between the edges or the points, as a rather high output signal frequency may be used, especially when the below-described signal shapes are used.

One of or both of the outermost coils, the first and second coils, may be positioned within the 25% of the first length from the pertaining first/second points/edges, such as within 20% thereof, such as within 15% thereof, such as within 10% thereof, such as within 5% thereof, depending on e.g. whether sensors or the like are desired between the coil(s) and the edge(s)/point(s).

As mentioned, the coils may be embodied in many manners. Naturally, different coil types or embodiments may be mixed in the assembly if desired.

In one embodiment, the controller is configured to short circuit one or more sets of coils and output a signal to one or more other sets of coils. A short circuited coil blocks a magnetic signal and thus has the effect of concentrating the magnetic field generated around the active coils. A preferred manner of short circuiting a coil is to supply the same signal to each end of the coil, such as a signal fed to an end of an active coil adjacent to the shorted coil. In this manner, additional connections are not required for the individual coils for generating a galvanic short circuiting thereof. A usual coil has two end conductors connecting the coil portion to e.g. a signal supply. These ends may also form part of the actual coil portion.

In one embodiment, the controller is configured to output a signal to a plurality of neighbouring coils. As will be described in detail further below, one or more of the neighbouring coils may, at a point in time, be fed and one more other coils be short circuited (or receive no signal in order to not output a magnetic field), so that the magnetic field generated by the operating/fed coils shifts position along the curve over time. Naturally, this direction and the speed thereof may be controlled by the controller.

Depending on the particular type of reader to which the magnetic field is launched and depending on the particular type and direction of coil, a coil directly beneath a reader head of the reader may be desired out of operation whereas one or more coils on either side thereof may be operated. Alternatively, the reader head may be above one of a number of operating coils where, in one situation, the reader head may be above a coil at one end of the row of operating coils and, in another situation, the reader head is above a coil having at least one operating coil on either side thereof. In this connection, "above" means that this coil is the closest coil to the reader head. The reader head may be the closest to a position between two coils and thus defined to be above both, for example.

Below, these embodiments are described in larger detail.

In one embodiment, the assembly further comprises at least one sensor for detecting presence of a metallic and/or magnetic element, the controller being connected to the sensor. Then, the controller may use an input from the sensor to determine a position of the metallic/magnetic element, which may be a reader head or sensor configured to sense/read the magnetic field generated.

In fact, multiple such sensors may be provided. When multiple sensors are provided, multiple positions of the metallic/magnetic element may be determined as may a velocity thereof over or in relation to the surface as well as a direction of movement of the element in relation to the surface. Naturally, a velocity may also be determined from the output of a single sensor, such as from a relation between the distance to the reader head and the output of the sensor.

In one embodiment, the sensor(s) is/are positioned close to the curve so as to detect the presence of the metallic/magnetic element when moving over the surface at the curve.

In a preferred embodiment, multiple magnetic fields may be output at different positions or different curves of the assembly. In this embodiment, the assembly further comprises 3-100 sets of second coils arranged at least substantially along a predetermined second curve at the surface, the second curve having a second length and extending between a third and a fourth points on the surface, the third point being positioned within a first distance of 25% of the second length or less from the first edge portion and the fourth point being positioned within a second distance of 25% of the second length or less from the second edge portion, the second coils connected to the controller and wherein the sensor(s) is/are positioned between the first and second curves.

Again, each set of coils may comprise one or a number of coils.

The first and second curves may be parallel and/or non-overlapping. In one embodiment, the first and second curves are straight, parallel lines. In a preferred embodiment, where the assembly is credit-card shaped, the first curve is the so-called first track and the second curve is the so-called second track (ISO7811-4).

The second coils may be positioned, in relation to the assembly and the second curve in the same manner as described above for the first coils in relation to the assembly and the first curve.

As will be described below, the sensors may be provided at different positions along the curve and may be embodied as pairs of sensors so that in addition to the detection of the position of the metallic/magnetic element, also the "local" velocity and direction thereof may be determined at a number of positions along the curve.

In one embodiment, a plurality of sensors are positioned in one or more groups of sensors (each group comprising one or more sensors) positioned at individual positions at the surface, wherein one sensor from each group is connected in series with one sensor from each of one or more others of the groups and to the controller. This simplifies the connection to the controller. The sensors of a group of sensors may be provided at the same positions along the curve or at different positions thereof. Providing all sensors at different longitudinal positions along the curve will give more position determinations along the curve and thus potentially a better position determination during the swipe.

In one embodiment, which is seen in e.g. hotels, the controller may be operated in a special mode wherein the magnetic signal is to be output before a reader head reaches a particular portion, such as 50% of a length of the first curve. This situation may be seen when introducing a card only partly into a reader, as is seen on some hotel doors. Thus, only a part of the first curve is passed past the reader head, whereby the magnetic signal to be output by the coils should be output before the reader head reaches this position—as opposed to usual situations, as seen in ATMs where the full curve is traversed by the reader head.

Thus, the controller may have a particular mode wherein a particular magnetic signal is output during the period of time (may be determined from the sensors) it takes for only a predetermined portion of the first/second curves to pass a predetermined reading position in relation to which the assembly moves.

A second aspect of the invention relates to a method for operating the assembly of the first aspect, the method comprising sequentially feeding one or more of the coils Assemblies, such as credit-card shaped elements comprising coils, are known where all coils are operated simultaneously for e.g. generating local signals for use in the presentation of a magnetic signal from a magnetic stripe. In this situation, individual bits of the signal represented are generated by individual coils.

The present aspect relates to a sequential operation of the coils, such as in a situation where the assembly moves in relation to a reading position or reader element, as is known from e.g. ATMs and where the coil or coils to be operated may be determined on the basis of a position of the reader head.

In a preferred embodiment, the operated coils are fed a signal varying over time and which is predetermined and which represents e.g. a binary signal. The signal is, while being provided over time, fed sequentially to the coils, so that different coils receive different parts of the signal and a corresponding signal, overall, is output from the coils.

In one embodiment, the curve is defined within a plane and e.g. is straight.

The coils may be the sets of coils of the first aspect of the invention. The coils may be selected and embodied in any manner, such as planar coils, helical coils or the like. Also, different types of coils may be used if desired. One or more coils may have therein a core, and a core common to multiple coils may be used if desired.

Preferably, the coils are positioned equidistantly along a straight or bent curve. Alternatively, other positions may be selected. Preferably, the positions are known to the controller in order to take into account these positions when feeding the signal to the coils. The curve may be as that of the first aspect and may be defined on an outer surface of an assembly whereon or wherein the coils are provided. The sequence of coils may be a row of coils one positioned after the other, such as along the curve.

A controller may be used for controlling which coils are operated, and at which point in or period of time, and which are not.

Preferably, the order of operation of the coils is an order along which the coils are positioned along the curve, such as in a predetermined direction along the curve.

At any one time, one or more coils may be operated.

Preferably, the same signal is fed to all operated coils.

In one embodiment, the feeding step may comprise short circuiting one or more of the coils not fed, such as all coils not fed. As described above, different types of short circuiting are possible. In one embodiment, each coil has two conductor ends, the method comprising feeding the same signal to both conductor ends. This may be seen as a short circuiting of the coil. Preferably, this signal may be a signal also fed to a neighbouring coil.

A single coil may be operated at the time, or multiple coils may be operated simultaneously. When multiple coils are operated, they may be neighbouring, or a row of neighbouring coils may be defined/selected some of which are operated and some of which are not. This row of coils may then be shifted in order to have the sequential operation. In one example, a row of 5 coils is defined/selected, where the central coil is not operated but the remaining 4 are. The sequential operation thus is the "movement" of this pattern (on, on, off, on, on) sequentially through the coils. A coil may thus firstly be inactive, then active for two periods of time, then inactive for one period of time, active again for two periods of time and finally inactive, as this pattern moves along the coils. Thus, the first "on" is sequentially shifted along the coils, as is the second "on", the "off", the third "on" and the fourth "on".

Thus, in general, one coil may not be operated and one or more coils on one side thereof, along the curve, e.g., may be operated in one manner and one or more other coils on the other side thereof may be operated in an opposite manner.

In one embodiment, the feeding step comprises simultaneously feeding a plurality of neighbouring coils. In this context, the "neighbouring" will be coils positioned adjacently along the curve. In this manner, a "local" magnetic field may be generated by these coils but not from other coils.

Thus, in this embodiment, the feeding step may comprise stopping feeding of one or more but not all coils fed, continuing feeding one or more of the fed coils, and initiating feeding one or more coils neighbouring to each other and/or the one or more fed coils. Thus, during the transition where one or more coils are "turned off" and one or more other coils are "turned on" or fed, one or more coils will continue to be fed so that a magnetic field is always output. This manner of sequentially "moving" the positions from which a magnetic field is output without having sharp drops in the magnetic field output or points in time where no magnetic field is output. It may, e.g. be desired that a coil positioned directly below a reader head, is turned off while its neighbouring coils are operated to generate the desired field.

In one example, three coils are initially operated. Then, the coil the farthest in one direction (along the curve) may be short circuited and thus brought out of function, while the central coil and the coil the farthest in an opposite direction are still fed by the signal. Then or at the same time, a next coil (neighbouring to the farthest coil in the opposite direction and in the opposite direction) may be fed, so that again three coils are fed but the centre of the fed coils moved one coil in the opposite direction. In one embodiment, the method further comprises the step of determining a position, direction and/or velocity of a metallic, magnetic and/or reader element and controlling the feeding step to feed coils at or in the vicinity of the metallic/magnetic/reader head.

As mentioned above, this position may be used for determining which coil(s) to operate/feed and/or when to switch coils (turn one or more off and one or more others on).

Then, it is possible to have the determining step comprise determining a position of a reader element/head and have the feeding step comprise feeding at least one coil having a predetermined positional relationship with the determined position.

As is described further below, the (direction of the) field lines of the magnetic field output by one or more coils will vary along the curve, as the field lines are unbroken and travel through the operated coil(s). Therefore, different angles will be seen between the field lines and a reader head or the card surface at different positions along the curve. Then, different reader head set-ups may be adapted to or taken into account by selecting, on the basis of the determined position, a coil or a group of coils suitably positioned in relation to the reader head.

As mentioned above, it may be desired to have the feeding step comprise selecting a plurality of neighbouring coils and feeding at least some of the selected coils. In this manner, the above "pattern" of operated and not operated (if any) coils may be sequentially shifted along the curve.

Naturally, then, the feeding step may comprise selecting the plurality of coils to include the at least one coil.

In one situation, it may be desired to have the position of the reader head where the field lines are more or less parallel at the card surface. In that situation, the feeding step may comprise selecting a plurality of coils, a centre of which is at the determined position. This centre may be a central coil of the plurality of coils or it may be at or between 2 or 3 central coils. The number of central coils may be up to 50% of all coils of the selected plurality of coils as the field lines may not alter their angle too much over that distance.

In that situation, all operated or fed coils to one side of the position of the reader head may be operated to provide a magnetic field, in the coils, in a first direction, and all operated or fed coils to the other side of the reader head may be operated to provide a magnetic field, in the coils, in a second, opposite direction.

In another situation, it may be desired to have the reader head at a position where the field lines have an angle deviating substantially from the plane of the card or of the coils. Suitably selected coil(s) is/are then ones where the reader head is close to or above a more extremely positioned coil in the plurality of coils.

In one situation, it may be desired that the feeding step comprises selecting a plurality of coils of which an extreme coil is at or close to the determined position. Then, the remainder of the plurality of coils are to one side only of the extreme coil. Then, the field lines may have a rather large angle to the card/coil plane, and this may cater for reader heads with e.g. sensing coils having a symmetry axis not lying in that plane.

In that situation, the operated coils may all output a magnetic field having, in the coils, at least substantially the same direction.

In addition, the operated coil(s) may be selected so that the reader head is positioned, in relation to a central portion of an extreme, operated coil, within 50%, such as within 25% or within 10%, of an operative distance being a smallest distance, along the curve, within which the or all operated coil(s) is/are provided. The operative distance is the distance between outermost parts of a single, operated coil or the two most extreme, operated coil(s).

In this situation, it is seen that as all or most of the operated coils are provided to one side of the reader head, the reader head is not able to receive the magnetic field while travelling over all of the curve and all of the coils. Thus, a smaller distance is available for transmitting the magnetic field to the reader head.

This may be improved by, at a point in time during the outputting of the magnetic field, shifting the operated coils from a situation where the operated coils are below or to a first side of the reader head position to a situation where coils are operated below or to an opposite side of the reader head.

In this situation, more of the available distance defined by the coils and the curve is available for outputting the magnetic field.

As mentioned below, this shifting may be performed when a signal fed to the coils has a zero current crossing.

It is seen that after this shift, if the same signal is fed to the operated coils, the reader head will now be at the other end of the operated coils and will thus experience a magnetic field having an opposite direction of that at the first end. Then, it may be desired to, in connection with the shift, also reverse the direction of the magnetic field, so that the reader head experiences the same magnetic field direction before and after the shift.

Often, the magnetic field output will change over time, but as it is often interpreted, a phase reversal of the signal output of the reader head may bring about an error. Thus, it is often desired to phase shift or phase reverse a signal fed to the operated coils when shifting the operated coils in the above manner, so that the shift from one end to the other of the operated coils will not bring about a phase shift in the signal generated by the reader head.

Thus, it may be desired to select a relative position of the reader head and the coil or the plurality of coils where the field lines and symmetry axis of a sensing coil has a different angle than at an other desired position. Hence it could be desired to change the phase of the signal fed to the operated coils to make the phase of the signal the same in the two desired positions. In one embodiment it could be desired to change the coil or the plurality of coils used when changing the phase of the signal.

Ultimately, it may be desired to select a relative position of the reader head and the coil or the plurality of coils where the field lines are parallel to a symmetry axis of a sensing coil of the reader head. The angle between the field lines and the symmetry axis may, naturally, differ, such as up to 30 degrees, such as up to 25 degrees, such as up to 20 degrees, such as up to 10 degrees. As is described further above, multiple positions may be determined over time, wherefrom a velocity and/or direction may also be determined. Also this information may be used for controlling or determining which coil(s) to feed at which point in time.

The method thus may comprise determining different points in time of changing coils and/or points in time where the reader head is at predetermined positions and thus determine the change of coils on that basis.

In one embodiment, the method further comprises the steps of:
  the reader head sensing the magnetic field and
  converting the sensed magnetic field into an electric signal.

This sensing and conversion may be as that performed today in ATMs or other card readers, where the magnetic signal, generated by the coils acting as magnets over which the reader head passes. The overall magnetic field may be sensed and then converted into a signal. Often this signal is a digital signal, and the conversion is performed by detecting increasing and/or decreasing flanges of the sensed magnetic signal, which flanges, or the points in time of detection, may be converted into flanges of the digital signal. A popular conversion format is the so-called F2F signal format.

As mentioned above, the method may have a mode where the magnetic signal is output for a period of time which it takes the reader head to travel from one end of the curve to the other, or at least 75%, such as at least 80%, such as at least 90% of the length of the curve. In another mode, the magnetic signal may be output during the period of time it takes the reader head to move no more than 60%, such as no more than 50%, such as no more than 40% of the length of the curve. This may be the mode seen in hotel door systems where only a portion of the assembly is introduced into the reader.

A third aspect of the invention relates to an element comprising:
  a controller,
  one or more first coils provided along a predetermined curve at a surface of the element, each coil connected to the controller,
  a plurality of sensors each positioned in the vicinity of the curve, the sensors connected in series, the series of sensors connected to the controller,
the controller being configured to receive a series of signals from the sensors and output a predetermined signal to one or more selected coils of the first coils, the outputting and/or selection being made on the signals received.

Naturally, this aspect may be combined with any of the other aspects and embodiments of the invention.

Preferably, the element is an assembly comprising the controller, coils and sensors provided within a single element, such as fixed in relation to each other. A preferred shape is a credit-card shape where the curve is positioned where one of the standard magnetic stripe tracks are defined in legacy magnetic strip credit, debit or ID cards.

The controller may be based on any technology, such as a software programmable processor, an FPGA, an ASIC, or the like. The controller may be divided up into multiple elements in communication with each other such as where different functions or operations are desired run on different pieces of hardware. This is standard to the skilled person. The present element may be the assembly mentioned further above and below.

In this aspect, the coils may be as those described in the other aspects or coils as described in the prior art, such as where a single coil extends along the curve and outputs the magnetic signal or where a number of coils generate a part of the magnetic signal along the curve and where, at other parts of the curve, a standard magnetic strip exists. Each coil may be directly connected to the controller such as via two electrical connections, or the connection may be indirect, such as via one or more other electronic elements, such as one or more of the other coils. Also, groups or sets of coils may be defined as is described above.

The curve may be as that described above.

In this context "vicinity" preferably means that the coils are positioned sufficiently close to the curve that a reader head travelling over the curve is able to detect the magnetic field output by the coil(s). In general, "in the vicinity" will mean that the sensors are positioned so as to be able to detect the reader element/head when travelling along the curve. This distance may be e.g. 10% or less of the first distance, such as 5% or less of the first distance or even 1% or less of the first distance.

In this context, a sensor, as is also described further above, may be a sensor detecting or determining the proximity of a magnetic and/or metallic element, such as a reader head. This sensor may be based on any suitable technology, such as a magnetic sensor, such as a coil or a Hall element, or a capacitive sensor. Alternatively, this reader head may be sensed due to an effect it may have on the element, such as a force exerted on the element, where the sensors may be deformation sensors, pressure sensors, strain gauges, piezo electric elements or the like.

Naturally, a mix of sensors may be used if desired.

When the sensors are connected in series, the signal from one sensor may pass through a number of the other sensors in order to reach the controller. However, the outputs from the series connected sensors reach the controller on the same electrical conductors. Thus, a simpler interface may be obtained to the controller.

Any number of sensors may be used, such as 2, 3, 4, 5, 6, 7, 8, 9, 10, 12, 14, 16, 18, 20, 25, 30, 35, 40, 45, 50 or more if desired. One or more series of sensors may be provided, where each series of sensors then is connected independently to the controller.

The controller is configured to receive a series of signals. A series of signals may be provided or obtained when the sensors are activated sequentially, such as if a reader head or other element engages or is translated on or in the vicinity of the sensors, such as along the curve.

From the series of signals, a position of the reader head or other element may be determined, such as from the number of signals, knowing the positions of the sensors along the curve. Also, from a timing relationship (a period of time between adjacent signals and knowing a physical distance between the sensors along the curve), a velocity of the reader head or the like may be determined.

Thus, if the sensors sense the presence of e.g. a reader element traveling along the curve, the position thereof may be tracked by the signals and the timing relationships thereof, such as between receipt by the controller (or output by the sensor) of the signal or a predetermined portion thereof—such as a start thereof.

On the basis of the signals received, the controller outputs a predetermined signal to one or more selected coils of the first coils, the outputting and/or selection being made on the signals received.

In one embodiment, it may be desired to not operate multiple or all coils simultaneously but instead select which coil(s) to operate.

The coils selected may be selected in any desired manner. In one manner, the controller may determine a position in relation to one or more of the coils from the number of signals received, such as when information is available as to the relative positions of the coils and the sensors. Coils then may be selected in the vicinity of the latest activated sensor. A predetermined number of coils may be selected, the coils selected then may be the predetermined number of coils the closest to the latest activated sensor.

As described above, different relative positions of activated coils may be desired for different positions of a sensed metallic/magnetic element, depending on which angle between the field lines of the output magnetic field is desired in relation to e.g. the card plane or a sensing coil of the sensed element.

In another embodiment, the sensors and coils may be positioned sequentially as described above and thus in pre-determined positions where the operation may be sequential activation, where e.g.: when a signal is received from a sensor, a coil is no longer selected/operated and a new coil is selected/operated. The coils being positioned sequentially, where the coil no longer selected is at one end of a sequence of the up-to-now selected coils, and the new coil selected at the other end of the sequence of up-to-now selected coils. Thus, for each signal received, a shift in the selected coils is made.

In one embodiment, the controller is configured to output the predetermined signal over a period of time, the period of time being determined from a timing relationship of at least two of the signals received. The predetermined signal may have a time duration and a variation over time, such as when representing information, such as bits in a binary signal. Thus, the period of time used for outputting the signal may vary depending on the time elapsed between activations of the sensors. If this time is short, the predetermined signal may be output over a smaller period of time, and vice versa. This corresponds to adapting the time between individual bits in a binary signal to the overall period of time available for transmitting the signal.

The timing between the at least two of the signals may be that elapsed between the controller receiving two adjacent signals. A determination of this time may be performed between several or all adjacent pairs of signals, so that the overall period of time available for outputting the predetermined signal may be adapted and the outputting adapted in accordance there with.

In one embodiment, the above timing may be used together with the selection of the coils, such that both the selection of the coils and the timing of the outputting is determined from the signals from the sensors.

In real life, a number of noise sources exist which may make it difficult, when receiving a first of a series of pulses, to ascertain that this is actually the first sensing of a reader head. The pulse may be a sensing of another, metallic or magnetic, material of a reader, or the first reader head sensing has been overlooked due to other noise sources or other parameters.

In one embodiment, the element further comprises a second sensor. This sensor may be positioned close to an extreme of the first plurality of sensors so as to aid in the determination of the first of the sensings of the reader. The second sensor may be positioned at the extreme one of the first series or may be positioned between this sensor and the edge portion. The second sensor may be based on the same technology as that of the pertaining extreme sensor of the first plurality of sensors or may be based on another of the mentioned sensor types. In one situation, it is desired that the second sensor and the pertaining extreme sensor have different properties so as to not be sensitive to the same noise types or noise sources. The pertaining extreme sensor may be a coil having a symmetry axis in one direction and then the second sensor may be a coil having a symmetry axis in another direction, such as perpendicular to that of extreme sensor.

Naturally, the sensors of the first plurality may be identical or of the same type, such as having parallel symmetry axes. Then, the second sensor may be of another type, such as having another position in relation to the curve (closer to or further from) or a symmetry axis at an angle to, such as perpendicular to, that of the sensors of the first plurality.

In one situation, when the second sensor and one of the first plurality of sensors detects a reader, a signal shape or type output by the one sensor may be determined and subsequently looked for from the series of sensors. In this context, a signal type may be a quantity/size and/or polarity of a signal output. In one situation, for example, a plane coil may output a signal with one polarity when in the presence of a magnetic reader head but a signal of the opposite polarity when in the presence of a paramagnetic reader head, such as one made of brass.

Thus, from the output of the sensor of the first plurality and when also the second sensor senses the reader (the two detections may be simultaneous or at different points in time), the controller may determine which type of signal to look for in the series of signals output by the series of sensors.

In one situation, one of the extreme sensor and the second sensor may be embodied as at least one winding around a core material provided in the element, such as a common core element of the first coils (see also WO2005/086102).

In one situation, one or more first coils may be used as a sensor, such as the second sensor.

In this situation, this coil or these coils may be used as a sensor before a signal is fed thereto. Alternatively, the coil(s) may function as a sensor also when fed. This is described further below.

In one situation, the first sensor is relatively position specific in the sense that it will output a pulse or signal only when the reader head is within a first distance from a centre of the first sensor, whereas the second sensor is less position specific and will output a pulse or signal when the reader head is within a second distance being at least 1.2, such as at least 1.3, such as at least 1.4, such as at least 1.5 times the first distance. In this respect, the pulse or signal may be a signal exceeding a predetermined threshold, such as a threshold current or voltage. In this situation, different sensings will take place and the second sensor will provide a true alternative sensor to the first sensor.

Naturally, second sensors may be provided at both ends of the curve or along the curve, such as in connection with each first sensor if desired.

In one embodiment, the element further comprises a second plurality of sensors positioned in the vicinity of the curve, the sensors of the second plurality of sensors being connected in series and to the controller, where the controller is configured to output the predetermined signal and/or select the selected coils also on the basis of signals received from the second plurality of sensors. The number of sensors in the second plurality may be 2, 3, 4, 5 or as many sensors as are used in the first plurality.

Each series of sensors generates a series of signals (such as pulses, voltages or perhaps more complex signals) from which some information may be derived about which sensor is activated or a speed of an activating element travelling along the curve. Having multiple series of sensors, also a direction of movement of this activating element along the curve may be determined, such as from a timing relationship between a signal received from the first plurality and a signal received from the second plurality. When information is available, such as in a storage, of relative positions along the curve of at least one sensor of the first plurality and a sensor of the second plurality, the order of receipt/output of signals from these sensors will provide information relating to a direction of movement of this activating element.

It is noted that this direction determination may also be obtained using a sensor of the first plurality and a single other sensor. The second plurality of sensors is not required in this respect.

In one embodiment, the signals received from the two series of sensors may be subtracted in order to remove noise affecting both signals. Especially when the sensors of the two series are positioned at different positions along the curve so that signals detecting the presence of a reader head will not overlap in time, a suitable noise reduction is possible.

In one embodiment, the controller is configured to short circuit non-selected coils, as is described above.

As mentioned above, a particular mode may be used where the predetermined signal, or a particular, predetermined signal, is output during a period of time during which an activating element moves over only half or another predetermined percentage of the curve.

Another aspect of the invention relates to a method of outputting a magnetic signal from one or more coils positioned along a predetermined curve at a surface of an element, a plurality of sensors being connected in series and each being positioned in the vicinity of the curve, the method comprising:
 a reader element or head travelling along the curve, sensing the magnetic signal,
 the sensors outputting a first series of signals caused by the reader element sequentially being in the vicinity of the sensors,
 feeding the coil(s) in accordance with the first series of signals output by the sensors to generate the magnetic signal.

As mentioned above, the coils may be positioned along any curve, straight or not. Any number of coils may be provided. Even a single coil outputting the signal over at least substantially all of the curve, or even just a portion thereof, may be used in this method, where the feeding of the coil may be affected by the signals received.

This aspect may be combined with any of the other aspects and embodiments of the invention.

The series connection normally means that the signal from one sensor may travel through other sensors before reaching e.g. a controller. This may be a daisy chain set-up.

In general, "in the vicinity" will mean that the sensors are positioned so as to be able to detect the reader element/head when travelling along the curve. This distance may be e.g. 10% or less of the first distance, such as 5% or less of the first distance or even 1% or less of the first distance.

This "travelling along the curve" may be a travelling above the curve or along a route parallel to the surface and in positions perpendicular to the surface from where the curve is defined. At least, the reader element/head should be able to sense the magnetic signal when output by the coil(s) when the coils are positioned at the curve, such as within the element and directly below a part of an outer surface of the element where the curve is defined. Naturally, the coil(s) may be displaced from the curve if desired. The magnetic field then may be increased in order for it to be detected at the curve.

The reader element/head may be in physical contact with an outer surface of the element while travelling along the curve or a predetermined distance may be provided there between. A non-zero distance may reduce the magnetic signal sensed but may reduce mechanical noise from the translation of the reader element/head over the surface.

The reader element/head may comprise any type of sensor for sensing the magnetic signal or flux, such as a coil, a Hall sensor or the like.

Each sensor being positioned in the vicinity of the curve will sense the presence of the reader element/head and output a signal. When the sensors are positioned at different longitudinal positions along the curve, the reader element/head travelling along the curve will activate the sensors at different points in time, whereby a series of signals are output by the sensors.

Thus, from the timing of these signals, the actual position, and/or a velocity/acceleration, of the reader element/head may be determined. On the basis thereof, different feeding strategies of the coil(s) may be used.

In one example, a period of time may be estimated during which the reader element/head will travel a predetermined proportion of the curve, and the signal fed to the coil(s) may be adapted accordingly. The faster the relative movement of the reader element/head vis-à-vis the element, the shorter may the available time be for outputting the magnetic signal. Thus, the coil(s) may be fed accordingly.

Often, the magnetic signal represents a value or a series of values, such as a binary signal, where the period of time available for outputting a bit or the series of bits/values may be varied. Thus, the overall period of time required for outputting the predetermined signal to the coil(s) may be varied to ensure that the desired signal is output within the period of time available.

In that or another situation, which may be combined with the first situation, the position of the reader element/head may be used for selecting which one or which ones of multiple coils to operate (have output the magnetic signal). Such operated coils may be selected in accordance with the determined position (which may be represented by the number of signals received from the sensors during this "run").

In one embodiment, the feeding step comprises sequentially feeding one or more of a plurality of the coils (preferably along a direction of the curve), where the coil(s) fed is/are selected on the basis of the signals of the first series of signals, such as the number of signals received.

In that situation, a next coil along the curve may be fed, when a next signal is output by the sensors. In this situation, a sensor may be provided between each pair of neighbouring coils. Also, when a next signal is output by the sensors, a longest fed, still fed, coil may be identified, where after this coil is no longer fed. In this manner, the operated coil(s) are the same in number but will be sequentially moved along the curve, such as following a position of the reader element/head. If, initially, multiple coils are fed, so that all are fed the same amount of time (except possibly the outermost coils), the coil the farthest from the next coil to be operated is turned off.

In one situation, the feeding step comprises short circuiting not-fed coils, as is described above.

As indicated above, a second sensor may be provided for aiding in sensing the reader head and in particular to ensure that the first sensing thereof is correct. Above, it is described that the second sensor preferably is positioned at an extreme sensor of the series of sensors or between this sensor and the edge portion. However, second sensors may be provided at multiple positions along the curve if desired. The second sensor may be of the same or another technology or suited for sensing another parameter, such as a different angle of magnetic field lines. In one situation, the first sensor and the second sensor are coils with non-parallel symmetry axes. The second—or the first—sensor may be formed as a winding around a core of a first coil, or a first coil may be used as the sensor.

In one embodiment, the method further comprises the step of a second plurality of sensors positioned in the vicinity of the curve and being connected in series outputting a second series of signals, where the feeding step comprises feeding the coils also in accordance with the second series of signals. In this manner, not only a position or velocity of the reader element/head may be determined but also a direction of movement along the curve.

Thus, in one embodiment, the feeding step comprises selecting one or more first coils to feed on the basis of a timing relationship between a first signal output from the series of sensors and a first signal output from the second series of sensors. This step also may comprise the determination of a direction of the next coil(s) to be fed.

As mentioned above, the signals from the two series of sensors may be subtracted in order to reduce noise.

Yet another aspect of the invention relates to a method of producing an element comprising a plurality of coils provided along a predetermined curve at or on a surface of the element, the method comprising:
  providing a basic element having a surface comprising at least 3 electrically conducting areas,
  providing a helical coil having a predetermined length,
  providing electrical connections between pairs of a conducting area and a separate part of the coil.

In this context, the plurality of coils are generated by dividing the helical coil into individual coils defined by the, separate, parts of the helical coil between adjacent pairs of conducting areas.

This aspect, as all other aspects and embodiments of the invention, may be combined with any of the other aspects and embodiments of the invention. Thus, this element may be shaped to the desired card-shape and the coils positioned as preferred in relation to credit card tracks.

The curve may e.g. be defined in relation to an outer surface of the element wherein the helical coil, conducting areas and electrical connections are provided. The basic element may also be positioned within the element or may form part of an outer surface thereof if desired.

The conducting areas may be positioned directly below the parts of the outer surface defining the curve, and the helical coil may be brought to follow the curve before, during or after the providing of electrical connections.

The step of providing the electrical connections may comprise fixing or fastening the parts of the helical coil to the individual conducting areas. This may be obtained by e.g. the use of glue, soldering and/or welding.

The basic element may be a Printed Circuit Board (PCB), such as a flexible printed circuit board, having an outer surface with the conducting areas.

The helical coil may have any cross section (perpendicular to a longitudinal axis), such as circular, elliptical, triangular, rectangular, square, pentagon, hexagonal or the like. A helical coil has a number of windings, of a conducting material, around the longitudinal axis.

The helical coil may be made of a coiled, electrically conducting element, such as a wire or thread, possibly wound around a core material or a bobbin. Alternatively, the coil may be made of one or more PCBs forming, together with one or more vias, the windings. The outer surface of a PCB may have exposed conducting strips forming part of the windings and may thus be brought into contact with the conducting areas.

The longitudinal axis may be straight or bent. Often the helical coil will be provided with a longitudinal axis corresponding to the curve shape (bent, straight or the like). Otherwise, the helical coil may be deformed (bent, straightened out) to fit the curve before or during (but it would also be possible after) the step of providing the electrical connections.

The providing of the electrical connections may be the providing of electrical connections to, for each conducting area, an individual winding of the helical coil or the connection, for each conducting surface, a number of neighboring windings.

In one embodiment, the step of providing the basic element comprises providing a basic element with at least 4 electrically conducting areas and wherein the step of providing the electrical connections comprises connecting the areas to 4 different portions of the coil. Obviously, three conducting areas results in two coils, and four conducting areas in three coils. The number of the resulting plurality of coils will be defined by the number of conducting areas. Any number of resulting coils may be selected, as is explained above.

As described above, a sensor may be embodied as one of the coils or may be formed as one or more windings around a core of a coil. In this particular aspect of the invention, a separate sensor may thus be formed by two electrically conducting areas and a part of the coil, which then may be used as a sensor instead of or in addition to its operation as a coil for outputting a magnetic field. Preferably, the ends of the helical coil are electrically connected to each of two of the conducting areas, such as extremely positioned conducting areas along the curve.

In one embodiment, the method further comprises the step of providing a controller and electrically connecting the controller, directly or via another element, to each of the areas. In one situation, the controller may be fastened to the basic element so that the electrical connections from the controller to the conducting areas may form part of the basic element, such as conducting areas of a PCB. Naturally, the controller may be any type of circuit and may be formed by a single element or a combination of circuits, such as a controller and a switching element feeding signals from the controller to the coils.

The resulting assembly may be operated as described in the other aspects of the invention.

Another aspect of the invention relates to an assembly for outputting a magnetic signal, the assembly comprising:
  a basic element comprising at least 3 electrically conductive surface areas, a helical coil fixed in relation to the basic element, different portions of the coil being electrically connected to different ones of the surface areas.

As always, this aspect may be combined with any other aspect and embodiment of the invention.

In this connection, the assembly preferably is a single unit comprising the basic element and the coil fixed in relation to each other where the coil, the conductive areas and the electrical connections are provided within the element.

As mentioned above, the basic element may be an electrically non-conducting element having therein or thereon conducting elements, such as a PCB. The conductive surface areas being formed in or on an outer surface of the basic element so as to be connectable to the coil.

At least 3 conductive areas are provided. The number of the conductive areas defines the number of individually operable coils formed. The positions of the conductive areas are preferably defined by a desired curve or track of a reader element/head used for detecting the magnetic signal output by the resulting coils.

The helical coil has a plurality of windings around a longitudinal axis which preferably has the same shape, such as when projected on to a predetermined plane, as the curve when also projected on to the plane.

The different portions of the coil electrically connected to the surface areas may be parts of a single winding or parts of neighbouring windings of the helical coil, so that a conductive area may be electrically connected to several neighbouring windings.

In one embodiment each of the portions of the helical coil is fixed to a separate surface area. This fixing may e.g. be obtained by using glue, soldering and/or welding or the like. In other situations, the portions may be fixed to or biased toward the surface areas, such as when the elements are laminated between other layers, such as when forming a credit card like assembly.

In one embodiment, the assembly further comprises a controller electrically connected to the areas. This controller may be fixed to a surface of the basic element to which the conductive areas are fixed or in which they are formed. This surface then may be covered by another element, such as a sheet of a plastic material, to seal and protect the electrical elements.

Additional elements, such as additional controllers, antennas, batteries, memory circuits or the like may also be provided if desired. In addition, a sensor may be provided which is configured to output a signal when being operated by a person, such as a deformation sensor, a fingerprint reader or the like, where the controller may be configured to output the signal only when having received a signal from the sensor, such as when a user has correctly identified him/herself using/via the sensor.

Naturally, the controller is preferably connected to the sensors including any second sensors in order to determine the position of the reader head. The second sensor may, if provided, be used as a manner of ensuring or qualifying a pulse or signal as a first sensing of the reader head so that subsequent pulses may be used for determining the true position of the reader head.

One aspect of the invention relates to a method of transferring a magnetic signal, the method comprising:
one or more transmission coils outputting the magnetic signal which, over time, has a sequence of opposite peaks,
a receiving coil receiving the magnetic signal and outputting an output signal which, over time, has a sequence of opposite peaks and, apart from in the vicinity of the peak values, a predetermined minimum slope of 10% multiplied by a signal value difference between peak values of two, opposite neighbouring peaks divided by the time elapsed between the outputting of the two peak values.

Naturally, this aspect may be combined with any other aspect and embodiment of the invention, such as the manner of driving the transmitting coils, sensing of a position of the receiving coil, manner of providing the transmitting coils and the like.

In this respect, the transmitting coil(s) may be as the coils provided in an assembly as described above in relation to the other aspects. A single transmission coil may be used or a sequence or groups of coils may be used. Helical coils, planar coils or combinations may be used, as may any other coil structure or element capable of outputting a variable magnetic field.

The term "vicinity" in this connection will mean outside of the peak, where the slope naturally will be zero. The "vicinity" may be the parts of the signal having a duration, on either side of the peak value (zero slope) of e.g. 10% or less, such as 5% or less, such as 1% or less of a time duration between two opposite, neighbouring peaks. The "vicinity" may also be defined as all parts of the signal which have a slope of at least a predetermined amount, such as a slope of at least 1% multiplied with the signal value difference.

A peak in the output signal usually will be a local minimum/maximum in the output signal, such as a local maximum or minimum in a current or voltage.

Often, a peak is a sharp peak having a duration, such as FWHM of less than $\frac{1}{3}$, such as less than $\frac{1}{4}$, such as less than $\frac{1}{5}$, such as less than $\frac{1}{10}$ of a time elapsing between two neighbouring, opposed peaks in the output signal.

Also, the magnetic signal may have peaks which may be local maxima or minima in a magnetic flux or other quantification of the strength of the magnetic field, such as the size of the E field or the H field, or the magnetic field strength, for example.

The receiving coil preferably is positioned close to the transmitting coil(s) during transfer of the magnetic field. The receiving coil may be stationary or moving in relation to the transmitting coils during transfer of the magnetic field.

A sequence of peaks is seen when peaks are seen at different points in time. A sequence of opposite peaks are seen when altering maxima and minima are seen.

The slope of the signal may be the slope of the value or a quantity, over time, describing the output signal and in particular a strength thereof. The slope may be determined as a variation in this quantity over time (differentiation).

Naturally, the slope will be zero at the peaks (this is a definition of a local maximum/minimum), but at other positions of the signal, over time, the slope is at least the 10% of a value calculated from a minimum signal value (one peak) and a maximum signal value (opposite, such as a neighbouring peak) (this may also be seen as the overall bandwidth of the signal) divided by the period of time it takes the signal from the first peak to the next peak.

It has been found that at least when multiple output coils are fed with different signals, such as when different tracks are desired, detection of the signal output by one coil or one group of coils may be noise sensitive when the slope of the output signal is too low.

Naturally, the minimum slope may be even higher, such as at least 15% of the above value, or even at least 20%, 25%, 30%, 40%, 50%, 60%, 70%, 75%, 80% or at least 90% of the value.

In a preferred embodiment, the signal represents a binary, F2F encoded signal.

In one embodiment, the output signal, for at least a predetermined period of time after the outputting of each peak, has an at least substantially predetermined slope. In this manner, especially when a detecting circuit is used which detects peaks, but which detects a peak after a predetermined delay after the actual peak occurs, a similar detection of the peaks may be obtained, so that differences in points in time of detection of two neighbouring peaks corresponds, such as within 10% or less of the time elapsed, to the actual difference in points in time of the outputting of the pertaining peaks. The predetermined period of time may be at least 5% of a period of time, such as 5-20% of a period of time elapsed between two neighbouring peaks, such as at least 10% of that time. The at least substantially the same slope may be a slope within 10%, such as within 5% of a mean slope of the signal within the predetermined period of time of at least 5 consecutive peaks.

In one embodiment, the signal represents a binary signal having a first and a second binary values, where the first binary value represented by two opposite, neighbouring peaks and where the second, other binary value is represented by a single peak. In this manner, the signal and advantages described above and in relation to the drawings is seen, such as when the signal is F2F encoded. In this manner, even when the period of time of outputting each binary value is the same, the slope of the signal when outputting the other binary value may be kept sufficiently high to reduce noise sensitivity.

Preferably, the step of outputting the magnetic signal comprises feeding an input signal to the one or more coils. This input signal may be a voltage and/or a current and often will correspond to the magnetic field desired output. Thus, the input signal fed to the coil(s) may have a quantity, usually a voltage or a current, corresponding to a quantity of the magnetic field, such as the strength of the magnetic field, over time. Thus, the input signal fed to the coil(s) preferably also has the sequence of opposite peaks and may represent the binary values etc.

This aspect of the invention is especially interesting when also one or more second output coil(s) output another magnetic signal, such as having the same characteristics (the same minimum slope outside of the peaks), to another receiving coil. Naturally, the characteristics may be different. In one situation, the bit duration or bit time may differ, such as that of one track being about twice that of another. In this manner, simultaneous detection of the two signals may be less noise sensitive due to the minimum slopes. These output coils may be arranged and used as the above-mentioned tracks of a credit card.

Another aspect of the invention relates to an assembly comprising a receiving coil, one or more transmitting coils and a processor connected to the transmitting coils, where the processor is configured to output a voltage and/or current signal to the transmitting coils to cause the coils to output a magnetic signal, the voltage/current signal having, over time, a sequence of opposite voltage/current peaks, the receiving coil being configured to receive the magnetic signal and output an output signal which has a number of opposite voltage/current peaks and, apart from in the vicinity of the peak values, a predetermined minimum slope of 10% multiplied by a signal voltage/current difference between peak values of two, opposite neighbouring voltage/current peaks divided by the time elapsed between the outputting of the two peak values.

In principle, the assembly may have any shape, but the shape and contents mentioned above in relation to the other aspects of the invention are preferred, such as the credit-card shape, the use of the transmitting coil(s) as one or more tracks thereof etc.

The receiving coil usually will be a part of a reader head, but any type of coil or reader may be used. Other types of sensors of magnetic fields may also be used if desired. The coil may be moved in relation to the transmitting coils or stationary during the transmission of the magnetic field.

Naturally, this aspect may be combined with any of the other aspects and embodiments, such as the manner of driving the transmitting coils, the structure thereof, the types, the dimensions, the sequential operation if desired, the manner of providing the transmitting coils and the like.

The processor may feed the coil(s) directly or control the feeding thereof in any manner desired. The processor may, as is described above, be a single or multiple elements, depending on the number of tasks this element is to handle etc.

The coils may be any of type and one or multiple coils may be used as may different types of coils, if desired.

Again, the peaks often will be local maxima or local minima of a quantity describing the signal over time, such as a strength of the magnetic field.

Naturally, the minimum slope may be even higher, such as at least 15% of the above value, or even at least 20%, 25%, 30%, 40%, 50%, 60%, 70%, 80%, 90%, 95% of the value.

As mentioned above, a digital signal may be received and converted into the voltage/current signal and output to the coil(s).

In one embodiment, the voltage signal represents a binary, F2F encoded signal.

In one embodiment, the voltage/current signal, for at least a predetermined period of time after the outputting of each peak, has an at least substantially predetermined slope. This is to obtain the advantages described above.

In one embodiment, the voltage/current signal represents a binary signal having a first and a second binary values, where the first binary value represented by two opposite, neighbouring peaks and where the second, other binary value is represented by a single peak. This is described above.

This aspect of the invention has the advantage that when sensing the magnetic signal (using a reader head for example), the detection may be less noise sensitive. This is especially an advantage when the assembly further has one or more second coils also receiving a signal from the processor (or another processor) and outputting a magnetic signal, which may have the same characteristics as the first magnetic signal. In this situation, the minimum slope will make the detection of the signal less noise sensitive. Preferably, the first and second coils are positioned so as to output the magnetic fields along parallel curves or tracks over a surface, as described above in relation to the providing of different tracks of a credit card.

Another aspect of the invention relates to a method of generating a first magnetic signal using one or more first coils and a second magnetic signal from one or more second coils,
the first magnetic signal having, over time, a first sequence of opposite peaks, the second magnetic signal having, over time, a second sequence of opposite peaks and, during one or more predetermined periods of time, a slope below 10% multiplied by a signal value difference between peak values of two, opposite neighbouring peaks of the second magnetic signal divided by the time elapsed between the outputting of the two peak values, the method comprising outputting the second signal from the second coil(s) and outputting the first signal from the first coil(s), where the outputting of the first signal comprises outputting the first signal to have the peaks of the first sequence outside of the predetermined periods of time.

This aspect may be combined with any of the aspects and embodiments of the invention.

An alternative definition of this aspect is one where a sensing coil senses the second magnetic signal and outputs an output signal also having a sequence of opposite peaks and having a slope below 10% multiplied by a signal value difference between peak values of two, opposite neighbouring peaks of the output signal divided by the time elapsed between the outputting of the two peak values.

In this embodiment, the first and second coil(s) may each be a single coil or multiple coils, as are described further above. Any type of coil may be used as may combinations of coil types if desired. The first and second coils may be different in number, type and the like.

Preferably, the first and second coils are positioned so as to output the magnetic fields along parallel curves or tracks over a surface, as described above in relation to the providing of different tracks of a credit card.

In this aspect, the physical distance between the first and second coils, such as between curves along which the first/second coils are positioned, may be 0-10 mm, such as 0-5 mm, such as 0-3 mm, such as 1-2 mm. The distance may be that described as the distance between tracks according to ISO7811-4. The distance may also be less than 10%, such as less than 5%, such as less than 2%, such as less than 1% of the first distance.

The opposite peaks over time may be as the above local maxima/minima of the signal, such as a quantity thereof, such as a strength of the magnetic field.

The minimum slope is described further above.

Preferably, the predetermined periods of time do not comprise the peaks of the second sequence. The points in time of outputting the peaks of the second sequence are preferably selected to be outside of the predetermined periods of time.

Preferably, the peaks of the first and second signals are output at equidistant points in time or at points in time where the time difference between neighbouring peaks of the first and/or second sequence is a predefined period of time or twice the predefined period of time.

Thus, points in time of outputting peaks from the first and second signals may be correlated, whereby a time offset may be determined so that no peaks of the first signal fall within the predetermined periods of time. When using the F2F encoding, the bit times for "0" and "1" are preferably the same, so that the points in time of outputting the peaks are well-known and more or less periodic. The same may be the situation even if the bit times of the two signals are not the same, such as that of one signal is an integer times that of the other.

The predetermined periods of time of the second signal usually will fall between the points of time of the peaks of the second sequence.

The predetermined period of time may be 20% or less, such as 10% or less, of a period of time elapsing between the outputting of the two neighbouring peaks between which the predetermined period of time and the low slope is seen.

In one embodiment, the predetermined period of time falls around a point of time at a centre of a period of time elapsing between the two neighbouring peaks between which the low slope is seen. In that situation, the first signal may be, when the time difference between neighbouring peaks of the first and second signals are at least substantially the same, offset by e.g. 25% of the time difference between the neighbouring peaks.

Another advantage of the offsetting of the peaks is that when simultaneous peaks in multiple tracks is avoided, a lower peak power consumption is obtained.

Thus, the method may comprise the sensing, such as by a reader head or element, of the second magnetic signal or both magnetic signals (then, simultaneously, preferably). This sensing may be followed by a conversion of the signal to e.g. a binary signal/information.

Another aspect of the invention relates to an assembly comprising one or more first coils and one or more second coils and a processor connected to the first and second coils, the processor being configured to output a first signal to the first coil(s) and a second signal to the second coil(s), where:
the first magnetic signal has, over time, a first sequence of opposite peaks,
the second magnetic signal has, over time, a second sequence of opposite peaks, and, during one or more predetermined periods of time, a slope below 10% multiplied by a signal value difference between peak values of two opposite, neighbouring peaks of the second magnetic signal divided by the time elapsed between the outputting of the two peak values,
the processor being configured to output the first signal to have the peaks outside of the predetermined periods of time.

This aspect may be combined with any of the above aspects and embodiments.

As mentioned above, this aspect may alternatively be defined as one where the second magnetic signal is sensed by a sensing magnet (or other magnet sensing element) outputting an output signal with a sequence of opposite peaks and, during one or more predetermined periods of time, a slope below 10% multiplied by a signal value difference between peak values of two opposite, neighbouring peaks of the output signal divided by the time elapsed between the outputting of the two peak values.

In this context, the assembly may have any shape, such as any of the assemblies described in relation to any of the other aspects of the invention. Thus, the first and second coils may be provided along parallel curves, such as different tracks of a credit card.

Again, the processor may be of any type and may be monolithic or formed by multiple elements. The processor may drive all coils directly or indirectly, and different processors may drive the first and second coils.

The first and second coils may be different in number, type, or the like.

Different signals may be fed to the first and second coils. Above, the signals used for obtaining the desired magnetic signal are described.

The advantage of ensuring that the peaks from the first signal are not output when the second signal has its low slope is that detection is less noise sensitive.

Yet another aspect of the invention relates to an assembly comprising:
an outer surface bounded by at least a first and a second edge portion,
a plurality of coils arranged at least substantially along a predetermined curve at the surface, the curve having a first length and extending between a first and a second points on the surface,
a controller connected to each of the coils, the controller being configured to receive a signal from one or more first coils of the coils and feed a signal individually to each of one or more second coils of the coils.

Overall, the assembly may be the card-shaped element described above, and all features and parts thereof described may be used in this assembly.

The plurality of coils mentioned above in the remaining aspects of the invention may be employed and they may be embodied (flat, coiled, serially connected and the like) and operated (sequentially if desired) as described above.

The curve may be as that described above and the positioning of the coils along the curve as well.

The signal fed to the second coils represents information to be output from the assembly as or embedded in or encoded in a magnetic field or signal and usually transferred to a reader via a reader head receiving the magnetic field or signal.

The controller may be of the types described above and is configured to feed a signal to each individual coil. The controller thus is connected to each coil either directly or indirectly, as is also described above.

According to this aspect of the invention, the controller is also configured to receive a signal from one or more first of the coils used for generating the magnetic field to be output from the assembly.

Such signals may be used to, as Is described above using separate sensors, determining a position of a reader head and thus for controlling which of the coils to feed.

Naturally, as is also described above, any number of second coils may be used. This number may vary over time, and which coils are fed and thus second coils usually will differ over time.

Also, the number of first coils may be selected freely. A second coil may also act as a first coil if desired, so in principle, all coils may be first coils. Therefore, 1, 2, 3, 4, 5, 6, 7, 8, 9, 10, 11, 12, 13, 14, 15 of more first coils may be used. This number may vary over time.

The first coils may be positioned strategically along the curve, such as equidistantly, if desired, in order to determine a parameter along the curve, such as a presence of a reader head or an element of metal, magnetic material, dielectric material, paramagnetic material or the like.

Alternatively, the first coil(s) may be selected depending on the second coils fed at a particular point in time, whereby which coils are first coils may also vary over time.

The signal from the first coils may be generated in a number of manners. In one situation, the coil may passively receive magnetic field lines generated by the second coil(s) and thus generate a current which may be sensed and used for determination of e.g. the strength of the magnetic field. This current may vary, if a metallic, magnetic and/or reader element or reader head approaches the first coil and thus interferes with this magnetic field. In another situation, a current may be fed to the coil. The presence of a metallic, magnetic and/or reader element or reader head will affect the inductance of the coil will be affected by this metallic, magnetic and/or reader element or reader head, whereby the current flow and current consumption of the coil will depend on the presence of and distance to the metallic, magnetic and/or reader element or reader head.

In order to enhance this effect, it could be desired to actually feed an additional signal to the first coil(s), whereby the coil parameter change may be determined from the power/current fed to and absorbed in the coil.

In that situation, a frequency of this additional signal could be adapted to a resonance frequency of the coil(s), whereby the detected load change caused by the reader head presence will be higher.

This additional signal may be output as an additional magnetic signal from the first coils. Therefore, the additional signal and/or additional magnetic signal may be selected with a frequency or amplitude which does not interfere too much with the magnetic signal/field output by the second coils. For example, a higher frequency, such as a frequency 4, 6, 8, 10, 20, 25, 50, 100, 1000 times or more higher than e.g. a bit rate of information embedded in the signal fed to the second coils.

Also other manners exist of using a coil for detecting e.g. a metallic, magnetic and/or reader element or reader head, such as a change in coil Q (a quality measure) which is typically seen as a change in a number of free running oscillations in a tank circuit or as an impedance change in a tank circuit, where the Q value of the coil is the determining part.

In one situation, the first coil(s) and the second coil(s) are non-overlapping groups of coils. Thus, a second coil fed a signal to output a magnetic field is not simultaneously used for sensing. Naturally, as is also described above and further below, over time, the coils fed may change, so that a coil presently used for sensing may later be fed to output a magnetic field. Then, later, one or more other coils may be used for sensing, such as coils presently fed.

In this situation, it may be desired to have at least one first coil be adjacent to a second coil. In this context, adjacent to will often mean along the curve, but will normally be a coil which is not a second or fed coil and which is as physically close to the second coil as possible.

Naturally, multiple first coils may be used, all of which may be neighbouring to a second coil, or others of which are selected in accordance with the neighbouring first coil.

Above are described different manners of selecting coils of which some or all are fed (and thus are second coils) and are provided in a particular pattern or sequence which may be shifted along the coils on the curve. In the same manner, in general, a number of coils may be selected one more of which are first coils which are also provided in a particular pattern which may be shifted along the curve. This pattern may be selected to either support detection of e.g. a reader head at a particular position of the pattern/sequence or within a broader area of the pattern/sequence.

In one situation, the controller is configured to select a plurality of neighbouring coils and determine therefrom, a first coil and a plurality of second coils, the second coils being positioned on either side of the determined first coil. Thus, on or more of the second coils are provided on one side, along the curve, of the first coil, and one or more other second coils are provided on the other side of the first coil.

In this situation, in one embodiment, it may be desired that the second (coil(s) on one side of the first coils is/are operated/fed to have a magnetic field, in the coils, directed in one direction and that the second coil(s) positioned on the other side of the first coil is/are operated to have a magnetic field in a direction at least substantially opposite to the one direction, and in another embodiment, the directions may be more or less the same. The first embodiment may be relevant when the directions are at an angle to, such as perpendicular to, the surface, and the other embodiment may be suitable when the directions are parallel to the surface. Naturally, angular deviations, such as within 30 degrees or within 20 or 10 degrees could be present.

In one situation, the controller preferably is configured to select a plurality of neighbouring coils and determine therefrom, a first coil and a plurality of second coils, the second coils being positioned on only one side of the determined first coil.

In this situation, in one embodiment, it may be desired that the second (coil(s) adjacent to the first coil is operated/fed to have a magnetic field, in the coil, directed in one direction and that the remaining second coil(s) is/are operated to have a magnetic field in a direction at least substantially opposite to the one direction, and in another embodiment, the directions may be more or less the same. The first embodiment may be relevant when the directions are at an angle to, such as perpendicular to, the surface, and the other embodiment may be suitable when the directions are parallel to the surface. Naturally, angular deviations, such as within 30 degrees or within 20 or 10 degrees could be present.

The selections of the second coils and the different patterns/sequences are described above.

In a particularly desired embodiment, the controller is configured to determine, from the signal(s) from the first coil(s), a position, direction and/or velocity of a metallic, magnetic and/or reader element or reader head and determine, from the determined position/direction/velocity, the second coils. Then, the above-mentioned functionality of selecting the (second) coils to feed may be used.

Then, it may be desired that the controller is configured to operate in a loop where the position/direction/velocity is determined from the first coil(s), where after suitable second coil(s) is/are selected in accordance therewith. Then, suitable (other) first coil(s) may be selected to suit the second coil(s) or the determined position/direction/velocity, and this loop may then be repeated to adapt to, follow or detect the movement of the metallic, magnetic and/or reader element or reader head along the curve.

In a different embodiment, at least one first coil is also a second coil, so that this coil has dual functions. Naturally, a combination may exist where some coils have both functions and others only one—and further others may not be operated at all at that point in time.

In this embodiment, the controller is preferably configured to determine, from the signal(s) from the first coil(s), a position, direction and/or velocity of a metallic, magnetic and/or reader element or reader head and determine, from the determined position/direction/velocity, the second coils.

Thus, the purpose of the use of the first coils may be same as that described above. Also, the first and/or second coil(s) may be selected on the basis of this position/direction/velocity, and these coils may be continuously or intermittently adapted over time, as this position/direction/velocity changes.

Especially the above-mentioned manners and patterns/sequences of operating the second or fed coils are equally useful in this aspect and embodiment. The first coil(s) may now be chosen freely at a position where the sensing is especially suitable, easy or the like.

When the same coil is both fed a signal to output a magnetic field and is used to sense a metallic, magnetic and/or reader element or reader head, the sensing step naturally has to take into account that a signal is fed to the coil at the same time. A number of manners of obtaining this are available.

The signal received from the coil will be affected by a presence of the metallic, magnetic and/or reader element or reader head, such as due to an inductance of the coil changing simply due to the presence of this material. This change in impedance may affect a current flow or current consumption in the coil, which again may be determined.

In addition or alternatively, an additional signal may be fed to the coil, the effect of which may then be used. This additional signal may be selected to have a frequency different from the signal fed to the coil to have a predetermined magnetic signal output for transfer to e.g. a reader. The different frequency may selected so that a corresponding effect on the magnetic field does not interfere with the desired detection or interpretation of the desired magnetic field and information in or at the reader. In a preferred embodiment, the different frequency may be selected higher than a frequency, such as 2 or 4 times the bit rate of the Information sought transmitted by the magnetic field, so that any overlayed higher frequency signal is filtered away in the reader. Alternatively, the additional signal may be provided with an amplitude sufficiently small to not affect the reader too much.

In the assembly, the additional signal may then be used to determine the parameter, such as a presence of the reader head or the like. This may be due to a change in the additional signal due the change in the coil caused by this presence.

Alternatively, as is described above, a change in coil behaviour may be seen by the coil being differently exposed to magnetic fields from the other second coils depending on whether the reader head or the like is present or not and how far it is away. The above situation where magnetic field lines are more or less blocked by the reader head or the like and thus prevented from reaching this coil also applies when this coil is also a second coil.

Naturally, the above features of sequentially shifting the operated coils, the shifting at or close to zero crossings in the current applied to the coils, the optional reversing of the phase of the signal fed to the coils etc. are equally applicable in this aspect of the invention.

Also, additional sensors, such as those described above, may be used for determining the position/velocity/direction or at least aid in this determination if desired.

Naturally, the controller may be configured to derive other parameters from the signal(s) received from the first coil(s) than the position/direction/velocity, such as an amount of such a material. This parameter may be used for characterizing a reader, as is described above.

Another aspect of the invention relates to a method for generating a magnetic field, the method comprising receiving a signal from one or more first coils of a plurality of coils sequentially positioned along a curve within an element while feeding one or more second coils of the plurality of coils.

The magnetic field may have the same contents and be generated as described above. The coils may be of the same types and have the positions as described above. The sequential positioning is described above.

As described above, a number of advantages are seen when the feeding step comprises sequentially feeding second coil(s) over time. Above, different patterns of fed or second coils are described, where different patterns have different advantages.

This sequential feeding means that when one coil is fed, a next coil along the curve is fed next, and if one coil is not fed, the next coil along the curve is subsequently fed, when a shift has taken place.

In one embodiment, the first coil(s) and the second coil(s) are non-overlapping groups of coils. Then, the second coils may be operated as described above and any not-fed coils may be used as first coils.

In one situation, at least one first coil is adjacent to a second coil, where adjacent to means either neighbouring along the curve and/or that coil which is physically closest.

In one situation, a plurality of neighbouring coils are selected, where a first coil is determined as one of the selected coils, and a plurality of second coils are determined from the selected coils, such as the remainder of the selected coils, the second coils being positioned on either side of the determined first coil. This is described above, and the advantage is seen when the optimal position of the reader head is above the centre of the coil between the fed coils, i.e. above the first coil.

In another situation, a plurality of neighbouring coils are selected and a first coil is determined as one of the selected coils, and a plurality of second coils are determined from the selected coils, such as the remainder of the selected coils, the second coils being positioned on only one side of the determined first coil. This is also described above, and the advantage thereof is seen when the optimal position of the reader head is at or around the first coil or the second coil adjacent thereto.

Preferably, a position, direction and/or velocity of a metallic, magnetic and/or reader element or reader head is determined, wherein the second coils are determined from the determined position/direction/velocity. Above, different considerations relating to how to select the fed coils in relation to the determined position are described. Also, the sequential determination of second coils when the material/reader head moves is described above.

In one situation, next first coil(s) are determined, subsequent to the determination of the second coils, a signal is fed to the second coils and a signal is received from each next first coil.

Thus, the first coil(s) may also be sequentially selected in the same manner as the second coil(s). The sequential position of the actual first coil(s) would usually follow that of the second coil(s) so that a sequential movement along the curve would be used for both the second and first coils.

Then, when the position of the material or reader head has changed, other second and first coils may be determined and operated as described, so that the changed position may be accounted for.

In one embodiment, at least one first coil is a second coil, so that the same coil is operated in both functions. Then, a position, direction and/or velocity of a metallic, magnetic and/or reader element or reader head is determined from the signal(s) from the first coil(s) and the second coil(s) is/are determined from the determined position/direction/velocity.

The operation of the second coils may again be as described above, as may the operation of the first coil(s), where the difference is that now the same coil may perform both functions. The difference here mainly is in the manner in which the signal from the first coil is treated. This is also described above.

Normally, a parameter is derived from the signal(s) received from the first coil(s) and the position/direction/velocity is determined from the parameter. Alternatively, the position may be determined directly, which is rather seldom.

The parameter may be a change in induction or Q value of the first coil, which parameter may be converted into a distance between the first coil and e.g. a reader head.

Another aspect relates to an assembly comprising:
an outer surface bounded by at least a first and a second edge portion,
a plurality of coils arranged at least substantially along a predetermined curve at the surface, the curve having a first length and extending between a first and a second points on the surface, the first point being positioned within a first distance of 20% of the first length or less from the first edge portion and the second point being positioned within a second distance of 20% of the first length or less from the second edge portion,
a controller connected to the coils,
the controller being configured to:
select one of the coils,
provide a signal to two coils adjacent to the selected coil so that magnetic fields output by the two coils, between a centre of the individual coil and the selected coil and above the surface and projected on to the curve, has the same direction, along the curve.

This aspect may be combined with any other aspect and embodiment of the invention. Thus, the manner of manufacturing the assembly, the type, position, direction of the coils, the manner of operating the coils and the like described in the other aspects may be used.

Naturally, more than one coil may be selected, where the operated coils are then defined outside a plurality of neighbouring, selected coils. The operation would be the same.

Irrespective of whether the coils have an axis of symmetry parallel to or at an angle to the surface, a fed coil will output a magnetic field above the surface. When the two coils on either side of the selected coil output a magnetic signal having a direction (of the field lines for example) being in the same direction when projected on to the curve. Then, the two coils will generate a potential magnetic field over the selected coil, at least if a magnetically conducting element is positioned above the selected coil. A reader head usually is magnetically conductive and will thus sense (or even cause) the magnetic field over the selected coil.

The centre of a coil may be a centre of the material forming the coil. Projecting the magnetic field direction (field lines) existing between this centre (again projected on to the curve) and the selected coil (again projected) on to the direction, the resulting direction will be along the curve.

It is noted that the direction of the magnetic field may be reversed simply by reversing the current applied to the coil.

In one embodiment, the coils are at least substantially equidistantly positioned along the curve, and/or it may be desired that a first coil is positioned within 25% of the first length from the first point and wherein a second coil is positioned within 25% of the first length from the second point.

In one embodiment, the coils have symmetry axes at least substantially parallel to a plane of the first surface. Coils of this type normally are helical coils. Then, the controller preferably is configured to provide a signal to the two coils so that the magnetic field generated therein at centres thereof being, when projected on to the curve, in the same direction along the curve. In that situation, the magnetic fields above the surface will have opposite directions, but they will still have the same direction.

When the coils have symmetry axes in the plane of the surface, a common core element may extend within the coils.

In one embodiment, the coils have symmetry axes at an angle, such as at least substantially perpendicular, to a plane of the first surface. Coils of this type may be planar coils in the plane of the surface or helical coils with an axis at the angle to the surface. In this embodiment, the controller preferably is configured to provide a signal to the two coils so that the magnetic field generated therein at centres thereof being, when projected on to an axis perpendicular to the outer surface, in opposite directions. In this situation, the magnetic field generated at the centres will extend with the angle to the surface.

Preferably, the controller is configured to short circuit the selected coil. This short circuiting may be performed by providing the same signal to both conductor ends of the coil. Naturally, also the closest coils on the outer side of the fed coils may be short circuited.

In one embodiment, the controller is configured to output a signal to one or more additional coils adjacent to one of the two coils, so that a magnetic field output by each of the one or more additional coils, between a centre of the individual coil and the selected coil, above the surface and projected on to the curve, has the same direction, along the curve as that of the at least two coils.

Thus, additional coils, adjacent to one of the two coils, may be fed, as long as the magnetic fields output thereof act in the same manner as the one of the two coils. If the one coil and the additional coils are of the same type and has the same direction (of the axis), they may be operated to generate the same magnetic field (direction). Naturally, additional coils may be provided on either side of the selected coil, so that the coils adjacent to the other of the two coils act in the same manner as that other of the two coils.

Then, the above sequential operation may be used, so that the pattern of coils (one or more operated coils on either side of a selected coil which preferably is not operated) may be shifted along the sequence of coils. As described above, preferably multiple coils are operated, in this situation on each side of the selected coil, so that when bringing one coil out of operation and another into operation, one coil remains in operation in order to not cause a drop in the magnetic signal or field strength output.

As is also described above, it may be desired to use the selected coil as a sensor. Then, the selection thereof may be caused by that coil being the closest to a reader, and the two and potentially additional coils operated accordingly.

Naturally, multiple sets of coils and curves and tracks may be provided. Each track may, if desired, be operated in the above manner.

In another aspect, a method is provided for generating a magnetic field, the method comprising:
  selecting one of a plurality of coils positioned along a curve at a surface of an element comprising the coils,
  feeding at least two coils each being positioned adjacently to the selected coil so as to output, from the fed coils, magnetic fields which, between a centre of the individual coil and the selected coil, above the surface and projected on to the curve, has a the same direction, along the curve.

This aspect may be combined with any of the other aspects and embodiments of the invention, such as the desired dimensions of an assembly embodying the method, the operation of the coils, the manner of providing the coils, the dimensions etc.

Again, more than one coil may be selected, where the operated coils are then defined outside a plurality of neighbouring, selected coils. The operation would be the same.

In one embodiment, the selected coil and optionally also coils neighbouring the fed coils on the other side thereof may be short circuited.

In one embodiment, the feeding step comprises simultaneously feeding one or more additional coils being adjacent to one of the two coils so that a magnetic field output thereby, between a centre of the individual coil and the selected coil, above the surface and projected on to the curve, has the same direction, along the curve a plurality of neighbouring coils as that of the at least two coils.

One embodiment relates to the sequential operation of the coils in this "pattern". Thus, the feeding step preferably comprises stopping feeding of one or more but not all coils fed, continuing feeding one or more fed coils, and initiating feeding one or more coils neighbouring to each other and/or the one or more fed coils.

Naturally, the coils may form a plurality of sets of coils.

In one embodiment, the method further comprises the step of determining a position, direction and/or velocity of a metallic, magnetic and/or reader element and controlling the feeding step to feed coils at or in the vicinity of the metallic/magnetic/reader head. Preferably, the selecting step comprises determining a position of a reader element and selecting, as the selected coil, the coil being the closest to the reader element.

The operation naturally may also comprise the sensing of the field output. Thus, the method may further comprise the steps of:
  the reader head sensing the magnetic field and
  converting the sensed magnetic field into an electric signal.

A further aspect of the invention relates to an assembly comprising:
  an outer surface bounded by at least a first and a second edge portion,
  a plurality of coils arranged at least substantially along a predetermined curve at the surface, the coils having symmetry axes at an angle to a plane of the first surface,
  a magnetically conducting material extending along the curve, the coils being positioned between the outer surface and the conducting material, and
  a controller connected to the coils.

Preferably, the coils are planar or flat coils extending within a plane parallel to the surface.

In this context, a magnetically conducting material preferably is a material with $\mu r > 10$, such as $\mu r > 50$, preferably $\mu r > 100$, such as $\mu r > 500$, in order for the magnetically conductive material to be operative to collect and guide the field generated by the coils below the coils.

The operation of the magnetically conductive material is to "short circuit" the magnetic path on the opposite side of the coils than that at the surface so that less field strength is lost and a stronger field is output from the surface.

Naturally, this aspect may be combined with any of the other aspects and embodiments of the invention, such as the sequential operation, position, type, pattern or direction of the coils, the dimensions etc. of the assembly, the short circuiting of not-operated coils, and the like.

Thus, the curve can have a first length and extending between a first and a second points on the surface, the first point being positioned within a first distance of 20% of the first length or less from the first edge portion and the second point being positioned within a second distance of 20% of the first length or less from the second edge portion.

The coils may be at least substantially equidistantly positioned along the curve and/or a first coil may be positioned within 25% of the first length from the first point and wherein a second coil is positioned within 25% of the first length from the second point.

In one embodiment, the controller is configured to select a coil and provide a signal to two coils adjacent to the selected coil so that magnetic fields output by the two coils, between a centre of the individual coil and the selected coil and above the surface and projected on to the curve, has the same direction, along the curve. This is described above.

In that or another embodiment, the controller is configured to:
  select one of the coils,
  provide a signal to two coils adjacent to the selected coil so that the magnetic field generated therein at centres thereof being, when projected on to an axis perpendicular to the outer surface, in opposite directions.

In any of the above embodiments, the controller may be configured to feed a signal to an additional coil adjacent to one of the two coils and not being the selected coil, the fed signal causing the additional coil to output a magnetic field having, at a centre of the additional coil and when projected on to the axis, the same direction as the adjacent, fed coil. Thus, additional coils may be operated in the same manner to e.g. increase the magnetic field strength output or prevent a drop or discontinuation in the magnetic field output when operating other coils.

Another aspect relates to a method for generating a magnetic field, the method comprising feeding the two coils of the assembly according to the former aspect.

Again, this aspect may be combined with any of the other aspects, such as those relating to the operation of the coils, the sequential shifting of operated coils, the structure of the assembly, the dimensions and manners of providing the assembly and the like.

Another aspect of the invention relates to an assembly comprising:
- an outer surface bounded by at least a first and a second edge portion,
- a plurality of coils arranged at least substantially along a predetermined curve at the surface,
- a controller connected to the coils, the controller being configured to, at a first point in time, feed a time-varying signal to one or more first coils of the plurality of coils, and, at a second, later point in time feed the signal to one or more second coils of the plurality of coils, where the first coils are no longer operated and the second coils are operated when the time-varying signal is at or close to a zero-crossing of a voltage or a current.

This aspect may be combined with any other aspects or embodiments of the invention, such as the structure and dimensions of the preferred card-shape, the preferred positions, types, directions, groups/sets of coils, the sequential operation of the coils and the particular patterns of the desired magnetic signals output and the like.

Preferably, the first and second coils are non-overlapping. However, as will be described further below, third coils may be operated also during the bringing the first coils out of operation and the second coils into operation.

The time-varying signal, as is described above, preferably is a signal representing e.g. one or more values and which has a number of opposite peaks over time. These peaks are provided on either side of zero voltage/current. This signal is continuously fed to the coils, where a first part of the signal is initially fed to the first coils and an subsequent part then fed to the second coils. A further subsequent part of the time-varying signal may later on be fed to e.g. third coils if desired.

As described above, it has been found advantageous to bring a coil into (or out of) operation, such as by (or by not) providing a signal/power thereto at a point in time where the current or voltage fed to the coil is zero or at least substantially zero. It has been found that in this manner, all operated coils may be brought out of operation and formerly non-operated coils into operation without even seeing a signal peak in the reader heads.

The voltage/current in this situation is that of the signal fed to the coil(s) operated, In one embodiment, the controller is configured to stop feeding the signal to the first coil(s) and start feeding the signal to the second coil(s) when the voltage or current of the signal is less than 10% of a maximum voltage or current fed through the first coil(s) at any time. This maximum voltage or current may be that experienced during normal operation or e.g. in the previous predetermined period of time, such as one or more milliseconds, seconds, bits or the like. Naturally, the starting/stopping may be performed when the current/voltage is less than 5% of the maximum current/voltage.

In one embodiment, the assembly comprises a current sensor configured to output a signal to the controller, when the current fed by the controller to the coils reaches zero. This may be obtained by providing a current sensor configured to trigger the bringing of the coil into/out of operation.

Alternatively, a voltage sensor may be configured to output a signal at zero-crossings of the voltage.

When the signal output from the coils and the signal fed to the coils is a F2F-encoded signal, the voltage and the current will pass zero at various points in time. A binary "1" has therein a zero current passage, which may be used for the bringing of a coil into or out of operation.

Then, the bringing into/out of operation of the coil may be timed in relation to this zero-crossing by operating/not operating the coil at a predetermined period of time from the voltage zero-crossing. Naturally, the same may be obtained from any other pre-determined voltage (than the zero-crossing). The predetermined period of time will depend on the delay between the voltage and the current. In the present set-up, ⅛ of a bit-time is a suitable period of time from voltage zero-crossing to the bringing into/out of operation of the coil. An embodiment incorporating this may be based on an ASIC with mixed-signal circuits comprising a current sensor for timing the bringing into/out of operation of the coil(s).

Naturally, the plurality of coils are preferably positioned along a curve of an outer surface of the assembly.

In one embodiment, the second coil(s) is/are adjacent to the first coil(s) along the curve. Then, the shifting from operation of the first coils to the second coils may be the above-mentioned sequential shifting. Performing the shift at or near zero voltage/current has a number of advantages As mentioned above, the first coils may be a set of serially connected coils operated simultaneously, as may the second coils. Additional sets may be defined and operated if desired.

Another aspect of the invention relates to a method for generating a magnetic field, the method comprising feeding a time-varying signal to one or more first coils of a plurality of coils, when a voltage or current of the time-varying signal reaches zero, stopping feeding the signal to the first coils and starting feeding the time-varying signal to one or more second coils of the plurality of coils.

As mentioned above, the time-varying signal usually is pre-determined and a first part thereof fed to the first coils and a subsequent part fed to the second coils. The outputting of the signal may be controlled by e.g. a speed of a reader head travelling along the curve.

Naturally, one or more third coils of the plurality of coils may be fed the time-varying signal both when the first coils are fed and when the second coils are fed. Thus, the third coils are fed during the transition from feeding the first coils to feeding the second coils.

Naturally, the first and second coils may be positioned and operated to generate the above-mentioned desired patterns of magnetic field output by the coils. The sequential shifting may be used to shift these patterns, again controlled by the zero-crossings, along the curve.

Also, the first and/or second coils may be connected in series so that the coils are simultaneously fed and obtain the advantages described in relation to the sets of serially connected coils.

The method may further comprise the step of determining a position, direction and/or velocity of a metallic, magnetic and/or reader element and controlling the feeding step to feed coils at or in the vicinity of the metallic/magnetic/reader head. Again, the shifting of the feeding of the coils may be controlled by the zero-crossings, where the determination of which coils to shift to may be controlled by the position/direction/velocity of the reader element.

Thus, the determining step may comprise determining a position of a reader element and wherein the feeding step comprises feeding at least one coil having a predetermined positional relationship with the determined position.

In this context, the other conductor ends of the adjacent coils, and thus the outputs of the controller connected thereto, are not fed. This not feeding may be allowing such outputs to assume any voltage, i.e. to allow these to be defined by the voltage across the adjacent coils. The outputs may simply be allowed to "float", for example, or the outputs may be directly de-coupled from the conductor ends of the coils while maintaining connection between the conductor ends of the coils in order to allow a current to flow through the adjacent coils.

Naturally, the method may further comprise the steps of:
the reader head sensing the magnetic field and
converting the sensed magnetic field into an electric signal.

Yet another aspect relates to an assembly comprising:
an outer surface bounded by at least a first and a second edge portion,
a controller having a plurality of outputs,
a plurality of coils positioned sequentially along a predetermined curve at the outer surface, each coil having two end conductors, pairs of coils being defined, one end conductor of one coil of a pair and one end conductor of the other coil of the pair being connected too separate output of the controller,
the controller being configured to feed a plurality of adjacent coils by feeding a signal to the two outputs connected to only one end conductor of the adjacent coils while not feeding a signal to the output(s) connected to two end conductors of the adjacent coils.

Naturally, this aspect may be combined with any of the other aspects and embodiments, such as the manner of providing the coils, the dimensions, sizes, positions etc. of the preferred assembly, the manner of providing the coils, the manner of operating the coils, the coil positions, groups, sets, positions and types or the like.

In this context, the coils have end conductors through which the coil, such as a coiled portion of a conductor having the two ends, may be fed. These end conductors may also form part of a coiled portion.

A controller output may be an output of the actual controller, such as an output or a "leg" of the controller or an output of another circuit controlled by the controller, such as a switching element forwarding the signal from the controller to the coils. This switching element would normally be seen as a part of the controller.

The present structure is one where the coils, positioned in the sequence described above, are connected to the controller in a particular manner. The most extreme coils have one end conductor connected to a controller output but the other controller outputs are connected to an end conductor of two adjacent coils.

Naturally, each of the two fed outputs may be connected also to another coil, but this coil will not be in the adjacent, fed coils.

Thus, driving or feeding a number of adjacent coils is performed simply by feeding a signal through these coils using the two controller outputs connected to the most extreme end conductors of the two extreme coils of the coils to be fed.

In one embodiment, the controller is configured to:
at a first point in time, feed the plurality of adjacent coils by a first and a second output, and,
at a later point in time:
identifying a third output connected to one end conductor of a first coil, the other end conductor being connected to the first output, the first coil not being one of the adjacent coils,
identifying a fourth output connected to one end conductor of a second coil, the other end conductor being connected to the second output, the second coil not being one of the adjacent coils,
stop outputting a signal on the first and second outputs and
outputting a signal on the third and fourth outputs.

Thus, this is a manner of sequentially shifting the coils in the present set-up. This shifting may be obtained by also shifting the operated outputs of the controller.

Naturally, the curve may have a first length and extending between a first and a second points on the surface, the first point being positioned within a first distance of 20% of the first length or less from the first edge portion and the second point being positioned within a second distance of 20% of the first length or less from the second edge portion.

In one embodiment, the coils are at least substantially equidistantly positioned along the curve and/or a first coil may be positioned within 25% of the first length from the first point and wherein a second coil is positioned within 25% of the first length from the second point.

The coils may have symmetry axes at least substantially parallel to, or at an angle to, a plane of the first surface and/or a common core element may extend within the coils.

The controller may be configured to short circuit one or more sets of coils and output a signal to one or more other sets of coils and/or coils may be formed by a single, helical coil, as is described above.

The assembly may further comprise at least one sensor for detecting presence of a metallic and/or magnetic element, the controller being connected to the sensor and may further comprise 3-100 sets of second coils arranged at least substantially along a predetermined second curve at the surface, the second curve having a second length and extending between a third and a fourth points on the surface, the third point being positioned within a first distance of 25% of the second length or less from the first edge portion and the fourth point being positioned within a second distance of 25% of the second length or less from the second edge portion, the second coils connected to the controller and wherein the sensor(s) is/are positioned between the first and second curves.

Then, the assembly may comprise a plurality of sensors positioned in one or more groups of sensors positioned at individual positions at the surface, wherein one sensor from each group is connected in series and to the controller.

Another aspect of the invention relates to a method of operating an assembly comprising:
an outer surface bounded by at least a first and a second edge portion,
a controller having a plurality of outputs,
a plurality of coils positioned sequentially along a predetermined curve at the outer surface, each coil having two end conductors, pairs of coils being defined, one end conductor of one coil of a pair and one end conductor of the other coil of the pair being connected to a separate output of the controller.

the method comprising feeding a plurality of adjacent coils by feeding a signal to the two outputs connected to only one end conductor of the adjacent coils while not feeding a signal to the output(s) connected to two end conductors of the adjacent coils.

This aspect may be combined with all other aspects or embodiments, such as the sequential operation of the coils and the desired dimensions of the assembly and the types, directions, positions and connections of the coils.

A shifting of the operated coils by one coil in a direction along the curve may be obtained by the steps of:
  at a first point in time, feeding the plurality of adjacent coils by a first and a second output, and,
  at a later point in time:
    identifying a third output connected to one end conductor of a first coil, the other end conductor being connected to the first output, the first coil not being one of the adjacent coils and thus a new coil to be operated,
    identifying a fourth output connected to one end conductor of a second coil, the other end conductor being connected to the second output, the second coil being one of the adjacent coils and thus a coil no longer to be operated,
    stop outputting a signal on the first and second outputs and
    outputting a signal on the third and fourth outputs.

When multiple coils are operated at the first point in time, and when only a single coil position is shifted, it is ensured that one or more coils remain operating during the shifting.

Naturally, one or more of the coils not fed may be short circuited and/or the coils may form a plurality of sets of coils.

The method may further comprise the step of determining a position, direction and/or velocity of a metallic, magnetic and/or reader element and controlling the feeding step to feed coils at or in the vicinity of the metallic/magnetic/reader head. Then, the determining step may comprise determining a position of a reader element and wherein the feeding step comprises feeding the adjacent coils having a predetermined positional relationship with the determined position.

As mentioned above, it may be desired to select one coil and operate a plurality of coils on one side or either side of this selected coil. These operated coils may be operated according to the present aspect of the invention.

Naturally, the method may further comprise the steps of:
  a reader head sensing the magnetic field and
  converting the sensed magnetic field into an electric signal.

Another aspect of the invention relates to an assembly comprising:
  an outer surface bounded by at least a first and a second edge portion,
  a plurality of coils arranged at least substantially along a predetermined curve at the surface, a plurality of sets of serially connected coils being formed, each set having two extremely positioned coils, along the curve and between two adjacent coils of a set, one coil from each other set is provided,
  a controller connected to the extreme coils of each set.

This aspect may be combined with any other aspect or embodiment of the invention.

The serial connection of coils has a number of advantages. One advantage is that the self impedance is increased, making it easier to drive the coils by a limited power supply. Another advantage is that a lower number of outputs are required from the controller.

When one coil from each other set is provided between two adjacent coils of one set, the same "pattern" of coils from different sets is repeated along the curve. Thus, when the sets are fed a signal, the same signal pattern may be seen at different positions along the curve at the same time. This may require more power but makes the driving easier due to the increased self impedance.

Usually, the coils of a set are connected in the series connection in the order in which the coils are positioned along the curve, but this is not a requirement.

Also, usually, the coils of the sets are of the same type, such as helical coils or planar coils, but a combination is possible.

As few as two sets may be used, where both sets are operated simultaneously or where one is operated and the other is not—such as short circuited. Short circuiting may be obtained by feeding the same signal to both ends of the series of coils.

Naturally, 3, 4, 5 or more sets may be defined. The number of sets and the type of coil and operation of the coils may be defined on the basis of the type of magnetic field desired. Above, patterns of magnetic fields are described output by 2, 3, 4, 5 or more coils. Naturally, a number of sets may be defined to correspond to the number of simultaneously operated coils, but a lower number of sets may be possible, if a set-up may be provided which, such as during sequential shifting, is possible with the lower number of sets.

Naturally, the curve can have a first length and extending between a first and a second points on the surface, the first point being positioned within a first distance of 20% of the first length or less from the first edge portion and the second point being positioned within a second distance of 20% of the first length or less from the second edge portion.

The coils may be at least substantially equidistantly positioned along the curve and/or a first coil may be positioned within 25% of the first length from the first point and wherein a second coil is positioned within 25% of the first length from the second point.

It is noted that even though the same signal is fed to all coils of a set, the coils may each output magnetic fields which are different. A different number of windings may alter the size of the magnetic field output by a coil compared to that of another. Two identical coils may be fed oppositely and thereby output oppositely directed magnetic fields. Numerous combinations are possible.

A coil may output a reversed magnetic field by being fed by a phase shifted signal or by being interconnected oppositely.

Also, it is noted that when reversing the phase of a signal fed to one set while maintaining the signal fed to another set will also make the present aspect extremely versatile.

In one embodiment, all coils of a set are configured to (such as by virtue of their interconnection and/or position/direction) output, along symmetry lines or centres thereof, magnetic field which, for each pair of adjacent coils of the set, have opposite directions. This enables some types of "pattern" of magnetic fields from the operated coils.

In another embodiment, all coils of a set are configured to (by virtue of their interconnection and/or position/direction) output, along symmetry lines or centres thereof, magnetic field with the same directions. This enables other types of patterns of magnetic fields output.

All of or some coils may have symmetry axes at least substantially parallel to, or at an angle to, a plane of the first surface, and a common core element may extend within the coils.

The controller may be configured to short circuit one or more sets of coils and output a signal to one or more other sets of coils.

In one embodiment, the controller is configured to feed the sets so that a group of coils is formed, a central coil of which is not fed and a signal is to two coils adjacent to the central coil so that magnetic fields output by the two coils, between a centre of the individual coil and the selected coil and above the surface and projected on to the curve, has the same direction, along the curve.

In one embodiment, the coils have symmetry axes at least substantially parallel to a plane of the first surface, the controller being configured to provide a signal to the sets so that signals are provided to the two coils so that the magnetic field generated therein at centres thereof being, when projected on to the curve, in the same direction along the curve. This type of magnetic field is described above.

In one embodiment, the coils have symmetry axes at an angle to a plane of the first surface, the controller being configured to provide a signal to the sets so that signals are fed to the two coils so that the magnetic field generated therein at centres thereof being, when projected on to an axis perpendicular to the outer surface, in opposite directions.

Naturally, the assembly may further comprise at least one sensor for detecting presence of a metallic and/or magnetic element, the controller being connected to the sensor and potentially also a plurality of sets of second coils arranged at least substantially along a predetermined second curve at the surface, the second curve having a second length and extending between a third and a fourth points on the surface, the third point being positioned within a first distance of 25% of the second length or less from the first edge portion and the fourth point being positioned within a second distance of 25% of the second length or less from the second edge portion, the second coils connected to the controller and wherein the sensor(s) is/are positioned between the first and second curves.

Then, the assembly may also comprise a plurality of sensors positioned in one or more groups of sensors positioned at individual positions at the surface, wherein one sensor from each group is connected in series and to the controller.

A final aspect of the invention relates to a method for operating the above assembly, the method comprising the controller feeding a signal to one or more of the sets.

Naturally, this aspect may be combined with any other aspect and embodiment of the invention.

As mentioned above, different patterns of magnetic field may be desired output from operated coils. Thus, the number of sets selected as well as the positions and interconnections of the coils and the type and build of the coils may be selected accordingly. This will also be the situation if the above sequential operation of the coils is desired. Naturally, the method may comprise the step of short circuiting one or more of the coils not fed.

Preferably, the above sequential operation is used. Thus, the feeding step may comprise stopping feeding of one or more but not all sets fed, continuing feeding one or more fed sets, and initiating feeding one or more other sets.

Also, the tracking of a reader head may be used. The method may further comprise the step of determining a position, direction and/or velocity of a metallic, magnetic and/or reader element and controlling the feeding step to feed coils at or in the vicinity of the metallic/magnetic/reader head. Then, the determining step may comprise determining a position of a reader element and wherein the feeding step comprises feeding at least one coil having a predetermined positional relationship with the determined position.

Also, the use of the reader head may be desired, such as when the method further comprises the steps of:
the reader head sensing the magnetic field and
converting the sensed magnetic field into an electric signal.

Another aspect of the invention relates to a method of generating a first magnetic signal using one or more first coils and a second magnetic signal from one or more second coils,
the first magnetic signal having, over time, a first sequence of opposite peaks,
the second magnetic signal having, over time, a second sequence of opposite peaks
the method comprising outputting the second signal from the second coil(s) and outputting the first signal from the first coil(s), where the outputting of the first signal comprises outputting the first signal to have the peaks from the first sequence outside points in time being less than ¼ of a period of time, of the second signal elapsing between two adjacent, opposing peaks, from a zero crossing of a voltage or current of the second signal.

This aspect may be combined with any of the aspects and embodiments of the invention. In this embodiment, the first and second coil(s) may each be a single coil or multiple coils, as are described further above. Any type of coil may be used as may combinations of coil types if desired. The first and second coils may be different in number, type and the like.

Preferably, the first and second coils are positioned so as to output the magnetic fields along parallel curves or tracks over a surface, as described above in relation to the providing of different tracks of a credit card.

In this aspect, the physical distance between the first and second coils, such as between curves along which the first/second coils are positioned, may be 0-10 mm, such as 0-5 mm, such as 0-3 mm, such as 1-2 mm. The distance may be that described as the distance between tracks according to ISO7811-4. The distance may also be less than 10%, such as less than 5%, such as less than 2%, such as less than 1% of the first distance.

The opposite peaks over time may be as the above local maxima/minima of the signal, such as a quantity thereof, such as a strength of the magnetic field.

It has been found that especially when a signal is close to zero, it is more noise sensitive. Thus, it is desired that the other signal does not have peaks during periods of time around zero crossings in the voltage/current or magnetic field.

Preferably, no peaks from the first signal are seen around a zero crossing of the second signal within ¼ of the period of time elapsing between two opposite peaks in the second signal. Naturally, this may be within ⅕, such as within ⅙, ⅐, ⅛, ⅒ or 1/20 of this period of time if desired.

Preferably, the predetermined periods of time do not comprise the peaks of the second sequence. The points in time of outputting the peaks of the second sequence are preferably selected to be outside of the predetermined periods of time.

Preferably, the peaks of the first and second signals are output at equidistant points in time or at points in time where the time difference between neighbouring peaks of the first and/or second sequence is a predefined period of time or twice the predefined period of time.

Thus, points in time of outputting peaks from the first and second signals may be correlated, whereby a time offset may be determined so that no peaks of the first signal fall within the predetermined periods of time. When using the F2F encoding, the bit times for "0" and "1" are preferably the same, so that the points in time of outputting the peaks are well-known and more or less periodic. The same may be the situation even if the bit times of the two signals are not the same, such as that of one signal is an integer times that of the other.

The predetermined periods of time of the second signal usually will fall between the points of time of the peaks of the second sequence.

In one embodiment, the predetermined period of time falls around a point of time at a centre of a period of time elapsing between the two neighbouring peaks between which the low slope is seen. In that situation, the first signal may be, when the time difference between neighbouring peaks of the first and second signals are at least substantially the same, offset by e.g. 25% of the time difference between the neighbouring peaks.

Another advantage of the offsetting of the peaks is that when simultaneous peaks in multiple tracks is avoided, a lower peak power consumption is obtained.

Thus, the method may comprise the sensing, such as by a reader head or element, of the second magnetic signal or both magnetic signals (then, simultaneously, preferably). This sensing may be followed by a conversion of the signal to e.g. a binary signal/information.

Another aspect of the invention relates to an assembly comprising one or more first coils and one or more second coils and a processor connected to the first and second coils, the processor being configured to output a first signal to the first coil(s) and a second signal to the second coil(s), where:
the first magnetic signal has, over time, a first sequence of opposite peaks,
the second magnetic signal has, over time, a second sequence of opposite peaks,
the processor being configured to output the first signal to have the peaks outside points in time being less than ¼ of a period of time, of the second signal elapsing between two adjacent, opposing peaks, from a zero crossing of a voltage or current of the second signal.

This aspect may be combined with any of the above aspects and embodiments.

In this context, the assembly may have any shape, such as any of the assemblies described in relation to any of the other aspects of the invention. Thus, the first and second coils may be provided along parallel curves, such as different tracks of a credit card.

Again, the processor may be of any type and may be monolithic or formed by multiple elements. The processor may drive all coils directly or indirectly, and different processors may drive the first and second coils.

The first and second coils may be different in number, type, or the like.

Different signals may be fed to the first and second coils. Above, the signals used for obtaining the desired magnetic signal are described.

The advantage of ensuring that the peaks from the first signal are not output when the second signal is close to zero is that detection is less noise sensitive.

BRIEF DESCRIPTION OF THE DRAWINGS

In the following, preferred embodiments of the invention will be described with reference to the drawing, wherein.

DETAILED DESCRIPTION

Figure 1:
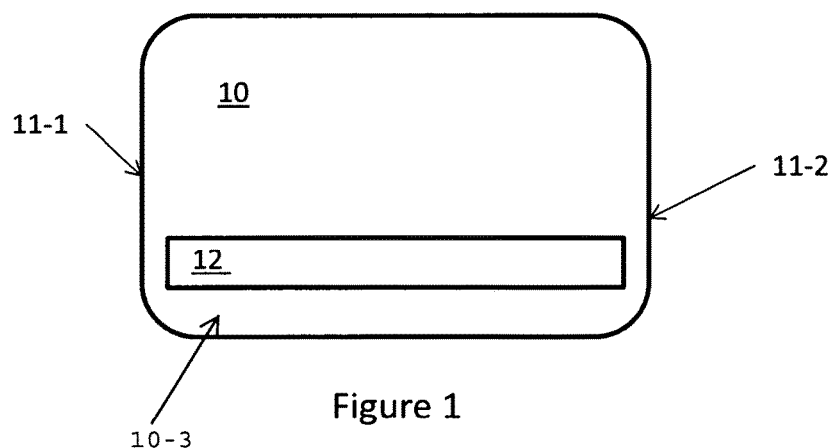
FIG. 1 illustrates a credit card with a magnetic strip.

In FIG. 1, a credit card type element 10 is seen having a magnetic strip 12 and an outer surface 10-3 defined by opposing edges 11-1 and 11-2, where the opposing edges 11-1 and 11-2 include opposing edge portions. In the most widely used legacy cards, this strip 12 is formed of a layer of a magnetic material magnetized along up to three tracks (along the longitudinal direction) and forming individual magnetic areas representing digital 0's and 1's.

Figure 2:
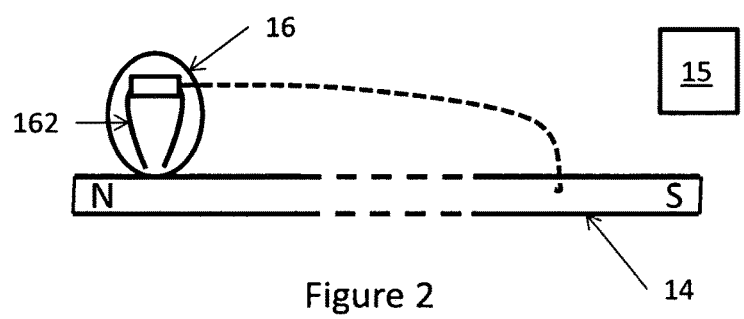
FIG. 2 illustrates the operation of a reader head reading data from a prior art dynamic magnetic strip.

In more recent card types, the old-fashioned magnetic strip is replaced by a magnetically conducting material and a coil generating a varying magnetic field in the conducting material. In FIG. 2, this material 14 is Illustrated (omitting the coil to increase clarity). Naturally, the assembly of the material 14 and the coil may be replaced by an elongate coil taking up the length of the material 14 in FIG. 2.

The operation of this dynamic strip is to output a signal emulating that, which a reader head 16 senses when moving along the magnetic strip 12. Thus, the magnetic field in the material 14 is varied to emulate the field generated by the old-fashioned magnetic strip. To this end, a controller 15 is configured to feed the coil in such a manner that the magnetic field varies as desired, when the reader head 16 moves along the material 14. Naturally, the speed of the reader head 16 over the material 14 may be determined so that the full signal is provided while the reader head is over the material. Also, the controller may control the bit rate of the signal generated for other purposes.

In FIG. 2 is also illustrated the essential contents of a reader head 16 of the type usually used for reading magnetic strips. This head 16 comprises a sensing coil 161 and a yoke 162 for guiding magnetic fields from the material 14 to the coil 161 in the same manner as with the old-fashioned magnetic strips.

However, it has been found that the expected reading sensitivity is far from obtained using this set-up. A reason for this is that the coupling between the magnetic field generated in the material and the coil 161 is not as intended. The operation of the material 14 is to emulate a single, oblong magnet. When the reader head 16 is close to one end of the "magnet", as illustrated, a majority of the field lines will enter the reader head 16 and run within the left leg of the yoke 162 but will not return via the right leg of the yoke 162. Instead, the field lines will exit the reader head 16 and travel in the air to the other pole of the magnet. Clearly, small angular deviations of the reader head coil 161 thus will have an impact on the field sensed.

Thus, what is experienced is that at positions close to the ends of the material 14—or rather far from the centre of the material 14, a difference in performance is seen compared to at a centre of the material. Usually, one end will have an over compensation and the other an under compensation, and different amplitudes may be seen.

Figure 3:
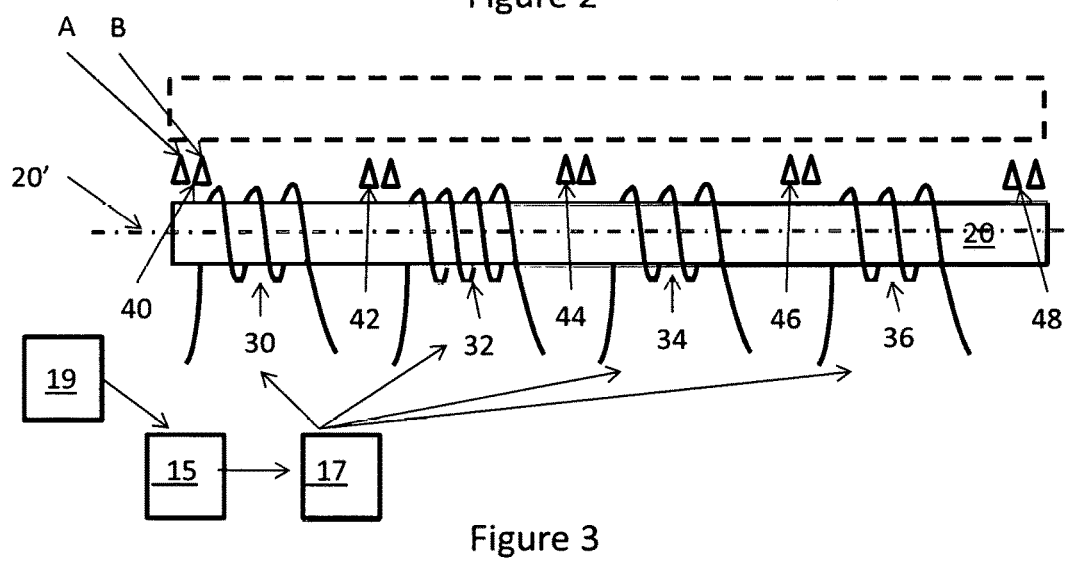
FIG. 3 illustrates an embodiment of a magnetic strip for use in the card of the invention.

In FIG. 3, an embodiment of a magnetic strip according to the invention is illustrated where a magnetic material 20 receives magnetic fields generated by four coils 30, 32, 34 and 36 along its longitudinal direction. The coils may be identical in shape, dimensions, parameters (diameter, core or not, number of windings, pitch, wire thickness, wire material or the like) or not.

Thus, it is seen that if only a single coil 30 or two neighbouring coils, 30/32 are operated but the remaining coils are inoperative, preferably short circuited, the overall length of the virtual magnet (compare to FIG. 2) is smaller, so that the distance from the reader head to the centre of the virtual magnet (the operating coil(s)) is lower. Thus, the better performance area of the coils may be moved along with the reader head.

The operation of the embodiment of FIG. 3 is as follows:

When the reader head 16 (FIG. 2) moves along the curve 20' (in the longitudinal direction) from left to right, initially, the coil 30 will start outputting the signal to the reader head 16.

After a first period of time, the signal from the controller 15 will also be transmitted to the coil 32, so that both coils 30/32 are now active.

After a second period of time, the controller 15 will stop feeding the coil 30, so that only the coil 32 is operational. Later, the coil 34 is operated simultaneously with coil 32, which thereafter is made inoperable, where after coil 36 is fed firstly together with coil 34, which then is no longer fed, whereby coil 36 is finally operated by itself.

In this manner, the total "length" of the virtual magnet is only that of one or a few coils. In addition, preferably non-operated coils are short circuited. Short circuiting may be a galvanic short circuiting or the providing of the same signal to both ends of the coil, for example.

Preferably, at least one coil is always operated/fed when the reader head 16 moves along the material 20, as sharp drops in the signal may be misinterpreted by the circuit de-coding the signals received by the reader head 16.

In another embodiment, two coils are always operated. Thus, initially, coils 30 and 32 are operated. Then, coil 34 is brought into operation while or where after coil 30 is brought out of operation. The effect again is that there always is generated a magnetic field in the material 20.

Preferably, actually, it is desired to operate three coils at the time, when e.g. a total of 5, 6, 7, 8, 9, 10 or more coils are used. In this manner, the length along the track over which the signal is suitable for the reader head 16 is about the overall length of 1½ coils. Then, when the reader head 16 reaches the interface between the middle coil (e.g. coil 32 when coils 30/32/34 are operated) and the last of the coils, the first coil may be made inoperable and a next coil operated, before the reader head 16 reaches e.g. a quarter of the distance/length of the last of the original 3 coils (coil 34 in this example).

When starting to operate a coil, the power fed to the coil may be instantaneously provided at its full, desired size or may be fed, over time, increasingly to reach its desired strength after a period of time. The same may be the situation for the coil to be brought out of operation: the power may be removed instantaneously or over a period of time.

However, it has been found advantageous to bring a coil into (or out of) operation, such as by (or by not) providing a signal/power thereto at a point in time where the current fed to the coil is zero or at least substantially zero (such as less than 10% of a maximum current fed through the coil at any time or during normal operation, such as less than 5% of the maximum current). When the signal output from the coils and the signal fed to the coils is a F2F-encoded signal, the voltage and the current will pass zero at various points in time. A binary "1" has therein a zero current passage, which may be used for the bringing of a coil into or out of operation. It has been found that in this manner, all operated coils may be brought out of operation and formerly non-operated coils into operation without even seeing a signal peak in the reader heads.

This may be obtained by providing a current sensor configured to trigger the bringing of the coil into/out of operation. Alternatively, a voltage sensor may be configured to output a signal at zero-crossings of the voltage. Then, the bringing into/out of operation of the coil may be timed in relation to this zero-crossing by operating/not operating the coil at a predetermined period of time from the voltage zero-crossing. Naturally, the same may be obtained from any other pre-determined voltage (than the zero-crossing). The predetermined period of time will depend on the delay between the voltage and the current. In the present set-up, ⅛ of a bit-time is a suitable period of time from voltage zero-crossing to the bringing into/out of operation of the coil.

The voltage/current in this situation is that of the signal fed to the coil(s) operated.

An embodiment incorporating this may be based on an ASIC with mixed-signal circuits comprising a current sensor for timing the bringing into/out of operation of the coil(s).

In order to determine when to operate the individual coils, it is preferred that the position and/or velocity of the swiping reader head 16 is known. Naturally, the velocity may change over time. Usually, manual swiping increases in velocity (accelerates) during the swipe.

One manner of providing this knowledge is to provide position sensors or swipe sensors at or around the material 20, the coils or in other positions where the position or presence of the reader head 16 may be detected.

Figure 6:
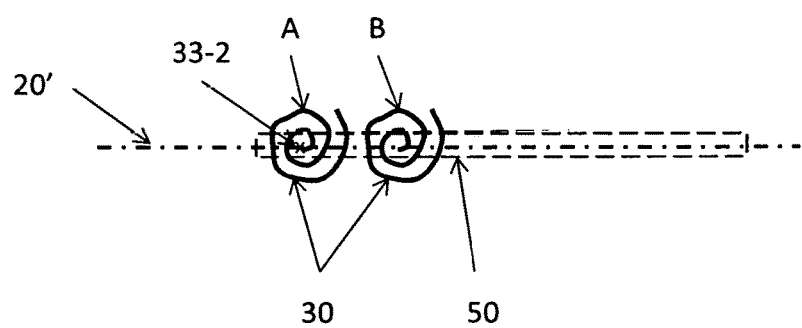
FIG. 6 illustrates planar coils.

In FIG. 3, a total of 5 sensors (40, 42, 44, 46, 48) are illustrated. Fewer or more sensors may be used, and other positions may be chosen. The swipe sensors may comprise one or more windings around the material 20 as described in (WO2005/086102 which is hereby incorporated by reference). Other technologies, such as hall sensors, strain gauges, pressure sensors or the like may be used if desired. In fact, the presently preferred sensors are illustrated in FIG. 6: planar coils.

Preferably, each sensor 40/42/44/46/48 is formed by two sensors A (left) and B (right). Alternatively, pairs of sensors are provided only at one end or both ends of the material 20. The advantage of pairs of sensors is that not only is it possible to determine the position/presence of the reader head 16 (which is especially relevant at the start of the swipe) but also a direction and/or a velocity or acceleration thereof. The positions of the sensors preferably is along a line parallel with the tracks/material 20/track of the reader head 16, so that the sensors of a pair of sensors are provided at different longitudinal positions along the direction of the track. Naturally, single sensors may be used, where a swipe velocity may then be assumed and verified, when the reader head 16 is sensed by the next sensor, where after velocity, position, acceleration etc. may be determined.

Multiple sensors usually would require two connecting wires for each sensor. The more connecting wires the higher the probability that one will break and the card malfunction. Thus, preferably, the sensors A (and/or the sensors B) are connected in series so that only a few, such as 2, interconnecting wires are required. Then, the series of sensors will output a series of signals, over time, as the reader head 16 travels along the series of sensors. A simple manner of obtaining this is to have the sensors be coils, which are simply connected in series.

Two series of sensors (A and B) thus may require two sets of connections and will give two series of pulses/signals.

From a single series of signals, the position, velocity, acceleration and/or direction of the reader head 16 may be determined. Each signal will correspond to a particular sensor and thus position. Naturally, if pairs of detectors are provided, one sensor of each pair may be connected to form a series of sensors.

It is preferred that, in addition to a single series of sensors A, at least one additional, second sensor is provided, preferably the extreme B sensors, for aiding in detecting the reader head and ensuring that the first sensor pulse of the A sensors is correctly determined. Noise sources, such as metallic/magnetic elements, may be present which cause false readings or pulses in the A sensors. Thus, a second sensor provided in the vicinity of an A sensor or, if the A sensor is an A sensor closest to an edge, between that sensor and the edge may aid in qualifying the pulse or signal from this A sensor. The second sensor may be of the same or a different technology and may detect the same or another parameter, such as a force, bending, magnetic field or the like. In one situation, the A sensor is a coil with one symmetry axis and the second sensor another coil with another symmetry axis. In fact, in one situation, one or more of the coils 30-34 may be used as a second sensor or a sensor may be provided as one or more windings around the material 20.

The advantage of using one or more of the coils 30-34 as a sensor is that it/they will output a pulse or signal when the reader head is over a larger area of the card than the sensor A, which normally is more "position specific". These coils may easily be used as sensors when they are not fed or selected. Using them as sensors when fed or selected is described further below.

The reader head may then be detected by the A sensor 40 and/or the second sensor, which may be the B sensor 40 (or a sensor positioned around the 40A position or perhaps closer to the edge—more to the left), the coil 30 or a winding around the material 20. The detection of the reader head will then inform the processor that the first pulse has been (or will very shortly be) detected and that the series of pulses is to be expected.

The processor may then adapt a sensitivity or a noise filtering so that the subsequent pulses or detections are detected correctly.

Thus, from the detected or determined position/velocity/direction, the controller 15 may decide which coil(s) to operate and a bitrate of the signal presently output. Usually, the signal to be output is known on beforehand, but the rate with which the signal is to be output may depend on the swipe velocity and acceleration. Naturally, the bitrate and the shifting between coils may be based on an expected position/velocity or may simply be pre-programmed as derived from the pulses or rather the timing thereof.

When multiple tracks are present on the card 10 (in FIG. 3 a second track is indicated in hatched lines), the sensors 40-48 may be provided between the tracks or materials 20 so as to serve as sensors for multiple tracks.

Naturally, the signal from a series of sensors (A or B) may be noisy. Metals, paramagnetic materials, electromagnetic fields and the like may influence the sensors and add noise to the signal. A simple noise elimination may be obtained by, in the situation where two series of sensors (A and B) are used, comparing the signals from the one series with those of the other series.

In one example, where the sensors of the series are positioned at different longitudinal positions, the series of signals from one series may be subtracted from that of the other series. In this manner, the noise created by any other element of the reader, which affects the sensors at a given point in time, will be removed and the signals from the sensors sensing the reader head (at different points in time) enhanced compared to the noise. This subtraction may be made in hardware, such as by discrete components, so that it is performed in real time.

Naturally, a number of other methods may be used for noise reducing the signals from the sensor series, such as a filtering or averaging of the signal from the sensor. A thresholding may be performed and a noise removal simply removing or thresholding outlier values (such as slew rate adjustment) may be performed.

In one embodiment, in fact, it may be desired to output the signal over only a portion of the overall length of the material 20. One example of this is for opening hotel doors and other access situations, where only a part of the card is introduced into a reader. Thus, the controller may have a mode in which the signal is output over only a portion of the length, such as from an edge or a middle of the card 10 or an outer end of the material 20. Then, the controller 15 may again determine the velocity/position/direction of the reader head 16 and output signals to the individual coils—now typically only a portion of the coils. The controller 15 again may select data to output and/or adapt the bit rate of the signal output to suit the situation.

The controller 15 may feed the coils individually either directly or via e.g. a switch 17 which is provided with the signal to be provided and information identifying the coil(s) to receive the signal.

A sensor 19 may be provided for waking up the controller 15 or for identifying a user to inform the controller whether it is OK to output the signal to the coils. This waking up element may be a deformation sensor (piezo sensor, deformation sensor, strain gauge, dome switch or the like). Also, an identification of a user may be performed in order to ensure that the information/signal(s) is only output when the user wishes it. This identification may be based on a fingerprint sensor, an iris sensor, a keyboard or the like.

Figure 4:
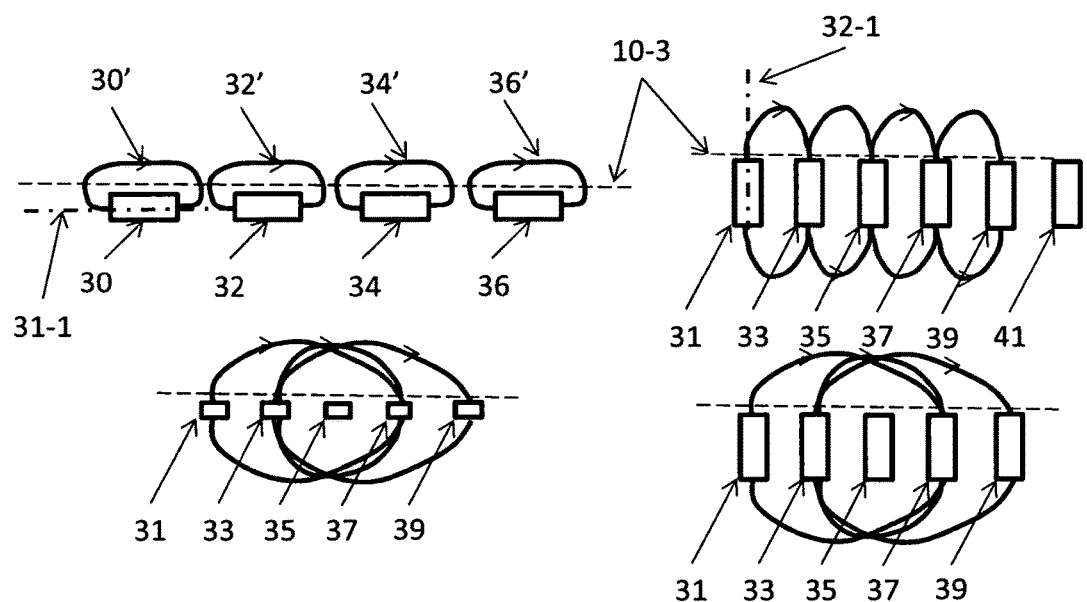
FIG. 4 illustrates different manners of obtaining a preferred output of a dynamic magnetic strip.

In FIG. 4, it is illustrated how to obtain similar fields with different orientations of coils. To the left, a setup as seen in FIG. 3 is seen where the coils 30, 32, 34, 36 and their resulting magnetic fields 30', 32', 34' and 36' are illustrated. The symmetry axes 31-1 are in the plane of the outer surface 10-3 (hatched line). The coils 30, 32, 34, 36 may be helical coils formed around the same or different cores, if a core is desired. When the reader head 16 moves along the row of coils, the magnetic fields may be varied to represent the information desired.

To the right, another set-up is seen where coils 31, 33, 35, 37, 39 are provided in a rotated manner (exterior surface illustrated by hatched lines 10-3) where the symmetry axes 32-1 are perpendicular to the outer surface 10-3 (hatched line). It is, however, seen that when driving neighbouring coils oppositely, a similar magnetic field may be obtained.

A difference is seen when multiple neighbouring coils in the left illustration are driven simultaneously and in the same manner, were the resulting magnetic fields will add up.

In the upper right illustration, the same type of magnetic field may be obtained, but the coils 31, 33, 35, 37 and 39 may be operated in a different manner. It may be desired to operate two coils which are not neighbouring (such as coils 33 and 37) oppositely. In this manner, an overall magnetic field is obtained which may be moved with the movement of the reader head 16 by rendering one coil inoperable and another further along the direction of movement operable. Preferably, the "new" coil is operated, before the "other" coil is made inoperable, and preferably, the coil to be made inoperable is stopped, before the reader head 16 reaches the back side of that coil.

In the lower right illustration, it is seen that the coils 31 and 33 are operated and provide flux lines upwardly, while the coils 37 and 39 are operated reversed. The coil 35 is not operated. A magnetic filed is generated as illustrated, and when shifting coils, the coils 31 and 37 may be rendered inoperable, while a coil 41 neighbouring to coil 39 is operated in the same manner as coil 39, while the coil 35 is now operated in the same manner as coil 33. A shift is then obtained while maintaining the magnetic field output and direction.

The coils of FIG. 4 may be helical coils with or without cores. However, the coils of especially the right illustrations may be much simpler planar coils such as those illustrated in FIG. 6.

In FIG. 6, planar coils are illustrated where the symmetry axis 33-2 is into or out of the plane of the drawing. Coils of this type are especially useful in the embodiment illustrated on the right side of FIG. 4 and as the swipe sensors 40, 42, 44, 46, 48, A and B of FIG. 3.

The coils may in principle be provided with any dimensions and any distance there between along the curve. In addition, even though the coils preferably are generally circular or oval, other shapes, such as a star, triangle, a rectangle, a square, a pentagon, a hexagon or the like are possible. In one embodiment, an outer diameter (such as of a smallest circumscribing circle) of one, multiple or each planar coils is 1-20 mm, such as 1-15 mm, such as 1-10 mm, such as 2-5 mm. The distance (such as along the curve or from centre to centre of the coils) between neighbouring coils may be 0.1-20 mm, such as 0.1-15 mm, such as 0.1-10 mm, such as 0.1-5 mm, such as 0.1-1 mm.

Illustrated in FIG. 6 in hatched lines is also a magnetically conducting strip 50, where the coils A and B are provided between the strip 50 and the reader head 16. The strip 50 is optional and has the purpose of short circuiting the magnetic field at the sides opposite to the sides of the coils exposed to the reader head 16. This gives a higher sensitivity for sending coils and a larger magnetic field for the emitting coils.

In FIG. 6, the coils 30 are more or less circular in outline (spiraling). Different shapes, such as more rectangular or oval shapes, such as with the longer axis of a circumscribing, smallest, oval or rectangle along the direction of the curve and/or toward the or a neighbouring coil 30. Also, the coil need not be in a single layer or plane. Several layers of a conductive material may be provided (such as with an insulating layer there between) so that a structure also in a plane perpendicular to the plane of the coil may be obtained. Then, helical coils may be generated having the axis perpendicular (or any other angle) to the plane of the element or coil.

Figure 5:
FIG. 5 illustrates the use of sets of coils.

In FIG. 5, an embodiment of a track or dynamic magnetic strip is illustrated wherein a larger number of coils are used and where groups of coils are formed.

In general, it is desired to keep the number of connection wires from the controller 15 or switch 17 to the coils down. Thus, when a large number of coils are used, it is desired to run multiple coils simultaneously. In that manner, it is possible to connect such coils in series and thereby reduce the number of connection wires to the controller 15 to that required by the number of groups of coils.

In FIGS. 5, 6 groups (A, B, C, D, E and F) of 3 coils are illustrated. The A coils form a coil group and are connected in series and therefore operated simultaneously. The same is the situation for the B-F groups, The operation of the embodiment of FIG. 5 is similar to that of e.g. FIG. 3 or 4 in that the controller 15 may, in any desired manner, ascertain or determine the position of the reader head 16 and may operate the coils in the vicinity as described further above. The difference is that the signals output are also output at other positions along the track, but as long as these positions are distanced from the reader head 16, this has no effect on the transfer of the data. This dividing of the coils up into groups of coils which are connected to each other, such as in series, and which are operated or fed simultaneously, is illustrated further in FIGS. 13 and 14.

Figure 13:
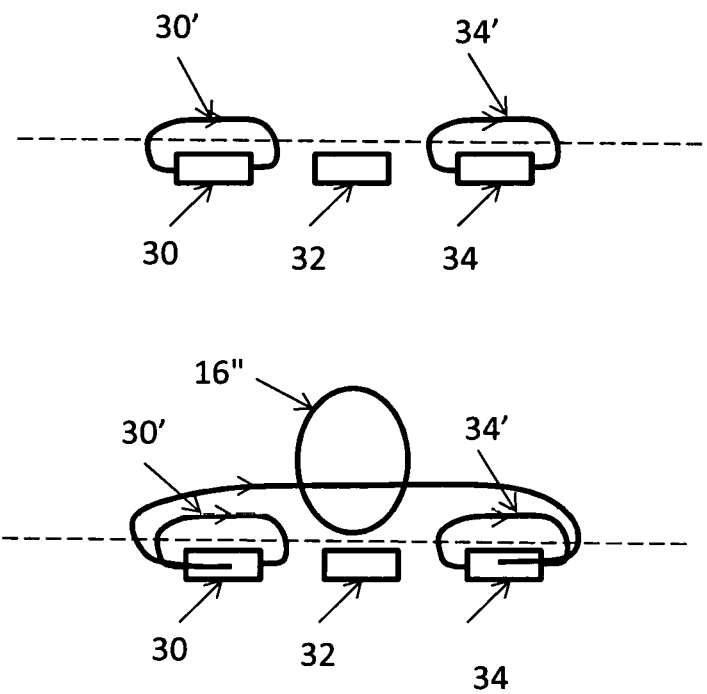
FIG. 13 illustrates a first manner of operating a group of serially connected coils.

In FIG. 13, coils of the type described in relation to the left side of FIG. 4 are illustrated. The coils 30 and 34 are operated simultaneously. These may be connected in series or in parallel in order to be operated by the same connections of the controller (not illustrated).

In this embodiment, the coils are operated in the same manner, so that the magnetic field output by the coils is outputted in the same manner (rotating, above the surface (hatched line) clockwise).

It is seen that when operating on their own, the magnetic field will tend to stay in the vicinity of the individual coils. No significant magnetic field is provided over the not operated coil 32.

However, in the lower portion of FIG. 13, a reader head 16" is positioned over the coil 32. This head 16" will have a high magnetic conductivity, whereby a magnetic field will be "drawn" from one coil 30/34 to the other by the head 16". Thus, even though the coil 32 is not operated, a magnetic field will be present there, when the head 16" is. It is noted that a return path of the magnetic field may be through coil 32.

Clearly, the coils, of which three 30/32/34 are illustrated, may be operated as two series or groups of coils, where each series or group has every second coil. Thus, every second coil is operated and every second coil is not. Then, at the position of the head 16", the magnetic field will be as illustrated in the lower portion of FIG. 13 and at the other positions it will be as illustrated at the upper portion of FIG. 13.

In general, it is preferred that the coils of a group are connected in series as this increases the overall self induction and thus reduces the current requirements of the operation of the coils.

Figure 14:
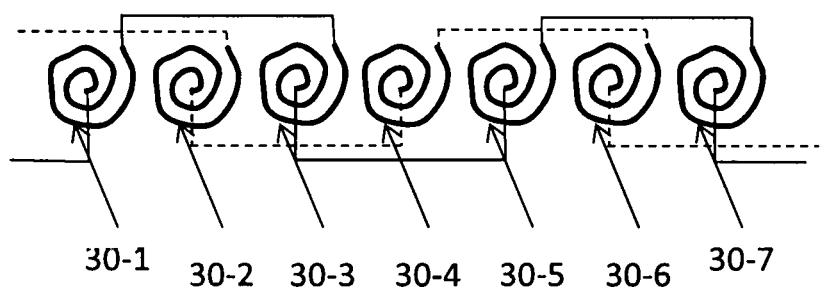
FIG. 14 illustrates another manner of operating a group of serially connected coils.

Another embodiment is seen in FIG. 14, where the coils now are flat or planar as seen in figure G. Again, every second coil is connected into a group (one group connected by full lines and one group by hatched lines). In this embodiment, the neighbouring coils of the same set, such as coils 30-1 and 30-3, are electrically connected but oppositely, so that when the coil 30-1 emits a magnetic field at the centre thereof out of the plane of the drawing, the coil 30-3 will emit a magnetic field, also at the centre, but into the plane. Thus the operation of the coils 33, 35 and 37 in FIG. 4, lower right, is obtained. It is seen that every second coil (such as coils 30-2, 30-4, 30-6) may be inoperable while the other coils are operated so that when a reader head (not illustrated) is above the coil 30-2, the overall magnetic field created by coils 33 and 37 in FIG. 4, lower right, is obtained.

In general, when the reader head moves toward an operated coil, the groups of coils may be operated accordingly. Thus, in FIG. 13, lower illustration, if the head 16" moves over the coil 34, the coils 30/34 are brought out of operation and the coil 32 and a coil on the right side of coil 34 will be operated.

In the same manner, when the reader head moves from the coil 30-2 to the coil 30-3, the coils 30-1, 30-3, 30-5 and 30-7 are brought out of operation and the other coils operated.

Naturally, more than two groups of coils may be used.

Figure 15:
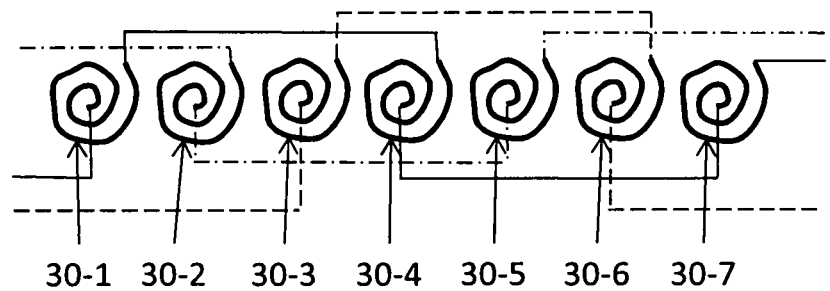
FIG. 15 illustrates a third manner of operating a group of serially connected coils.

In the set-up of FIG. 15, three groups of coils are illustrated: 30-1/30-4/30-7 (connected with full lines), 30-2/30-5 (connected with dot-hatched lines) and 30-3/30-6 (connected with hatched lines). Thus, every third coil is connected as a group—again in the preferred series.

It is seen that if the group of 30-4 is not operated, the two other groups may be operated to achieve the pattern seen in the lower, right portion of FIG. 4, so that the coils 30-2 and 30-3 are operated to emit a magnetic field, at the centres, out of the plane of the figure and the coils 30-5 and 30-6, due to them being coupled in "counter-phase" a field into the plane at the centres.

Naturally, any number of groups may be defined.

In general, when operating coils in groups, the desired magnetic field around the reader head may be obtained without having to provide individual connections from each coil to the controller.

Also, it is not a requirement that the coils of the groups are defined all along the coils of the assembly. A group may be defined along only a portion of the coils of the assembly, usually neighbouring coils. Thus, along one portion of the curve (some of the coils), some groups may be defined and operated, and other groups may be defined and operated along another portion of the curve (other coils further along the curve).

Figure 8:
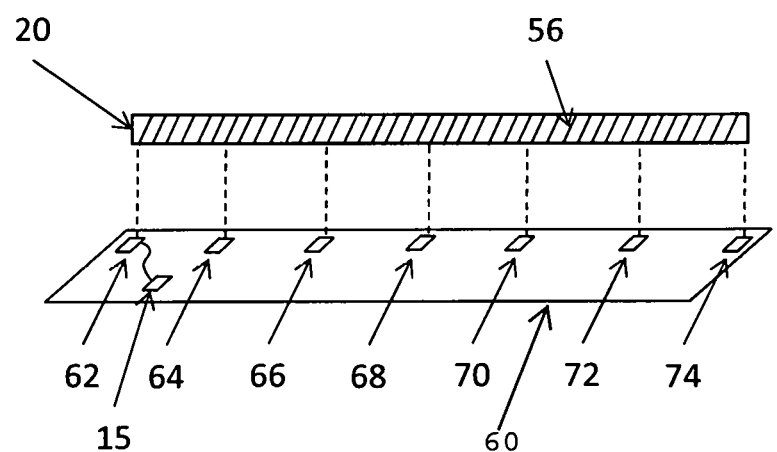
FIG. 8 illustrates a simple manner of providing multiple coils.

In FIG. 8, a single coil 56 is provided. In this example, the coil 56 is wound on to a core material 20 which both may act as a core and as a support for the coil 56. The material 20 is not required.

This coil 56 is positioned on a number of conductive pads 62, 64, 66, 68, 70, 72 and 74 on a support 60, such a as a Printed Circuit Board.

The coil 56 is positioned on the pads and preferably conductively connected to the pads, such as by soldering, welding, gluing or the like. Preferably, the pads have an extent, along the longitudinal direction of the coil 56, exceeding a pitch of the coil 56, so that at least one full winding of the coil 56 is short circuited by the individual pad. Then, the single coil 56 is effectively divided up into a number of shorter coils.

In the figure, the controller 15 is illustrated as is a connection to the pad 62. Connections, of course, are made for all pads.

The operation or driving of such a set of coils where neighbouring coils share the same galvanic connection, is rather simple. If the coils formed between pads 62/64 and 64/66 are to provide the same magnetic field in the same direction, the pad 62 may be provided with 0V, the pad 64 with 5V and the pad 66 with 10V. Then, the voltage differences over the two coils is 5V in the same direction (to the right). Thus, the number of consecutive coils to generate a magnetic field in the same direction will depend either the supply voltage required or will determine the magnetic field obtainable from each coil (which naturally depends also on the current available and the coil parameters).

In this respect, it is noted that two coils may be fed by feeding only the pads on the outer sides of the coils. Thus, if a signal is fed to the coil via the pads 62 and 66, the pad 64 may be allowed to "float", so that the current is fed from pad 62 to pad 66, whereby the two coil segments defined between pads 62/66 and pad 64, respectively, are operated as one coil with the corresponding length. The shifting of the position of this coil may then be a subsequent operation of the pads 64 and 68 in the same manner.

The operation of the above embodiments is, as described, that the selected coil(s) output a magnetic field emulating at least to some degree the signal of a legacy magnetic strip.

Also, one or more separate coils may be defined for use as sensors, or one of the outputting coils may also be used as a sensor as described above and further below.

Figure 16:
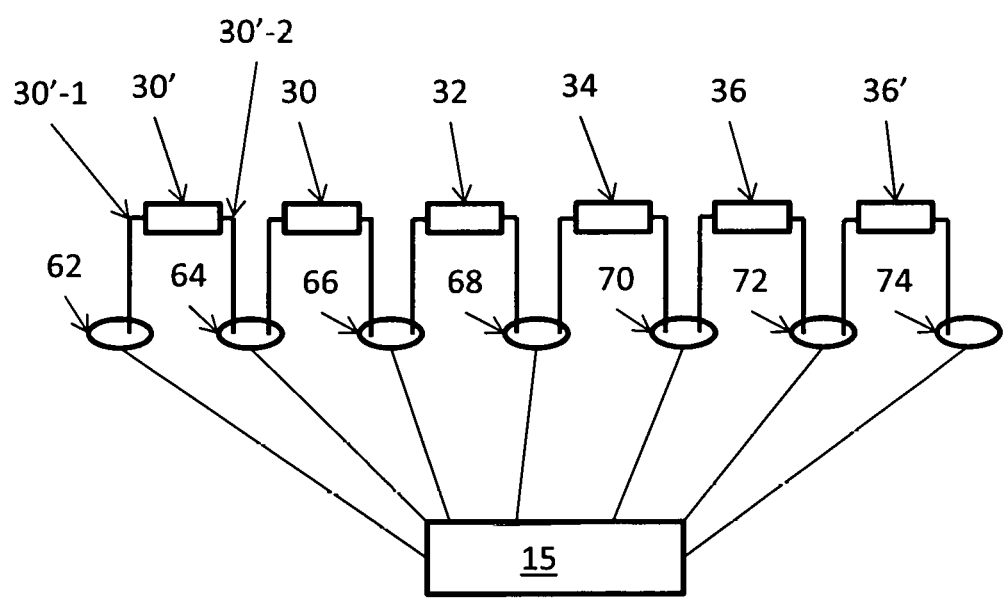
FIG. 16 illustrates a manner of operating a set of coils by a controller.

The above manner of driving a number of neighbouring or adjacent coils by providing a current to the outer connections and allowing the connections between the intermediate coils to "float"—i.e. by not providing a signal thereto and by allowing the voltage of these connections to the controller to vary, may be used also in other embodiments than that provided using a single, elongated coil. This is seen in FIG. 16 where 6 individual coils, 30', 30, 32, 34, 36, 36' each have two end conductors 30'-1 and 30'-2 each connected to a pad (62, 64, 66, 68, 70, 72, 74) connected to a connection of a controller 15. The conductor ends of each coil are connected to different pads and apart from the extreme pads, each pad is connected to a conductor end of two neighbouring coils, so that the coils are positioned in a daisy chain structure (pearls on a string).

Thus, if it is desired to operate or feed the coils 30', 30 and 32, it suffices to supply a voltage over and/or a current through the pads 62 and 68, if the pads 64 and 66 do not interrupt this operation. This is the case when these outputs of the controller are allowed to "float"—i.e. have any value caused by the operation of the outputs to the pads 62 and 68 and the properties of the coils 30', 30, 32 etc.

As mentioned in relation to FIGS. 4, 6 and 13-15, the coils may be directed differently and connected differently depending on the magnetic field desired output.

Figure 7:
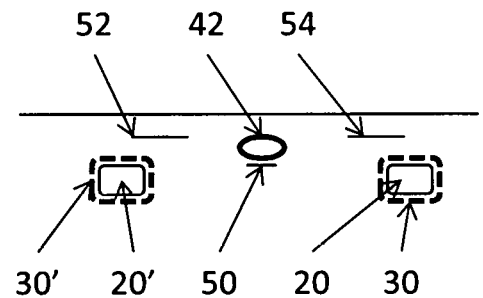
FIG. 7 illustrates a cross section through a preferred card according to the invention.

In FIG. 7, a cross section is illustrated which is taken perpendicularly to the elongate axis of the magnetic strip 12 in FIG. 1.

In this cross section, relating to the part of the card 10 with the tracks, two tracks or two coils 30 and 30' are illustrated wound around the core strips 20/20'. Naturally, these coils could be replaced with planar coils. Between the coils 30/30' and closer to the upper surface of the card, a swipe sensor 42 is illustrated. As mentioned above, the swipe sensor preferably is positioned at longitudinal positions between the coil positions, but to illustrate the relative positions, the swipe sensor is illustrated.

Below the swipe sensor 42, the conductor strip 50 is illustrated as described in relation to FIG. 6.

Above and displaced sideways from the coils 30/30' are two guide strips 52, 54. The operation of these guide strips and the offset thereof in relation to the actual track of the reader head 16 is (see also PCT/EP2014/057502 and PCT/EP2014/057506, which are hereby incorporated by reference) to provide a suitable angle, seen in the plane of the drawing, of the magnetic field when entering the reader head.

The providing of a plurality of coils as illustrated in FIG. 3 or to the left in FIG. 4 may, naturally, be the providing of the individual coils either around individual cores (with a gap there between) or a single core, such as by providing different, separate coils around a single core. This, however, may be If multiple tracks are used, each track is emulated independently of the other track(s).

Especially the "independently" may present challenges in that the magnetic field output by a coil in one track will extend also to the parts of the reader head 16 sensing the other or neighbouring track. Thus cross-talk may be addressed.

Figure 9:
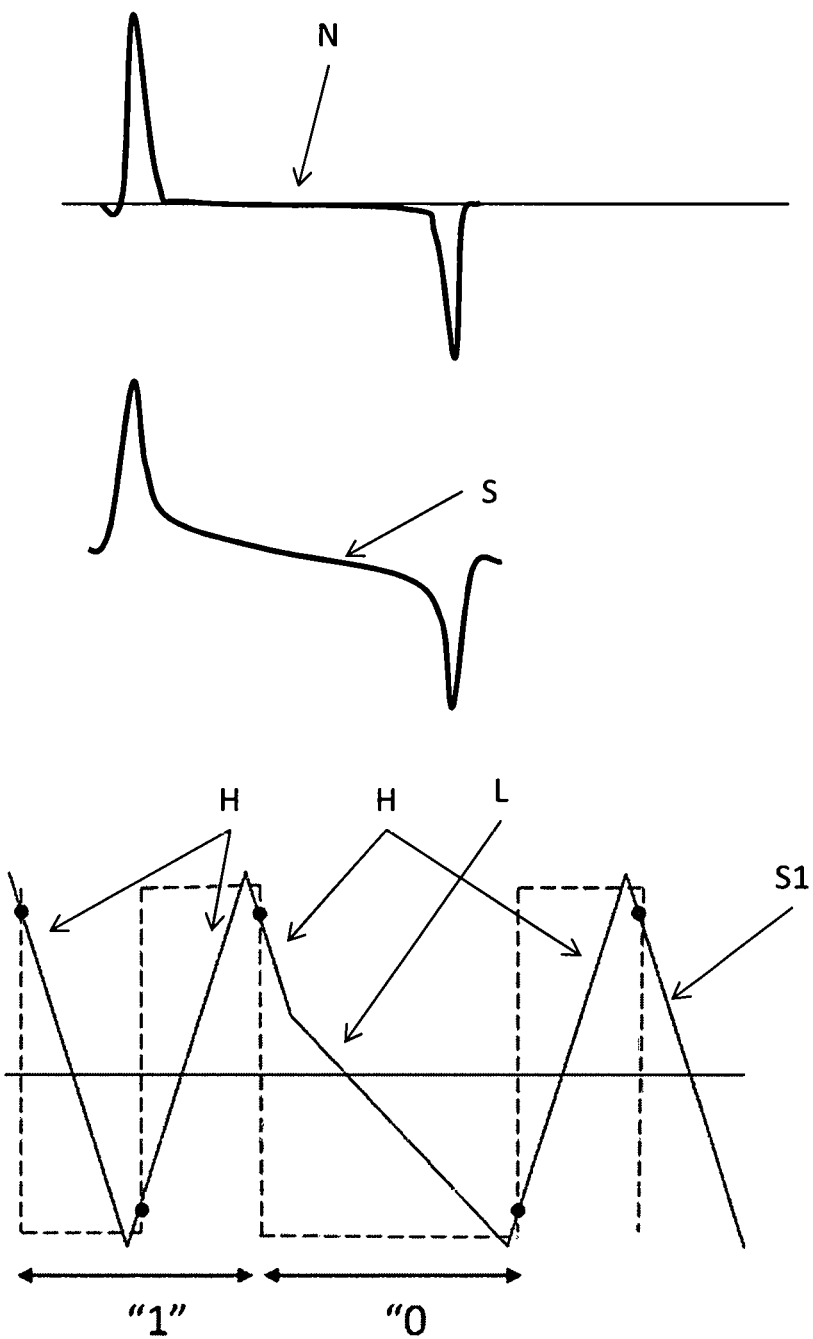
FIG. 9 illustrates different signal shapes for generating a signal in a reader head,
FIG. 10 illustrating a different signal shape for generating a signal.

Different manners of addressing cross talk are illustrated in FIGS. 9 and 10 where the top illustration of FIG. 9 illustrates the type of signal received when the reader head 16 moves past a small magnet as is seen in legacy magnetic stripes. The two poles of the magnet will generate two oppositely directed current surges in the coil 161. It is seen that the two peaks are quite sharp and that the signal between the peaks is almost zero.

This signal is converted, by the sensing circuitry, into a square-wave signal by firstly thresholding the signal. Often, in readers, this conversion is based on a differentiation and/or an integration element. Thus, some readers detect peaks in the signals and others detect the integrated signal value.

In this respect, it is noted that most if not all magnetic strips are encoded using the F2F code which is a square-wave signal where (see FIG. 9, lower illustration) two opposite (fast) peaks represent a "1" and a single (slow) peak represents a "0". The "0" has a predetermined time duration and if the following peak has a length or time duration of 75% or less than that of the "0", the next symbol is interpreted as a "1". The bit time is re-evaluated during the reading of the strip, as the relative velocity between the card and reader head may change.

Thus, it clearly is important that the conversion to the square-wave signal is performed correctly. The square-wave signal is generated from the peaks in different manners in different reading set-ups. FIGS. 9 and 10 illustrate alternative signal shapes having cross talk and noise reducing properties.

It has been found that signals of this type are noise sensitive. Noise superimposed at the flat part of the signals (position N) may trigger the detecting circuit, so that a peak is erroneously detected, drastically misplacing the peak positions and thus the derived contents of the signal.

A solution to this would be to increase the amplitude of the peaks, so that the threshold values may be increased. In old-fashioned cards (FIG. 1), this may be obtained simply by increasing the swipe speed.

In dynamic magnetic strip cards, however, it is desired to keep the power consumption to a minimum, so increasing the amplitude is not desired.

In addition, increasing the amplitude in dynamic magnetic strip cards also may lead to cross talk between the different tracks of the magnetic strip.

Different solutions have been devised. It has been found that the noise sensitivity is higher, the lower the slope of the flat part N. Thus, as is also seen in the middle part of FIG. 9, a signal type may be used which has a slope S always exceeding, apart from at the peaks, a predetermined minimum slope.

Due to the noise sensitivity being caused by a too low slope, the controller 15 in this embodiment generates a signal causing the signal fed to the reader head 16 to have, apart from the two peaks of the signal, at least a predetermined minimum slope S. Thus, the noise sensitivity is reduced over the most critical (lowest slope) areas of the signal.

In this manner, the amplitude of the signal may be kept at a relatively low value while the noise sensitivity is kept at a suitable level.

Another signal type S1 is illustrated at the bottom of FIG. 9, where a quite different signal type is illustrated.

It is remembered that the conversion of the sensed field into the square-wave signal representing the series of bits is performed on the basis of, among other processes, a thresholding. The thresholding points are indicated in the drawing as fat circles, and the resulting square wave signal is indicated in hatched lines.

Also, it is desired that the slope of the signal is as high as possible, while the signal should have the desired signal strength/amplitude at the desired points in time defining the high/low or low/high transitions in the square-wave signal again defining "0" and "1".

At the bottom of FIG. 9, the signal, apart from the shifts between the straight lines, such as the peaks, has one of two slopes, the high slope, H, and the low slope L.

It is remembered that the "0" ideally has the same time duration as a "1", but that a "1" is formed by two opposing peaks whereas a "0" comprises a single peak.

It is seen that the signal has the same slope for a predetermined period of time after each peak and that the peak detection, which is triggered by the signal deviating a predetermined portion from the peak value, is performed within this period of time. In this manner, the time delay between each peak and the detection thereof is the same, so that the shape of the resulting square signal is not deformed.

Thus, in order to not exceed the amplitude maximum, the lower slope is used during the outputs of "0"s, where the higher slope is used when outputting a "1". The higher and lower slopes may be determined from a desired or maximum amplitude of the signal and a desired bit time.

Figure 10A:
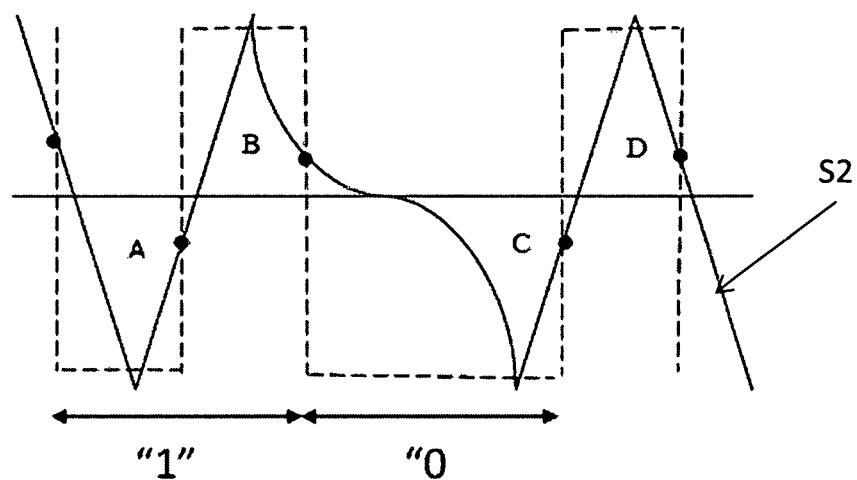

As mentioned, an integration may also be used in the determination of the signal and the generation of the square wave signal. Thus, the area below the curve is of interest. This is illustrated in FIG. 10. The integration will trigger the shift in the square wave curve, when the area or integration reaches a predetermined value. Often the integrator comprises a capacitor defining this area. In FIG. 10A, another type of signal S2 is illustrated, where the areas are illustrated at A, B, C and D. It is seen that the "0" is now partly defined by an S-shaped curve allowing a correct time duration of the "0" while keeping the area C below the curve at the desired size.

Now, the curve has a flat portion in the "0", which potentially may be a noise sensitive area. This noise sensitive period of time may be kept at a minimum by the selection of the curve shape. In addition or alternatively, the noise from another track may be reduced by shifting the transmission of data to the other track by a predetermined period of time, such as a fraction of a bit time or bit length, so that no shifts/peaks are provided in the other track, while this track is in its most noise sensitive time period. This shifting may e.g. be a quarter of a bit time. This shift may be determined in real time, or the signals to be output may be determined and a time shift estimated, before the signals are output in accordance with the time shift.

The signals may have the same or different frequencies or bit times. Especially if the bit times of one signal is the same or an integer times that of the other, a fixed time shift may be used.

Figure 10B:
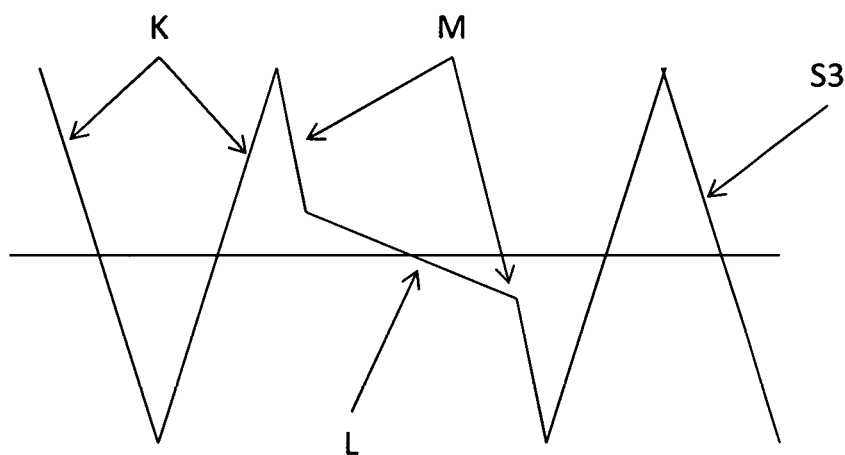

In FIG. 10B, another type of signal shape S3 which is a combination of the shapes of FIGS. 9 and 10A is illustrated. In this figure, the shape is generated by three slopes, a K slope corresponding to the high slope in FIG. 9, and a low slope, L, which aids in defining the "0"s and a higher slope M which aids in keeping the areas at the pertaining peaks sufficiently low for an integrating detector to still detect the correct F2F encoded signal.

The signal shape of FIG. 10B has the advantage that the minimum slope is still sufficiently far away from the very noise sensitive flat parts seen in FIG. 9, while the period of time where the value is close to zero is rather low.

Naturally, the slope L may be selected, together with the slopes M and K to optimize the signal shape so that the square signal output and the resulting binary information is optimized. Different reader technologies and circuits may require different slope values to best decode the F2F signal, but the variation of these three parameters is simple to the skilled person.

Naturally, a combination of the above curve shapes may be used, and more complex shapes may be devised, where no straight lines are used, for example, if this is desired for some reason.

Figure 11:
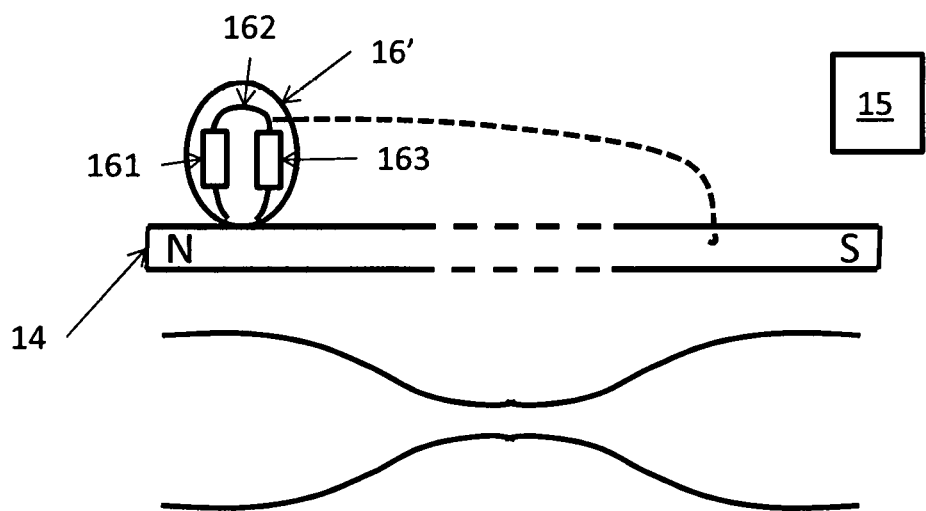
FIG. 11 illustrates an alternative type of reader head to that of FIG. 2.

In FIG. 11, compared to FIG. 2, another type of reader head 16' is seen. This head 16' also has the yoke 162 and a reading coil 161, but present is also a writing coil 163 which may be used for writing information to the material 14. The writing coil 163 is not relevant in this connection, but it is seen that the angle of the reading coil 161 is now more or less perpendicular to the material 14 and/or the card surface, where in FIG. 2 it was more or less parallel thereto.

The field lines of a coil or a set of coils may be parallel to the plane of the coils or card surface at the center of the coil or set of coils but will deviate from this angle away from the center and may be perpendicular to the plane/surface at or on the exterior side of the extreme coil(s). Thus, clearly, different positions of this field may be optimal for different heads having coils with different angles to the intended slide direction or card surface.

Naturally, this affects the sensitivity of the reader head 16' to the magnetic field generated. This sensitivity is illustrated for a single coil extending along the full length of the material 14. It is seen that the sensitivity, as expected, is rather low at the center of the reading coil 161 and larger at the ends thereof. As explained in relation to FIG. 2, the yoke 162 is not used as initially intended by the magnetic field which, at the center of the material 14, is perpendicular to the axis of the coil and therefore has a low transfer of the field to the coil 161.

This means that the optimal manner of operating a coil forming a material 14 or a part thereof is to operate one or more coils where the reader head 16 is not at the center of the coils but rather at one end (longitudinally) of the operated coil(s).

In the embodiment illustrated in FIG. 4, left side, the coils 30/32 and optionally also 34 may be operated when the reader head is over the coil 30, and the coil shift to the right may be performed when the reader head no longer is over the coil 30. Alternatively, the coils 30 and 32 may be operated, when the reader head is over the coil 32, and the right shift in coils may be performed when the reader head no longer is over coil 32.

Figure 12:
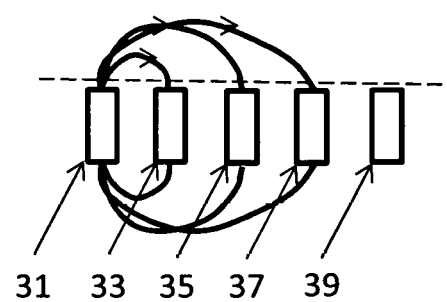
FIG. 12 illustrates an alternative manner of driving the coils of FIG. 4.

In the coil set-up to the right in FIG. 4, the coils 31, 33, 35, 37 and 39 may be operated as illustrated in FIG. 12, where, when the reader head 16 is close to the coil 31, the coil 31 is operated, as is coil 33 and optionally also coils 35 and 37, for example. When the reader head approaches the coil 33, coil 31 is no longer operated, and the coils 33, 35 and optionally also 37 and 39 are operated.

For other types of reader heads with other coil angles, other positions in relation to the operated coils may be desired.

Due to the fact that at coil shift, the operation of the coil (33 in this example) may be a reversal of the current in the coil, it may be desired to, when the reader head is above the coil 31, not operate coil 33 and only operate this, when the reader head approaches coil 33, where the coil 35 may then be brought out of operation in order to facilitate the later bringing into operation thereof.

In FIG. 11, the sensitivity is illustrated for the illustrated angle of the sensing coil 161. In fact, the phase of the output of the coil 161 will shift when exposed to the magnetic field at the two extreme ends of the sequence of operated coils. This is due to the opposing directions of the magnetic field lines.

In addition, it is seen that when wishing to operate only coils from the reader head position and to one side thereof, not the full length of the coils can be utilized. This may be counter-acted by selecting, at a point in time where a number of coils behind the reader head position are available, coils behind the reader head position and thus shifting from operating the coils so that the reader head is trailing the operated coils to the reader head heading the operated coils—that is moving the reader head from the trailing high sensitivity part to the reader heading sensitivity part.

The optimum position of the reader head 16' in relation to the operated coil(s) may depend on e.g. how many tracks are operated. In general, it is desired that the reader head 16' is positioned within 50% of an operational distance from a centre of an extreme, operated coil, where the operational distance is a shortest distance within which the operated coils are provided along the curve. Referring to FIG. 12, coils 31-37 are operated, so the operational distance is the distance from the rightmost part of coil 37 to the leftmost part of coil 31. Preferably, the percentage is 25% or less, such as 10% or less. This optimum or suitable position is the same (the same principle applies) at both ends of the operated coils.

In order to not confuse the detection circuit receiving the signals from the reader head, the polarity or phase of the magnetic field output of the operated coils and thus of the signal transmitted to the coils may be reversed at the same time.

Suitably, this shift in operated coils may take place when a "normal" sequential shift takes place, where the phase of the signal fed to the coils is also reversed.

In that manner, the reader head shifts from receiving the field at the trailing, operated coils to that at the reader heading, operated coils, and the reader head is now able to receive the magnetic field over substantially all of the length occupied by the coils.

This may be particularly relevant where the period of time available for outputting the magnetic field to the reader head, if the above shifting is not performed, is too low for the magnetic field to be transferred to the reader head with e.g. a bit rate suitable for the reader head. If a too high swiping speed is detected, this shift may increase the period of time available so that the magnetic field may be output with the desired parameters.

In one embodiment, the coils 30-41 may themselves be used as sensors. This may be the case both when no coils yet receive a signal, when some of the coils receive a signal and others are used as sensors and when the same coils both receive a signal and thus output a magnetic field and are used as sensors. These coils may be used as sensors instead of the above A and B sensors or in addition thereto. Above, it is described that a combination has a number of advantages.

Reverting to FIG. 4, it is seen that a set-up may be selected where some coils are fed a signal and the central coil 35 is not fed. In that situation, the central coil 35 may be used as a sensor to derive information relating to the position of the reader head.

The reader head will comprise magnetically conducting material and thus will affect the magnetic field experienced by the coil 35, when the reader head moves from e.g. the left to the right over the end of the coil 35. When the reader head, for example, is over the end of the coil 33, more of the field generated by the coils 37/39 will be coupled into the coil 35, but when the reader head is above the coil 35, less of the field generated by the fed coils is fed through the coil 35. Thus, the signal or current output of the sensor coil 35 will see a change, when the reader head is above the coil 35, so that the reader head position may be tracked using only the coils 30-41 if desired. The output of this coil will reveal whether the reader head is above the coil or how far it is to the side of the coil.

In the set-up of FIG. 12, the reader head is preferably above or slightly to the left of the coil 31. Thus, when a coil (not illustrated) to the left of coil 31 is not fed, part of the field generated by the operated coils 31-37 will be fed through this coil, but the reader head will, as is described above, perform a field change when positioned over this coil, so that the output of this coil may also reveal whether the reader head is above the coil or how far it is to the side of this coil.

If it is desired to use a coil presently receiving a signal and thus outputting a magnetic field also as a sensor, the self inductance of the coil may change by several percent when the reader head is in the vicinity of the coil. Thus, the current delivered to and consumed by the coil will be affected by the presence of the reader head, and this may be detected.

As the reader head passes the coil, the inductance will increase and the current carried by the coil thus reduced. Thus, in one manner, the detection may be based on the current carried in and consumed by the coil.

Instead of determining this change on the signal representing the magnetic field to be output, it may be desired to add to of inject into this signal a further signal, which may be provided at a higher frequency in order for the reader head electronics to not be disturbed by it. This higher frequency signal fed to the coils will experience the same change in inductance caused by the reader head and may be detected by the controller.

In that situation, it may be desired to design the coils or select any higher frequency injected signal so that the higher frequency coincides with a resonance frequency of the coils, so that the load change in the coil will be larger at the injected higher frequency.

Above, a number of alternatives and embodiments have been described. The skilled person will know that these may be combined in a large number of manners. Different sensor types and setups may be used with any of the above coil setups. And any of the different manners of driving the coils may be combined with any sensor setup and across the coil setups.

Also, the skilled person may add, to the above technology, any manufacturing method and any other elements, such as batteries, other types of communication (RFID, Bluetooth, WiFi etc), any displays, sensors or the like. Combinations of such technologies are well known and may be used if desired.

Embodiments

1. An assembly comprising:
    an outer surface bounded by at least a first and a second edge portion,
    3-100 sets of coils arranged at least substantially along a predetermined curve at the surface, the curve having a first length and extending between a first and a second points on the surface, the first point being positioned within a first distance of 20% of the first length or less from the first edge portion and the second point being positioned within a second distance of 20% of the first length or less from the second edge portion,
    a controller connected to the coils,
    wherein the coils have symmetry axes at least substantially parallel to a plane of the first surface.
2. An assembly according to embodiment 1, wherein the coils are at least substantially equidistantly positioned along the curve.
3. An assembly according to embodiment 1 or 2, wherein a first coil is positioned within 25% of the first length from the first point and wherein a second coil is positioned within 25% of the first length from the second point.
4. An assembly according to any of the preceding embodiments, wherein a common core element extends within the coils.
5. An assembly according to any of the preceding embodiments, wherein the controller is configured to short circuit one or more sets of coils and output a signal to one or more other sets of coils.
6. An assembly according to any of the preceding embodiments, wherein each coil has two end conductors and wherein the controller is configured to output the same signal to the end conductors of a coil.
7. An assembly according to any of the preceding embodiments, wherein the controller is configured to output a signal to a plurality of neighbouring coils.
8. An assembly according to any of the preceding embodiments, further comprising at least one sensor for detecting presence of a metallic and/or magnetic element, the controller being connected to the sensor.
9. An assembly according to embodiment 8, further comprising 3-100 sets of second coils arranged at least substantially along a predetermined second curve at the surface, the second curve having a second length and extending between a third and a fourth points on the surface, the third point being positioned within a first distance of 25% of the second length or less from the first edge portion and the fourth point being positioned within a second distance of 25% of the second length or less from the second edge portion, the second coils connected to the controller and wherein the sensor(s) is/are positioned between the first and second curves.

10. An assembly according to embodiment 8 or 9, comprising a plurality of sensors positioned in one or more groups of sensors positioned at individual positions at the surface, wherein one sensor from each group is connected in series and to the controller.

11. A method of operating the assembly according to any of the above embodiments, the method comprising sequentially feeding one or more of the coils.

12. A method according to embodiment 11, comprising the step of short circuiting one or more of the coils not fed.

13. A method according to embodiment 11 or 12, wherein each coil has two conductor ends, the method comprising the step of feeding the same signal to the two conductor ends of a coil.

14. A method according to any of embodiments 11-13, wherein the feeding step comprises simultaneously feeding a plurality of neighbouring coils.

15. A method according to embodiment 14, wherein the feeding step comprises stopping feeding of one or more but not all coils fed, continuing feeding one or more fed coils, and initiating feeding one or more coils neighbouring to each other and/or the one or more fed coils.

16. A method according to any of embodiments 11-15, wherein the coils form a plurality of sets of coils.

17. A method according to any of embodiments 11-16, further comprising the step of determining a position, direction and/or velocity of a metallic, magnetic and/or reader element and controlling the feeding step to feed coils at or in the vicinity of the metallic/magnetic/reader head.

18. A method according to embodiment 17, wherein the determining step comprises determining a position of a reader element and wherein the feeding step comprises feeding at least one coil having a predetermined positional relationship with the determined position.

19. A method according to embodiment 11, wherein the feeding step comprises selecting a plurality of neighbouring coils and feeding at least some of the selected coils.

20. A method according to embodiment 18 and 19 wherein the feeding step comprises selecting the plurality of coils to include the at least one coil.

21. A method according to embodiment 20, wherein the feeding step comprises selecting a plurality of coils, a centre of which is at the determined position.

22. A method according to embodiment 20, wherein the feeding step comprises selecting a plurality of coils of which an extreme coil is at the determined position.

23. A method according to any of embodiments 18-22, wherein the feeding step comprises the steps of:
    initially determining a signal to feed to the coils and determining a first position of the reader element and feeding a first part of the signal to at least one coil having a first positional relationship with the first position with a signal and
    subsequently determining a second position of the reader element and feeding the signal with an inverse phase to at least one coil having a second positional relationship with the second position.

24. A method according to any of embodiment 17-23, further comprising the steps of:
    the reader head sensing the magnetic field and
    converting the sensed magnetic field into an electric signal.

25. An element comprising:
    a controller,
    one or more first coils provided along a predetermined curve at a surface of the element, each coil connected to the controller,
    a plurality of sensors each positioned in the vicinity of the curve, the sensors connected in series, the series of sensors connected to the controller,
    the controller being configured to receive a series of signals from the sensors and output a predetermined signal to one or more selected coils of the first coils, the outputting and/or selection being determined on the basis of the signals received.

26. An element according to embodiment 25, wherein the controller is configured to output the predetermined signal over a period of time, the period of time being determined from a timing relationship of at least two of the signals received.

27. An element according to embodiment 25, further comprising a second sensor, the controller being configured to output the predetermined signal and/or select the selected coils also on the basis of signals received from the second sensor.

28. An element according to embodiment 25 or 27 further comprising a second plurality of sensors positioned in the vicinity of the curve, the sensors of the second plurality of sensors being connected in series and to the controller, where the controller is configured to output the predetermined signal and/or select the selected coils also on the basis of signals received from the second plurality of sensors.

29. An element according to any of embodiments 25-28, wherein the controller is configured to short circuit non-selected coils.

30. A method of outputting a magnetic signal from one or more coils positioned along a predetermined curve at a surface of an element, a plurality of sensors being connected in series and each being positioned in the vicinity of the curve, the method comprising:
    a reader element or head travelling along the curve, sensing the magnetic signal,
    the sensors outputting a first series of signals caused by the reader element sequentially being in the vicinity of the sensors,
    feeding the coil(s) in accordance with the first series of signals output by the sensors to generate the magnetic signal.

31. A method according to embodiment 30, wherein the feeding step comprises sequentially feeding one or more of a plurality of the coils, where the coil(s) fed is/are selected on the basis of the signals of the first series of signals.

32. A method according to embodiment 31, wherein a next coil along the curve is fed, when a next signal is output by the sensors.

33. A method according to embodiment 31, wherein, when a next signal is output by the sensors, a longest fed, still fed, coil is identified, where after this coil is no longer fed.

34. A method according to any of embodiments 30-23, wherein the feeding step comprises short circuiting not-fed coils.

35. A method according to any of embodiments 23-34, further comprising the steps of a second sensor outputting a signal, where the feeding step comprises feeding the coil(s) also on the basis of the signal output by the second sensor.

36. A method according to any of embodiments 30-35, further comprising the step of a second plurality of sensors positioned in the vicinity of the curve and being connected in series outputting a second series of signals, where the feeding step comprises feeding the coil(s) also in accordance with the second series of signals.

37. A method according to embodiment 36, wherein the feeding step comprises selecting one or more first coils to feed on the basis of a timing relationship between a first signal output from the series of sensors and a first signal output from the second series of sensors.

38. A method of producing an element comprising a plurality of coils provided along a predetermined curve at or on a surface of the element, the method comprising:
   providing a basic element having a surface comprising at least 3 electrically conducting areas,
   providing a helical coil having a predetermined length,
   providing electrical connections between pairs of a conducting area and a separate part of the coil.

39. A method according to embodiment 38, wherein the step of providing the basic element comprises providing a basic element with at least 4 electrically conducting areas and wherein the step of providing the electrical connections comprises connecting the areas to 4 different portions of the coil.

40. A method according to embodiment 38 or 39, further comprising the step of providing a controller and electrically connecting the controller to each of the areas.

41. A method according to any of embodiments 38-40, wherein the step of providing the coil comprises fixing the coil in relation to the basic element.

42. A method according to embodiment 41, wherein the step of providing the coil and the step of providing the electrical connections comprises fixing the coil to the electrically conducting surfaces, 43. An assembly for outputting a magnetic signal, the assembly comprising:
   a basic element comprising at least 3 electrically conductive surface areas,
   a helical coil fixed in relation to the basic element, different portions of the coil being electrically connected to different ones of the surface areas.

44. An assembly according to embodiment 43, wherein each of the portions of the helical coil is fixed to the pertaining surface area.

45. An assembly according to embodiment 43 or 44, further comprising a controller electrically connected to the areas.

46. A method of transferring a magnetic signal, the method comprising:
   one or more transmission coils outputting the magnetic signal which, over time, has a sequence of opposite peaks,
   a receiving coil receiving the magnetic signal and outputting an output signal which, over time, has a sequence of opposite peaks and, apart from in the vicinity of the peak values, a predetermined minimum slope of 10% multiplied by a signal value difference between peak values of two, opposite neighbouring peaks divided by the time elapsed between the outputting of the two peak values.

47. A method of generating a magnetic signal using one or more coils, the method comprising outputting a magnetic signal which, over time, has a sequence of opposite peaks, which signal has, apart from in the vicinity of the peak values, having a predetermined minimum slope of 10% multiplied by a signal value difference between peak values of two, opposite neighbouring peaks divided by the time elapsed between the outputting of the two peak values.

48. A method according to any of embodiments 46 and 47, wherein the signal, for at least a predetermined period of time after the outputting of each peak, has an at least substantially predetermined slope.

49. A method according to any of embodiments 46-48, wherein the signal represents a binary signal having a first and a second binary values, where the first binary value represented by two opposite, neighbouring peaks and where the second, other binary value is represented by a single peak.

50. A method according to any of embodiments 46-49, wherein the step of outputting the magnetic signal comprises feeding a signal to the one or more transmitting coils.

51. An assembly comprising a receiving coil, one or more transmitting coils and a processor connected to the transmitting coil(3),
   where the processor is configured to output a voltage and/or current signal to the transmitting coils to cause the transmitting coils to output a magnetic signal, the voltage/current signal having, over time, a sequence of opposite voltage/current peaks,
   the receiving coil being configured to receive the magnetic signal and output an output signal which has a number of opposite voltage/current peaks and, apart from in the vicinity of the peak values, a predetermined minimum slope of 10% multiplied by a signal voltage/current difference between peak values of two, opposite neighbouring voltage/current peaks divided by the time elapsed between the outputting of the two peak values.

52. An assembly comprising one or more coils and a processor connected to the coils, where the processor is configured to output a voltage and/or current signal to the coils to cause the coils to output a magnetic signal, the voltage/current signal having, over time, a sequence of opposite voltage/current peaks, which signal has, apart from in the vicinity of the peak values, having a predetermined minimum slope of 10% multiplied by a signal voltage/current difference between peak values of two, opposite neighbouring voltage/current peaks divided by the time elapsed between the outputting of the two peak values.

53. An assembly according to any of embodiments 51 and 52, wherein the voltage/current signal, for at least a predetermined period of time after the outputting of each peak, has an at least substantially predetermined slope.

54. An assembly according to any of embodiments 51-53, wherein the voltage/current signal represents a binary signal having a first and a second binary values, where the first binary value represented by two opposite, neighbouring peaks and where the second, other binary value is represented by a single peak.

55. A method of generating a first magnetic signal using one or more first coils and a second magnetic signal from one or more second coils,
   the first magnetic signal having, over time, a first sequence of opposite peaks,
   the second magnetic signal having, over time, a second sequence of opposite peaks and, during one or more predetermined periods of time, a slope below 10% multiplied by a signal value difference between peak values of two opposite, neighbouring peaks of the second magnetic signal divided by the time elapsed between the outputting of the two peak values,
   the method comprising outputting the second signal from the second coil(s) and outputting the first signal from the first coil(s), where the outputting of the first signal comprises outputting the first signal to have the peaks from the first sequence outside of the predetermined periods of time.

56. An assembly comprising one or more first coils and one or more second coils and a processor connected to the first and second coils, the processor being configured to output a first signal to the first coil(s) and a second signal to the second coil(s), where: the first magnetic signal has, over time, a first sequence of opposite peaks, the second magnetic signal has, over time, a second sequence of opposite peaks, and, during one or more predetermined periods of time, a slope below 10% multiplied by a signal value difference between peak values of two opposite, neighbouring peaks of the second magnetic signal divided by the time elapsed between the outputting of the two peak values, the processor being configured to output the first signal to have the peaks outside of the predetermined periods of time.

57. An assembly comprising:
an outer surface bounded by at least a first and a second edge portion,
a plurality of coils arranged at least substantially along a predetermined curve at the surface, the curve having a first length and extending between a first and a second points on the surface,
a controller connected to each of the coils, the controller being configured to receive a signal from one or more first coils of the coils and feed a signal individually to each of one or more second coils of the coils.

58. An assembly according to embodiment 57, where the first coil(s) and the second coil(s) are non-overlapping groups of coils.

59. An assembly according to embodiment 57 or 58, wherein at least one first coil is adjacent to a second coil.

60. An assembly according to any of embodiments 57-59, wherein the controller is configured to select an plurality of neighbouring coils and determine therefrom, a first coil and a plurality of second coils, the second coils being positioned on either side of the determined first coil.

61. An assembly according to any of embodiments 57-59, wherein the controller is configured to select a plurality of neighbouring coils and determine therefrom, a first coil and a plurality of second coils, the second coils being positioned on only one side of the determined first coil.

62. An assembly according to any of embodiments 57-61, wherein the controller is configured to determine, from the signal(s) from the first coil(s), a position, direction and/or velocity of a metallic, magnetic and/or reader element or reader head and determine, from the determined position/direction/velocity, the second coils.

63. An assembly according to embodiment 62 wherein the controller is configured to, subsequent to determining other second coil(s), determining other first coil(s) and then feeding a signal to the other second coils and receiving a signal from each other first coil.

64. An assembly according to embodiment 57, where at least one first coil is a second coil and where the controller is configured to determine, from the signal(s) from the first coil(s), a position, direction and/or velocity of a metallic, magnetic and/or reader element or reader head and determine, from the determined position/direction/velocity, the second coils.

65. An assembly according to embodiment 64, wherein the controller is configured to derive a parameter from the signal(s) received from the first coil(s) and determine the position/direction/velocity from the parameter.

66. A method for generating a magnetic field, the method comprising receiving a signal from one or more first coils of a plurality of coils sequentially positioned along a curve within an element while feeding one or more second coils of the plurality of coils.

67. A method according to embodiment 66, wherein the feeding step comprises sequentially feeding second coil(s) over time.

68. A method according to embodiment 66 or 67, wherein the first coil(s) and the second coil(s) are non-overlapping groups of coils.

69. A method according to any of embodiments 66-68, wherein at least one first coil is adjacent (along the curve) to a second coil.

70. A method according to any of embodiments 66-69, wherein a plurality of neighbouring coils are selected, where a first coil is determined as one of the selected coils, and a plurality of second coils are determined from the selected coils, the second coils being positioned on either side of the determined first coil.

71. A method according to any of embodiments 66-70, a plurality of neighbouring coils are selected and a first coil is determined as one of the selected coils, and a plurality of second coils are determined from the selected coils, the second coils being positioned on only one side of the determined first coil.

72. A method according to any of embodiments 66-71, wherein a position, direction and/or velocity of a metallic, magnetic and/or reader element or reader head is determined, and wherein the second coils are determined from the determined position/direction/velocity.

73. A method according to embodiment 72, wherein, subsequent to the determination of the second coils, next first coil(s) are determined, a signal is fed to the second coils and a signal is received from each next first coil.

74. A method according to embodiment 66, where at least one first coil is a second coil and where a position, direction and/or velocity of a metallic, magnetic and/or reader element or reader head is determined from the signal(s) from the first coil(s) and wherein the second coil(s) is/are determined from the determined position/direction/velocity.

75. A method according to embodiment 74, wherein a parameter is derived from the signal(s) received from the first coil(s) and the position/direction/velocity is determined from the parameter.

76. An assembly comprising:
an outer surface bounded by at least a first and a second edge portion,
a plurality of coils arranged at least substantially along a predetermined curve at the surface, the curve having a first length and extending between a first and a second points on the surface, the first point being positioned within a first distance of 20% of the first length or less from the first edge portion and the second point being positioned within a second distance of 20% of the first length or less from the second edge portion,
a controller connected to the coils,
the controller being configured to:
select one of the coils,
provide a signal to two coils adjacent to the selected coil so that magnetic fields output by the two coils, between a centre of the individual coil and the selected coil and above the surface and projected on to the curve, has the same direction, along the curve.

77. An assembly according to embodiment 76, wherein the coils are at least substantially equidistantly positioned along the curve.

78. An assembly according to embodiment 76 or 77, wherein a first coil is positioned within 25% of the first length from the first point and wherein a second coil is positioned within 25% of the first length from the second point.

79. An assembly according to any of embodiments 76-78, wherein the coils have symmetry axes at least substantially parallel to a plane of the first surface, the controller being configured to provide a signal to the two coils so that the magnetic field generated therein at centres thereof being, when projected on to the curve, in the same direction along the curve.

80. An assembly according to embodiment 79, wherein a common core element extends within the coils.

81. An assembly according to any of embodiments 76-80, wherein the coils have symmetry axes at an angle to a plane of the first surface, the controller being configured to provide a signal to the two coils so that the magnetic field generated therein at centres thereof being, when projected on to an axis perpendicular to the outer surface, in opposite directions.

82. An assembly according to any of embodiments 76-81, wherein the controller is configured to short circuit the selected coil.

83. An assembly according to any of embodiments 76-82, wherein the controller is configured to output a signal to one or more additional coils adjacent to one of the two coils, so that a magnetic field output by each of the one or more additional coils, between a centre of the individual coil and the selected coil, above the surface and projected on to the curve, has the same direction, along the curve as that of the at least two coils.

84. A method for generating a magnetic field, the method comprising:
    selecting one of a plurality of coils positioned along a curve at a surface of an element comprising the coils,
    feeding at least two coils each being positioned adjacently to the selected coil so as to output, from the fed coils, magnetic fields which, between a centre of the individual coil and the selected coil, above the surface and projected on to the curve, has a the same direction, along the curve.

85. A method according to embodiment 84, comprising the step of short circuiting the selected coil.

86. A method according to embodiment 84 or 85, wherein the feeding step comprises simultaneously feeding one or more additional coils being adjacent to one of the two coils so that a magnetic field output thereby, between a centre of the individual coil and the selected coil, above the surface and projected on to the curve, has the same direction, along the curve a plurality of neighbouring coils as that of the at least two coils.

87. A method according to embodiment 86, wherein the feeding step comprises stopping feeding of one or more but not all coils fed, continuing feeding one or more fed coils, and initiating feeding one or more coils neighbouring to each other and/or the one or more fed coils.

88. A method according to any of embodiments 84-87, wherein the coils form a plurality of sets of coils.

89. A method according to any of embodiments 84-88, further comprising the step of determining a position, direction and/or velocity of a metallic, magnetic and/or reader element and controlling the feeding step to feed coils at or in the vicinity of the metallic/magnetic/reader head.

90. A method according to embodiment 89, wherein the selecting step comprises determining a position of a reader element and selecting, as the selected coil, the coil being the closest to the reader element.

91. A method according to any of embodiment 89, further comprising the steps of:
    the reader head sensing the magnetic field and
    converting the sensed magnetic field into an electric signal.

92. An assembly comprising:
    an outer surface bounded by at least a first and a second edge portion,
    a plurality of coils arranged at least substantially along a predetermined curve at the surface, the curve having a first length and extending between a first and a second points on the surface, the first point being positioned within a first distance of 20% of the first length or less from the first edge portion and the second point being positioned within a second distance of 20% of the first length or less from the second edge portion, the coils having symmetry axes at an angle to a plane of the first surface,
    a magnetically conducting material extending along the curve, the coils being positioned between the outer surface and the conducting material, and
    a controller connected to the coils.

93. An assembly according to embodiment 92, wherein the coils are at least substantially equidistantly positioned along the curve.

94. An assembly according to embodiment 92 or 93, wherein a first coil is positioned within 25% of the first length from the first point and wherein a second coil is positioned within 25% of the first length from the second point.

95. An assembly according to any of embodiments 92-94, wherein the controller is configured select a coil and provide a signal to two coils adjacent to the selected coil so that magnetic fields output by the two coils, between a centre of the individual coil and the selected coil and above the surface and projected on to the curve, has the same direction, along the curve.

96. An assembly according to any embodiments 92-95, wherein the controller is configured to:
    select one of the coils,
    provide a signal to two coils adjacent to the selected coil so that the magnetic field generated therein at centres thereof being, when projected on to an axis perpendicular to the outer surface, in opposite directions.

97. An assembly according to embodiment 95 or 96, wherein the controller is configured to feed a signal to an additional coil adjacent to one of the two coils and not being the selected coil, the fed signal causing the additional coil to output a magnetic field having, at a centre of the additional coil and when projected on to the axis, the same direction as the adjacent, fed coil.

98. A method for generating a magnetic field, the method comprising feeding the two coils of the assembly according to embodiment 97.

99. An assembly comprising:
    an outer surface bounded by at least a first and a second edge portion,
    a plurality of coils arranged at least substantially along a predetermined curve at the surface,
    a controller connected to the coils, the controller being configured to, at a first point in time, feed a time-varying signal to one or more first coils of the plurality of coils, and, at a second, later point in time feed the signal to one or more second coils of the plurality of coils, where the first coils are no longer operated and the second coils are operated at or close to a zero-crossing of a voltage or a current of the time-varying signal.

100. An assembly according to embodiment 99, wherein the controller is configured to stop feeding the signal to the first coil(s) and start feeding the signal to the second coil(s) when the voltage or current of the signal is less than 10% of a maximum voltage or current fed through the first coil(s) at any time (or during normal operation), such as less than 5% of the maximum current 101. An assembly according to embodiment 99 or 100, further comprising a current sensor configured to output a signal to the controller, when the current fed by the controller to the coils reaches zero.

102. An assembly according to any of embodiments 99-101, further comprising a voltage sensor configured to output a signal to the controller, when the voltage fed by the controller to the coils reaches zero.

103. An assembly according to embodiment 102, wherein the controller is configured to stop feeding the signal to the first coils and start feeding the signal to the second coils after a predetermined period of time after the voltage reaches zero.

104. An assembly according to any of embodiments 99-103, wherein the plurality of coils are positioned along a curve of an outer surface of the assembly.

105. An assembly according to embodiment 104, wherein the second coil(s) is/are adjacent to the first coil(s) along the curve. Sequential shifting 106. A method for generating a magnetic field, the method comprising feeding a time-varying signal to one or more first coils of a plurality of coils, when a voltage or current of the time-varying signal reaches zero, stopping feeding the signal to the first coils and starting feeding the time-varying signal to one or more second coils of the plurality of coils.

107. A method according to embodiment 106, where the second coil(s) is/are adjacent to the first coil(s).

108. A method according to embodiment 106 or 107, wherein one or more third coils of the plurality of coils are fed the time-varying signal both when the first coils are fed and when the second coils are fed.

109. A method according to any of embodiments 106-108, wherein the first and/or second coils are connected in series.

110. A method according to any of embodiments 106-109, further comprising the step of determining a position, direction and/or velocity of a metallic, magnetic and/or reader element and controlling the feeding step to feed coils at or in the vicinity of the metallic/magnetic/reader head.

111. A method according to embodiment 110, wherein the determining step comprises determining a position of a reader element and wherein the feeding step comprises feeding at least one coil having a predetermined positional relationship with the determined position.

112. A method according to embodiment 106, wherein the feeding step comprises selecting a plurality of neighbouring coils and feeding at least some of the selected coils.

113. A method according to embodiment 111 and 112 wherein the feeding step comprises selecting the plurality of coils to include the at least one coil.

114. A method according to embodiment 113, wherein the feeding step comprises selecting a plurality of coils, a centre of which is at the determined position.

115. A method according to embodiment 113, wherein the feeding step comprises selecting a plurality of coils of which an extreme coil is at the determined position.

116. A method according to any of embodiment 110, further comprising the steps of:
the reader head sensing the magnetic field and
converting the sensed magnetic field into an electric signal.

117. An assembly comprising:
an outer surface bounded by at least a first and a second edge portion,
a controller having a plurality of outputs,
a plurality of coils positioned sequentially along a predetermined curve at the outer surface, each coil having two end conductors, pairs of coils being defined, one end conductor of one coil of a pair and one end conductor of the other coil of the pair being connected to a separate output of the controller,
the controller being configured to feed a plurality of adjacent coils by feeding a signal to the two outputs connected to only one end conductor of the adjacent coils while not feeding a signal to the output(s) connected to two end conductors of the adjacent coils.

118. An assembly according to embodiment 117, wherein the controller is configured to:
at a first point in time, feed the plurality of adjacent coils by a first and a second output, and,
at a later point in time:
identifying a third output connected to one end conductor of a first coil, the other end conductor being connected to the first output, the first coil not being one of the adjacent coils,
identifying a fourth output connected to one end conductor of a second coil, the other end conductor being connected to the second output, the second coil not being one of the adjacent coils,
stop outputting a signal on the first and second outputs and
outputting a signal on the third and fourth outputs.

119. An assembly according to embodiment 117 or 118, wherein the coils are at least substantially equidistantly positioned along the curve.

120. An assembly according to any of embodiments 117-119, wherein a first coil is positioned within 25% of the first length from the first point and wherein a second coil is positioned within 25% of the first length from the second point.

121. An assembly according to any of embodiments 117-120, wherein the coils have symmetry axes at least substantially parallel to a plane of the first surface.

122. An assembly according to embodiment 121, wherein a common core element extends within the coils.

123. An assembly according to any of embodiments 117-121, wherein the coils have symmetry axes at an angle to a plane of the first surface.

124. An assembly according to any of embodiments 117-123, wherein the controller is configured to short circuit one or more sets of coils and output a signal to one or more other sets of coils.

125. An assembly according to any of embodiments 117-124, wherein the coils are formed by a single, helical coil.

126. An assembly according to any of embodiments 117-125, further comprising at least one sensor for detecting presence of a metallic and/or magnetic element, the controller being connected to the sensor.

127. An assembly according to embodiment 126, further comprising 3-100 sets of second coils arranged at least substantially along a predetermined second curve at the surface, the second curve having a second length and extending between a third and a fourth points on the surface, the third point being positioned within a first distance of 25% of the second length or less from the first edge portion and the fourth point being positioned within a second distance of 25% of the second length or less from the second edge portion, the second coils connected to the controller and wherein the sensor(s) is/are positioned between the first and second curves.

128. An assembly according to embodiment 126 or 127, comprising a plurality of sensors positioned in one or more groups of sensors positioned at individual positions at the surface, wherein one sensor from each group is connected in series and to the controller.

129. A method of operating an assembly comprising:
an outer surface bounded by at least a first and a second edge portion,
a controller having a plurality of outputs,
a plurality of coils positioned sequentially along a predetermined curve at the outer surface, each coil having two end conductors, pairs of coils being defined, one end conductor of one coil of a pair and one end conductor of the other coil of the pair being connected to a separate output of the controller.
the method comprising feeding a plurality of adjacent coils by feeding a signal to the two outputs connected to only one end conductor of the adjacent coils while not feeding a signal to the output(s) connected to two end conductors of the adjacent coils.

130. A method according to embodiment 129, further comprising the steps of:
at a first point in time, feeding the plurality of adjacent coils by a first and a second output, and,
at a later point in time:
identifying a third output connected to one end conductor of a first coil, the other end conductor being connected to the first output, the first coil not being one of the adjacent coils,
identifying a fourth output connected to one end conductor of a second coil, the other end conductor being connected to the second output, the second coil not being one of the adjacent coils,
stop outputting a signal on the first and second outputs and
outputting a signal on the third and fourth outputs.

130. A method according to embodiment 129, comprising the step of short circuiting one or more of the coils not fed.

131. A method according to any of embodiments 129 and 130, wherein the coils form a plurality of sets of coils.

132. A method according to any of embodiments 129-131, further comprising the step of determining a position, direction and/or velocity of a metallic, magnetic and/or reader element and controlling the feeding step to feed coils at or in the vicinity of the metallic/magnetic/reader head.

133. A method according to embodiment 132, wherein the determining step comprises determining a position of a reader element and wherein the feeding step comprises feeding the adjacent coils having a predetermined positional relationship with the determined position.

134. A method according to any of embodiments 129-133, further comprising the steps of:
the reader head sensing the magnetic field and
converting the sensed magnetic field into an electric signal.

135. An assembly comprising:
an outer surface bounded by at least a first and a second edge portion,
a plurality of coils arranged at least substantially along a predetermined curve at the surface, a plurality of sets of serially connected coils being formed, each set having two extremely positioned coils, along the curve and between two adjacent coils of a set, one coil from each other set is provided,
a controller connected to the extreme coils of each set.

136. An assembly according to embodiment 135, wherein all coils of a set are configured to output, along symmetry lines or centres thereof, magnetic field which, for each pair of adjacent coils of the set, have opposite directions.

137. An assembly according to embodiment 135, wherein all coils of a set are configured to output, along symmetry lines or centres thereof, magnetic field with the same directions.

138. An assembly according to any of embodiments 135-137, wherein the coils have symmetry axes at least substantially parallel to a plane of the first surface.

139. An assembly according to embodiment 138, wherein a common core element extends within the coils.

140. An assembly according to any of embodiments 135-138, wherein the coils have symmetry axes at an angle to a plane of the first surface.

141. An assembly according to any of embodiments 135-140, wherein the controller is configured to short circuit one or more sets of coils and output a signal to one or more other sets of coils.

142. An assembly according to any of embodiments 135-141, wherein the controller is configured to feed the sets so that a group of coils is formed, a central coil of which is not fed and a signal is to two coils adjacent to the central coil so that magnetic fields output by the two coils, between a centre of the individual coil and the selected coil and above the surface and projected on to the curve, has the same direction, along the curve.

143. An assembly according to embodiment 142, wherein the coils have symmetry axes at least substantially parallel to a plane of the first surface, the controller being configured to provide a signal to the sets so that signals are provided to the two coils so that the magnetic field generated therein at centres thereof being, when projected on to the curve, in the same direction along the curve.

144. An assembly according to embodiment 142, wherein the coils have symmetry axes at an angle to a plane of the first surface, the controller being configured to provide a signal to the sets so that signals are fed to the two coils so that the magnetic field generated therein at centres thereof being, when projected on to an axis perpendicular to the outer surface, in opposite directions.

145. A method for operating the assembly according to embodiment 135, the method comprising the controller feeding a signal to one or more of the sets.

146. A method according to embodiment 145, comprising the step of short circuiting one or more of the coils not fed.

147. A method according to embodiment 145, wherein the feeding step comprises stopping feeding of one or more but not all sets fed, continuing feeding one or more fed sets, and initiating feeding one or more other sets.

148. A method according to any of embodiments 145-147, further comprising the step of determining a position, direction and/or velocity of a metallic, magnetic and/or reader element and controlling the feeding step to feed coils at or in the vicinity of the metallic/magnetic/reader head.

149. A method according to embodiment 148, wherein the determining step comprises determining a position of a reader element and wherein the feeding step comprises feeding at least one coil having a predetermined positional relationship with the determined position.

150. A method according to any of embodiment 145-19, further comprising the steps of:
the reader head sensing the magnetic field and
converting the sensed magnetic field into an electric signal.

151. A method of generating a first magnetic signal using one or more first coils and a second magnetic signal from one or more second coils,
the first magnetic signal having, over time, a first sequence of opposite peaks, the second magnetic signal having, over time, a second sequence of opposite peaks
the method comprising outputting the second signal from the second coil(s) and outputting the first signal from the first coil(s), where the outputting of the first signal comprises outputting the first signal to have the peaks from the first sequence outside points in time being less than ¼ of a period of time, of the second signal elapsing between two adjacent, opposing peaks, from a zero crossing of a voltage or current of the second signal.

152. An assembly comprising one or more first coils and one or more second coils and a processor connected to the first and second coils,
the processor being configured to output a first signal to the first coil(s) and a second signal to the second coil(s), where:
the first magnetic signal has, over time, a first sequence of opposite peaks,
the second magnetic signal has, over time, a second sequence of opposite peaks,
the processor being configured to output the first signal to have the peaks outside points in time being less than ¼ of a period of time, of the second signal elapsing between two adjacent, opposing peaks, from a zero crossing of a voltage or current of the second signal.

The invention claimed is:

1. An assembly comprising:
an outer surface bounded by at least a first edge portion and a second edge portion,
a plurality of coils arranged at least substantially along a first curve at the outer surface, the first curve having a first length and extending between a first point and a second point on the outer surface, the first point being positioned within a first distance of 20% of the first length or less from the first edge portion and the second point being positioned within a second distance of 20% of the first length or less from the second edge portion,
a controller connected to the plurality of coils,
wherein the plurality of coils have symmetry axes at least substantially parallel to a plane of the outer surface,
wherein the controller is configured to sequentially feed a time-varying signal to one or more coils of the plurality of coils so that different coils of the plurality of coils receive different parts of the time-varying signal.

2. An assembly according to claim 1, wherein the controller is configured to short circuit one or more coils of the plurality of coils and output a signal to one or more other coils of the plurality of coils.

3. An assembly according to claim 1, wherein each coil of the plurality of coils has two end conductors and wherein the controller is configured to output the same signal to the end conductors of a coil.

4. An assembly according to claim 1, wherein the controller is configured to output a signal to a plurality of neighboring coils.

5. An assembly according to claim 1, further comprising at least one sensor configured to detect a presence of a metallic and/or magnetic element, the controller being connected to the sensor.

6. An assembly according to claim 5, further comprising a plurality of second coils arranged at least substantially along a second curve at the outer surface, the second curve having a second length and extending between a third point and a fourth point on the outer surface, the third point being positioned within a first distance of 25% of the second length or less from the first edge portion and the fourth point being positioned within a second distance of 25% of the second length or less from the second edge portion, the second coils connected to the controller and wherein the at least one sensor is positioned between the first curve and the second curve.

7. An assembly according to claim 5, comprising a plurality of sensors positioned in one or more groups of sensors positioned at individual positions at the outer surface, wherein one sensor from each group is connected in series and to the controller.

8. A method of operating the assembly according to claim 1, the method comprising sequentially feeding a time-varying signal to one or more coils of the plurality of coils so that different coils of the plurality of coils receive different parts of the time-varying signal.

9. A method according to claim 8, further comprising short circuiting one or more of the coils not fed by the time-varying signal.

10. A method according to claim 8, wherein
each coil has two conductor ends, and
the method includes feeding a common signal to the two conductor ends of a coil.

11. A method according to claim 8, wherein the feeding includes simultaneously feeding the time-varying signal to a plurality of neighboring coils.

12. A method according to claim 11, wherein the feeding includes
stopping feeding of the time-varying signal to one or more but not all coils fed by the time-varying signal,
continuing feeding one or more coils with the time-varying signal, and
initiating feeding the time-varying signal to one or more coils neighboring to each other and/or the one or more fed coils.

13. A method according to claim 8, further comprising determining a position, direction and/or velocity of a metallic, magnetic and/or reader element and controlling the feeding of the time-varying signal to feed the time-varying signal to coils at or in a vicinity of the metallic, magnetic and/or reader element.

14. A method according to claim 13, wherein
the determining includes determining a position of a reader element, and
the feeding includes feeding the time-varying signal to at least one coil having a particular positional relationship with the determined position.

15. A method according to claim 14, wherein the feeding includes selecting the plurality of coils to include the at least one coil.

16. A method according to claim 15, wherein the feeding includes selecting a set of coils of the plurality of coils, a centre of which is at the determined position.

17. A method according to claim 15, wherein the feeding includes selecting a set of coils of the plurality of coils of which an extreme coil is at the determined position.

18. A method according to claim 8, wherein the feeding includes:
initially determining a signal to feed to the plurality of coils and determining a first position of the reader element and feeding a first part of the signal to at least one coil having a first positional relationship with the first position with a signal and
subsequently determining a second position of the reader element and feeding the signal with an inverse phase to at least one coil having a second positional relationship with the second position.

19. A method according to claim 8, further comprising:
converting a magnetic field sense by a reader head into an electric signal.

20. A method according to claim 8, further comprising:
  selecting a plurality of neighboring coils and a pattern according to which coils of a first group of the plurality of neighboring coils are fed the time-varying signal and any remaining coils of the plurality of neighboring coils are not fed the time-varying signal,
  wherein the sequentially feeding includes repeatedly:
    feeding the time-varying signal to the coils of the first group of the plurality of neighboring coils in accordance with the pattern, and
    subsequently selecting next neighboring coils, a quantity of next neighboring coils being a particular quantity, the next neighboring coils being offset from the plurality of neighboring coils.

* * * * *